(12) United States Patent
Deboy et al.

(10) Patent No.: US 9,673,732 B2
(45) Date of Patent: Jun. 6, 2017

(54) POWER CONVERTER CIRCUIT

(75) Inventors: Gerald Deboy, Klagenfurt (AT); Yi Tang, Singapore (SG)

(73) Assignee: Infineon Technologies Austria AG, Villach (AT)

( * ) Notice: Subject to any disclaimer, the term of this patent is extended or adjusted under 35 U.S.C. 154(b) by 1307 days.

(21) Appl. No.: 13/599,964

(22) Filed: Aug. 30, 2012

(65) Prior Publication Data
US 2013/0187473 A1 Jul. 25, 2013

Related U.S. Application Data

(60) Provisional application No. 61/590,195, filed on Jan. 24, 2012.

(51) Int. Cl.
H02J 1/00 (2006.01)
H02M 7/49 (2007.01)
H02M 1/00 (2006.01)

(52) U.S. Cl.
CPC ...... *H02M 7/49* (2013.01); *H02M 2001/0077* (2013.01); *Y10T 307/707* (2015.04)

(58) Field of Classification Search
CPC ............. H02M 7/49; H02M 2001/007; H02M 2001/0077; H02M 2001/0074
See application file for complete search history.

(56) References Cited

U.S. PATENT DOCUMENTS

| | | | |
|---|---|---|---|
| 8,872,384 B2* | 10/2014 | Stratakos | H02J 3/383 307/104 |
| 9,048,513 B2* | 6/2015 | Butzmann | H01M 10/425 |
| 2009/0212629 A1 | 8/2009 | Paull | |
| 2010/0309692 A1* | 12/2010 | Chisenga | H02J 3/383 363/37 |
| 2011/0273132 A1* | 11/2011 | Khaitan | H01M 10/46 320/101 |
| 2011/0285375 A1 | 11/2011 | Deboy | |
| 2011/0298306 A1* | 12/2011 | Lanni | H02J 1/00 307/151 |
| 2012/0119746 A1 | 5/2012 | Macris | |
| 2012/0175964 A1 | 7/2012 | Yoscovich et al. | |

(Continued)

FOREIGN PATENT DOCUMENTS

| | | |
|---|---|---|
| CN | 101299546 A | 11/2008 |
| CN | 101950984 A | 1/2011 |

(Continued)

OTHER PUBLICATIONS

Alonso, O., et al., "Cascaded H-Bridge Multilevel Converter for Grid Connected Photovoltaic Generators with Independent Maximum Power Point Tracking of each Solar Array," IEEE 34th Annual Power Electronics Specialist Conference (PESC '03), vol. 2, Jun. 15-19, 2003, pp. 731-735.

(Continued)

*Primary Examiner* — Daniel Cavallari
(74) *Attorney, Agent, or Firm* — Slater Matsil, LLP

(57) ABSTRACT

A circuit arrangement includes a number of DC power sources. Each DC power source includes a rechargeable battery. The circuit arrangement also includes a number converter units. Each converter unit has input terminals and output terminals. The input terminals are coupled to one DC power source. The converter units form a series circuit between load terminals.

27 Claims, 25 Drawing Sheets

(56) References Cited

U.S. PATENT DOCUMENTS

| | | | |
|---|---|---|---|
| 2013/0009700 A1* | 1/2013 | Deboy | H02J 3/383 327/581 |
| 2013/0155736 A1* | 6/2013 | Ilic | H02M 7/72 363/71 |
| 2013/0181529 A1 | 7/2013 | Tang et al. | |
| 2013/0181530 A1 | 7/2013 | Deboy et al. | |
| 2013/0181531 A1 | 7/2013 | Deboy et al. | |

FOREIGN PATENT DOCUMENTS

| | | |
|---|---|---|
| CN | 202034795 U | 11/2011 |
| EP | 2477318 A2 | 7/2012 |
| GB | 2483317 A | 3/2012 |
| WO | 2009105678 A2 | 8/2009 |
| WO | WO 2010/101960 A1 | 9/2010 |
| WO | 2012016285 A1 | 2/2012 |

OTHER PUBLICATIONS

Ertl, H., et al., "A Novel Multicell DC-AC Converter for Applications in Renewable Energy Systems," IEEE Transactions on Industrial Electronics, vol. 49, No. 5, Oct. 2002, pp. 1048-1057.

Johnson, B., et al., "Photovoltaic AC Module Composed of a Very Large Number of Interleaved Inverters," Twenty-Sixth Annual IEEE Applied Power Electronics Conference and Exposition (APEC), Mar. 6-11, 2011, pp. 976-981, Fort Worth, Texas.

Sahan, B., "Wechselrichtersysteme mit Stromzwischenkreis zur Netzanbindung von PV-Generatoren," ISBN 978-3-89958-912-2, 2010, 10 pages.

Walker, G., et al., "Cascaded DC-DC Converter Connection of Photovoltaic Modules," IEEE Transactions on Power Electronics, vol. 19, No. 4, Jul. 2004, pp. 1130-1139.

\* cited by examiner

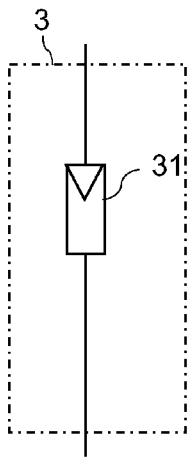
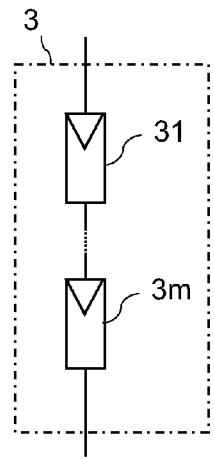
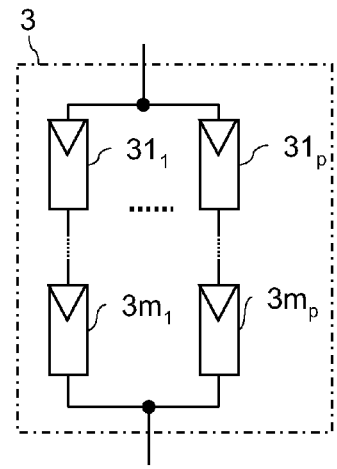
FIG 2A    FIG 2B    FIG 2C
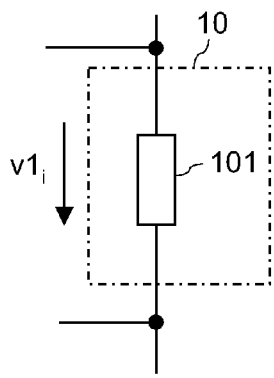
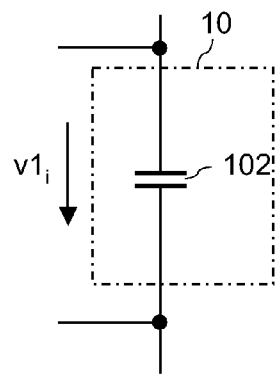
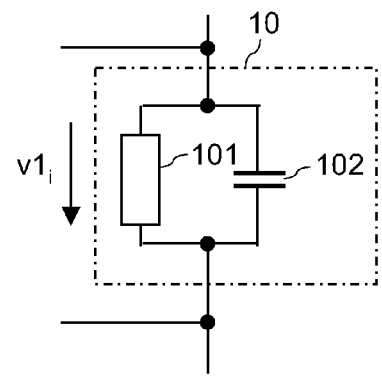
FIG 4A    FIG 4B    FIG 4C
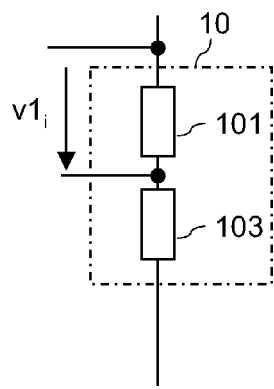
FIG 4D

US 9,673,732 B2

POWER CONVERTER CIRCUIT

This application claims the benefit of U.S. Provisional Application Ser. No. 61/590,195, filed Jan. 24, 2012, and is incorporated herein by reference.

TECHNICAL FIELD

Embodiments of the present invention relate to a power converter circuit, a power supply system with a power converter circuit, and a method for operating a power converter circuit.

BACKGROUND

With an increasing interest in sustainable energy production there is a focus on using photovoltaic modules for producing electric power. Photovoltaic (PV) modules include a plurality of photovoltaic (PV) cells, that are also known as solar cells. Since the output voltage of one cell is relatively low, a PV module usually includes a string with a plurality of series connected solar cells, such as between 50 to 100 cells connected in series, or even several such strings connected in parallel.

A PV module provides a DC supply voltage, while power grids, such as national power grids, have an AC supply voltage. In order to supply the energy provided by a PV module to the power grid it is, therefore, necessary to convert the DC voltage of the PV module into an AC voltage that is consistent with the AC supply voltage of the power grid.

A first approach for converting the PV module DC voltage into a power grid AC voltage includes connecting several PV modules in series so as to obtain a DC voltage that is higher than the peak voltage of the power grid AC voltage, and converting the DC voltage into the AC voltage using a DC/AC converter. The amplitude of the DC voltage is typically between 200V and 1000V. High DC voltages, however, are critical in terms of the occurrence of electric arcs.

According to a second approach, a plurality of DC/AC converters are provided, where each of these converters is connected to a PV module. The individual converters have their AC voltage outputs connected in parallel and each of these converters generates an AC voltage that is consistent with the power grid AC supply voltage from the DC voltage provided by the string of solar cells. The DC voltage provided by one PV module usually has an amplitude in the range of between 20V and 100V, depending on the number of cells that are connected in series within one module and depending on the technology used to implement the solar cells, while the peak voltage of the power grid AC voltage is about 155V or 325V, depending on the country. However, due to the large difference between input and output voltages these converters have a disadvantage in terms of efficiency.

According to a further approach, several DC/AC converters are connected in series, where each of these converters receives a DC supply voltage from a PV module. In this system a central control unit is employed to synchronize the individual DC/AC converters in a multi-level switching pattern. This system requires constant synchronized control of all individual units.

SUMMARY

One embodiment relates to a circuit arrangement. The circuit arrangement includes a plurality of n, with n≥2, DC power sources each including at least one rechargeable battery, and a plurality of n converter units, each converter unit having input terminals and output terminals and having the input terminals coupled to one DC power source, the converter units forming a series circuit between load terminals.

BRIEF DESCRIPTION OF THE DRAWINGS

Examples will now be explained with reference to the drawings. The drawings serve to illustrate the basic principle, so that only aspects necessary for understanding the basic principle are illustrated. The drawings are not to scale. In the drawings the same reference characters denote like signals and circuit components.

FIG. 2 which includes FIGS. 2A-2C illustrates different embodiments of photovoltaic arrays, each including at least one solar cell;

FIG. 4 which includes FIGS. 4A-4D illustrates different embodiments of measurement units;

FIG. 7 which includes

DETAILED DESCRIPTION OF ILLUSTRATIVE EMBODIMENTS

In the following detailed description, reference is made to the accompanying drawings, which form a part thereof, and in which is shown by way of illustration specific embodiments in which the invention may be practiced. In this regard, directional terminology, such as "top," "bottom," "front," "back," "leading," "trailing," etc., is used with reference to the orientation of the figures being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims. It is to be understood that the features of the various exemplary embodiments described herein may be combined with each other, unless specifically noted otherwise.

In the following, embodiments of the present invention will be explained in a specific context, namely in the context of converting electrical power or electrical voltages provided by a plurality of photovoltaic arrays into an AC voltage, specifically an AC power grid supply voltage. However, this is only an example, embodiments of the invention may be employed in a wide range of applications in which a conversion of DC voltages into an AC voltage is required. Any type of DC power source may be used instead of an photovoltaic array, such as a fuel cell. It is even possible, to employ DC power source of different types, such as photovoltaic arrays and fuel cells, in one application.

Figure 1:
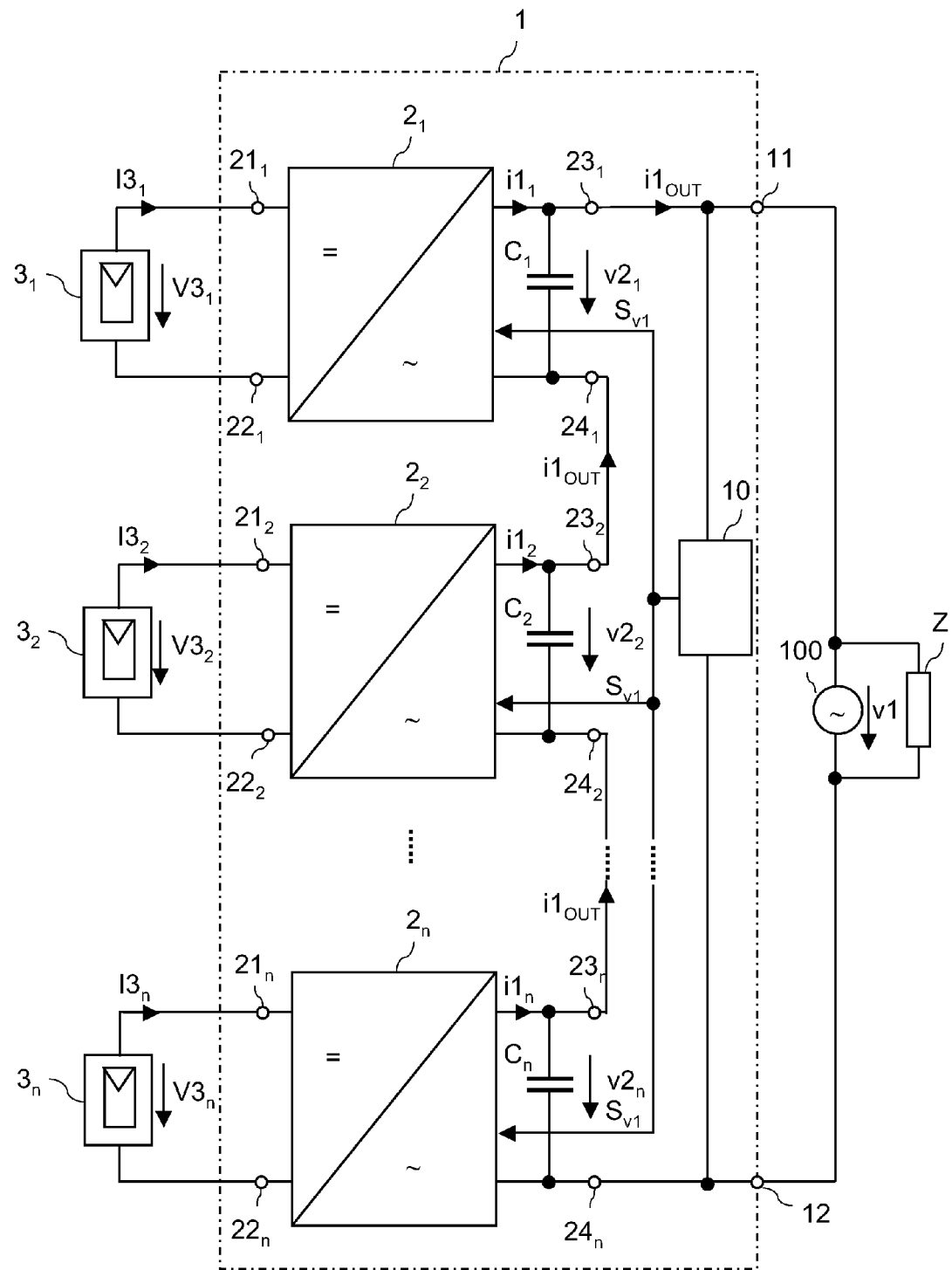
FIG. 1 schematically illustrates a power converter circuit including a plurality of DC/AC converter units connected in series and a voltage measurement circuit.

FIG. 1 illustrates a first embodiment of a power converter circuit (power inverter circuit) 4 for converting a plurality of n (at least two) DC input voltages $V3_1$, $V3_2$, $V3_n$ into one AC output voltage v1. It should be noted in this connection that throughout the drawings DC voltages and DC currents will be denoted using capital letters "V" and "I," while AC voltages and AC currents will be denoted using lowercase letters "v" and "i." The power converter circuit includes a plurality of n (at least two) converter units $2_1$, $2_2$, $2_n$, with n≥2. Each of these converter units includes input terminals $21_1$, $22_1$; $21_2$, $22_2$; and $21_n$, $22_n$ that are configured to be coupled to a DC power source $3_1$, $3_2$, $3_n$. In FIG. 1, besides the power converter circuit 1 with the converter units $2_1$, $2_2$, $2_n$ DC power sources $3_1$, $3_2$, $3_n$ are also illustrated. These DC power sources $3_1$, $3_2$, $3_n$ together with the power converter circuit 1 form an AC power supply system or an AC current supply system. The DC power sources $3_1$, $3_2$, $3_n$ are implemented as photovoltaic (PV) modules in the embodiment illustrated in FIG. 1. However employing PV modules as DC power sources is only an example. Any other type of DC power source, such as a power source including fuel cells, may be used as well. It is even possible to employ different types of DC power sources in one power supply system.

Each of the converter units $2_1$, $2_2$, $2_n$ further includes output terminals $23_1$, $24_1$; $23_2$, $24_2$; and $23_n$, $24_n$. The converter units $2_1$, $2_2$, $2_n$ are connected in series (in cascade) between output terminals 11, 12 of the power converter circuit 1. For this, a first converter unit $2_1$ has a first output terminal $23_1$ coupled to a first output terminal 11 of the power converter circuit 1 and a last converter unit $2_n$ in the cascade has a second output terminal $24_n$ coupled to a second output terminal 12 of the power converter circuit 1. Further, each of the first output terminals (other than output terminal $23_1$) are connected to one second output terminal (other than output terminal $24_n$) of another converter unit.

The output terminals 11, 12 of the power converter circuit 1 are configured to receive a voltage v1. For example, the output terminals 11, 12 are configured to be connected to a power grid, so that the external voltage v1 corresponds to a grid voltage or, more specifically, corresponds to one phase of the power grid. In FIG. 1, the power grid is represented by a voltage source 100 and a load Z connected in parallel with the power source 100. The voltage source 100 of the power grid represents a plurality of AC voltage sources in the power grid, and load Z represents a plurality of loads connected to the power sources in the power grid. The power grid defines the AC voltage v1 between the output terminal. Since this voltage v1 is defined by an external source, such as the power grid, this voltage will be referred to as external AC voltage v1 in the following.

Each of the converter units $2_1$, $2_2$, $2_n$ provides an AC output voltage $v2_1$, $v2_2$, $v2_n$ between its output terminals $23_1$, $24_1$, $23_2$, $24_2$, $23_n$, $24_n$. By having the converter units $2_1$, $2_2$, $2_n$ connected in series, the sum of the individual AC output voltages $v2_1$, $v2_2$, $v2_n$ of the converter units $2_1$, $2_2$, $2_n$ corresponds to the external voltage v1 when the power converter circuit 1 is in the steady state, that is, $$v1 = \sum_{i=1}^{n} v2_i. \quad (1)$$

Each power converter unit $2_1$, $2_2$, $2_n$ further includes an output capacitance $C_1$, $C_2$, $C_n$ connected between the individual output terminals $23_1$, $24_1$, $23_2$, $24_2$, $23_n$, $24_n$ and provides an output current $i1_1$, $i1_2$, $i1_n$. The output current of one converter unit $2_1$, $2_2$, $2_n$ is the current received at a circuit node common to the output capacitance $C_1$, $C_2$, $C_n$ and one of the output terminals. For example, in the first converter unit $2_1$, the output current of the converter unit $2_1$ is the current flowing into the circuit node at which the output capacitor $C_1$ is connected to the first output terminal $23_1$. The current flowing from the first output terminal $23_1$ of the first converter unit $2_1$ will be referred to as converter circuit output current $i_{OUT}$. This current corresponds to the current flowing between the individual converter units $2_1$-$2_n$. The output capacitances $C_1$, $C_2$, $C_n$ are part of the individual converter units $2_1$, $2_2$, $2_n$ and can be implemented in many different ways as will be explained with reference to several examples herein below.

In the steady state, the AC output currents $i1_1$, $i1_2$, $i1_n$ or, more precisely, the rms values of the AC output currents $i1_1$, $i1_2$, $i1_n$, correspond to the power converter circuit output current $i_{OUT}$ or the rms value of the output current $i_{OUT}$, respectively, so that there is very little to no rms current into the output capacitors $C_1$-$C_n$. However, there can be situations in which the output currents $i1_1$, $i1_2$, $i1_n$ of the individual converter units $2_1$, $2_2$, $2_n$ change and in which the output currents $i1_1$, $i1_2$, $i1_n$ are mutually different until the system has settled at new (equal) output currents $i1_1$, $i1_2$, $i1_1$. This is explained in further detail below.

The power converter circuit 1 further includes a voltage measurement circuit 10 connected between the output terminals 11, 12 of the power converter circuit 1. The voltage measurement circuit 10 is configured to provide at least one measurement signal $S_{V1}$ that includes an information on the phase and the frequency of the external AC voltage v1.

The individual converter units $2_1$, $2_2$, $2_n$ are each configured to receive one measurement signal $S_{V1}$. In the embodiment illustrated in FIG. 1, the individual converter units $2_1$, $2_2$, $2_n$ receive the same measurement signal $S_{V1}$. However, this is only an example. It is also possible to generate one measurement signal for each of the converter units $2_1$, $2_2$, $2_n$. An embodiment is explained with reference to FIG. 3 herein below. The at least one measurement signal $S_{V1}$ can be transmitted to the individual converter units $2_1$, $2_2$, $2_n$ in different ways. Referring to FIG. 1, a signal transmission bus can be provided through which the at least one measurement signal $S_{VN}$ is transmitted to the individual converter units $2_1$, $2_2$, $2_n$. According to a further embodiment (not illustrated in FIG. 1), there is a dedicated transmission path between the voltage measurement circuit and each of the converter units $2_1$, $2_2$, $2_n$. The signal transmission bus or the signal transmission paths can be implemented like conventional signal transmission buses or like conventional signal transmission paths. The signal bus or the signal paths may include level shifter or other means to transmit the at least one measurement signal from the measurement circuit 10 to the individual converter units $2_1$, $2_2$, $2_n$ that (due to being connected in cascade) have different reference potentials or different voltage domains.

The individual converter units $2_1$, $2_2$, $2_n$ each include at least one internal control loop which will be explained in further detail herein below. The control loop of each converter unit $2_1$, $2_2$, $2_n$ is configured to have each converter unit $2_1$, $2_2$, $2_n$ generate the corresponding output current $i1_1$, $i1_2$, $i1_n$ such that there is a given phase difference between the phase as represented by the at least one measurement signal $S_{V1}$, and which corresponds to the phase of the External AC voltage v1, and the phase of its AC output current $i1_1$, $i1_2$, $i1_n$. According to one embodiment, the individual output currents $i1_1$, $i1_2$, $i1_n$ are generated to be in phase with the external AC voltage v1, so that the phase difference is zero. According to another embodiment, the phase difference is not zero. When setting the difference to a value other than zero, reactive power is fed into the power grid. This may help to stabilize the external AC voltage, which is, e.g., a power grid.

In FIG. 1, same features of the DC voltage sources $3_1$, $3_2$, $3_n$ have the same reference characters, where the reference characters of the individual DC voltage sources $3_1$, $3_2$, $3_n$ can be distinguished from each other by subscript indices "1," "2," "n." Equivalently, same features of the converter units $2_1$, $2_2$, $2_n$ have the same reference characters that can be distinguished by subscript indices, "1" for the first converter unit $2_1$, "2" for the second converter unit $2_2$ and "n" for the n-th converter unit $2_n$. In the following, when explanations equivalently apply to each of the DC sources $2_1$, $2_2$, $2_n$ or to each of the converter units $2_1$, $2_2$, $2_n$, reference characters will be used without indices. In the following, reference character 2, for example, represents an arbitrary one of the converter units, reference character 23 represents a first output terminal of an arbitrary one of the converter units, reference character i1 denotes the output current of an arbitrary converter unit 2, reference character denotes the output capacitance C of an arbitrary converter unit 2, and so on.

The power converter of FIG. 1 includes n=3 converter units 2. However, having n=3 converter units is only an example. Any number of n converter units 2, wherein n>1, can be connected in series to form the power converter circuit 1.

Besides the internal control loops of the converter units 2 the power converter circuit 1 does not require an outer control loop connected to the individual converter units 2 and/or additional communication paths between the individual converter units 2, when the power converter circuit 1 is in the steady state. When the power converter circuit 1 is in the steady state the system can be defined by equation (1) and one further equation for each of the converter units 2:

$$v2_{RMS} \cdot i1_{RMS} = V3 \cdot I3 \quad (2)$$

where $V2_{RMS}$ denotes the RMS (route mean square) value of the output voltage v2 of one converter units 2, $i1_{RMS}$ denotes the RMS value of the output current i1 of one converter unit, V3 denotes the input voltage and I3 denotes the input current of the converter unit 2. It should be noted that (very low) losses may occur in each converter unit 2. For the sake of simplicity, these losses are not considered in equation (2). In the steady state, the RMS values of the individual output currents $i1_{RMS}$ are equal and correspond to the rms value of the power converter circuit output current $i_{OUT-RMS}$, that is:

$$i1_{RMS} = i1_{OUT-RMS} \quad (3).$$

Since equations (2) and (3) is valid for each of the individual converter units, there are n equations, each of these equations describing the relationship between the input power and the average output power of each of the converter units 2, where the input power Pin is given as $$P\text{in} = V3 \cdot I3 \quad (4),$$

and the output power Pout is given as $$P\text{out} = v2_{RMS} \cdot i1_{RMS} \quad (5).$$

The input power Pin of each of the individual converter units 2 and the input voltage V3 and the input current I3, respectively, are external parameters given by the individual DC power sources 3. The external AC voltage v1 between the output terminals 11, 12 is defined by the power grid.

Thus, there are n+1 variables in the power converter circuit 1, namely the n output voltages v2 of the individual converter units 2 and the (equal) output currents i1. However, referring to equations (1) and (2) the system is defined by n+1 equations, so that each of the n+1 variables is determined when the system is in its steady state. Besides having each of the converters 2 generate its AC output current i1 such that that there is a given phase difference (such as zero) between the AC output current i1 and the external AC voltage no additional control or regulation mechanism is required. When the output currents i1 of the individual converter units 2 are in phase with the external AC voltage v1 the real output power of each converter unit equals the apparent output power, so that the reactive output power is zero. The individual converter units 2 control their output currents i1 dependent on the phase information as represented by the at least one measurement signal $S_{V1}$ and control their output current such that the input power received at the input terminals 21, 22 equals the output power at the output terminals 23, 24.

The DC power sources 3 implemented as PV arrays are only schematically illustrated in FIG. 1. These PV arrays each include at least one solar cell. Some exemplary embodiments of PV arrays including at least one solar cell are illustrated in FIGS. 2A to 2C. FIG. 2A illustrates a first embodiment. In this embodiment, the PV array 3 includes only one solar cell 31. Referring to a further embodiment illustrated in FIG. 2B, one PV array 3 includes a string of m solar cells 31, 3m wherein m>1, connected in series. According to yet another embodiment illustrated in FIG. 2C, p strings of solar cells are connected in parallel, wherein p>1. Each of the strings includes m solar cells $31_1, 3m_1, 31_p, 3m_p$. However, the embodiments illustrated in FIGS. 2A to 2C are only exemplary. Many other solar cell arrangements may be used as well as a DC source 3.

Figure 3:
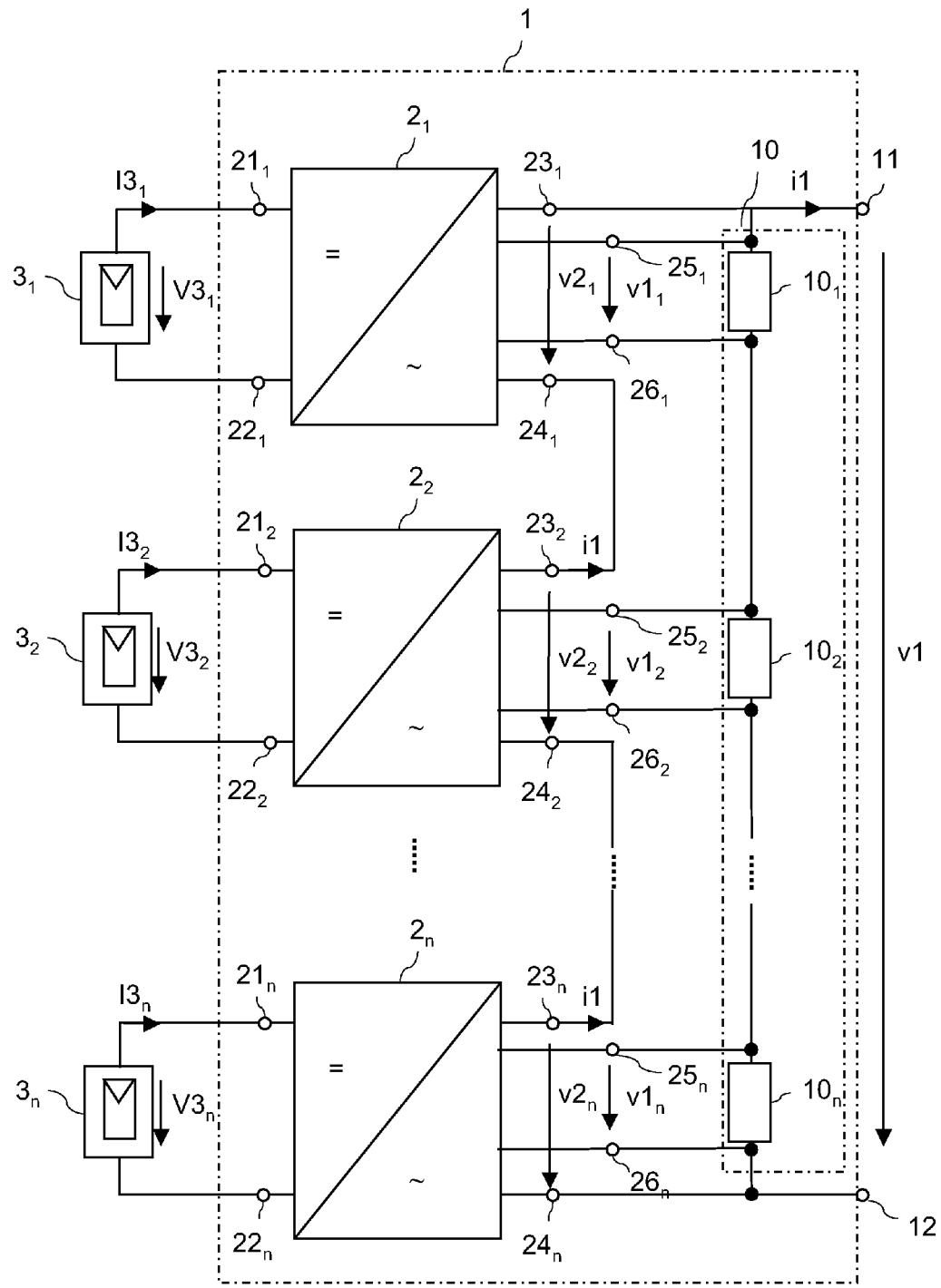
FIG. 3 schematically illustrates a power converter circuit including a plurality of DC/AC converter units connected in series and a voltage measurement circuit including a plurality of measurement units connected in series.

FIG. 3 illustrates an embodiment of a power converter circuit that includes a voltage measurement circuit 10 with a plurality of measurement units $10_1, 10_2, 10_n$. The individual measurement units $10_1, 10_2, 10_n$ are connected in series between the output terminals 11, 12. For simplicity of the illustration, the output capacitances ($C_1$-$C_n$ in FIG. 1) are not illustrated in FIG. 3. The plurality of measurement units $10_1, 10_2, 10_n$ forms a voltage divider, wherein a voltage drop $v1_1, v1_2, v1_n$ across each of the measurement units $10_1, 10_2, 10_n$ is a function of the external AC voltage v1 and includes an information on the frequency and the phase of the external AC voltage v1. In this embodiment, each converter unit $2_1, 2_2, 2_n$ has a measurement input with two input terminals $25_1, 26_1, 25_2, 26_2, 25_n, 26_n$, and each converter unit $2_1, 2_2, 2_n$ has the measurement input terminals coupled to one measurement unit $10_1, 10_2, 10_n$, so as to receive one measurement voltage $v1_1, v1_2, v1_n$ as the measurement signal.

In the embodiment illustrated in FIG. 3, the number of measurement units $10_1, 10_2, 10_n$ corresponds to the number of converter units $2_1, 2_2, 2_n$, so that each measurement unit $10_1, 10_2, 10_n$ is associated with one converter unit $2_1, 2_2, 2_n$. However, this is only an example. According to a further embodiment (not illustrated) the measurement voltage provided by one measurement unit is received by two or more converter units.

The individual measurement units $10_1, 10_2, 10_n$ can be implemented in many different ways. Some examples are explained with reference to FIGS. 4A to 4D below. In these FIGS. 4A to 4D, reference character 10, denotes an arbitrary one of the measurement units $10_1, 10_2, 10_n$ illustrated in FIG. 3.

Referring to FIG. 4A, one measurement unit $10_i$ may include a resistor 101 connected between the terminals of the measurement unit 10, that serve to connect the individual measurement units ($10_1$-$10_n$ in FIG. 3) in series and that serve to couple the individual measurement units to the converter units ($2_1$-$2_n$ in FIG. 3). According to one embodiment, the resistances of the resistors 101 in the individual measurement units $10_i$ are equal or at least approximately equal. In this case, the absolute values of the measurement voltages $v1_i$ provided by the individual measurement units $10_i$ are equal. In a measurement circuit 10 that includes measurement units $10_i$ implemented with a resistor 101, the individual measurement voltages $v1_i$ are proportional to the output voltage v1.

In a measurement circuit 10 with measurement units $10_i$ including resistors, the individual measurement units 10, form a resistive voltage divider. Referring to a further embodiment illustrated in FIG. 4B, the individual measurement units $10_i$ each include a capacitor 102 instead of a resistor. In this case, the individual measurement units $10_i$ form a capacitive voltage divider between the output terminals 11, 12.

Referring to FIG. 4C, that illustrates a further embodiment, each measurement unit $10_i$ can be implemented with a parallel circuit including a resistor 101 and a capacitor 102.

Referring to FIG. 4D, that illustrates yet another embodiment of one measurement unit $10_i$, each measurement unit or at least some of the measurement units can be implemented with a voltage divider having a first voltage divider 101 and a second voltage divider element 102. These voltage divider elements are implemented as resistors in the embodiment according to FIG. 4D. However, these voltage divider elements 101, 102 could also be implemented as capacitors or as combinations with at least one resistor and at least one capacitor. In this embodiment, the measurement voltage $v1_i$ is not the voltage across the measurement unit $10_i$ but is the voltage across the first voltage divider element 101, so that the measurement voltage $v1_i$ is a fraction of the voltage across the measurement unit $10_i$.

Figure 5:
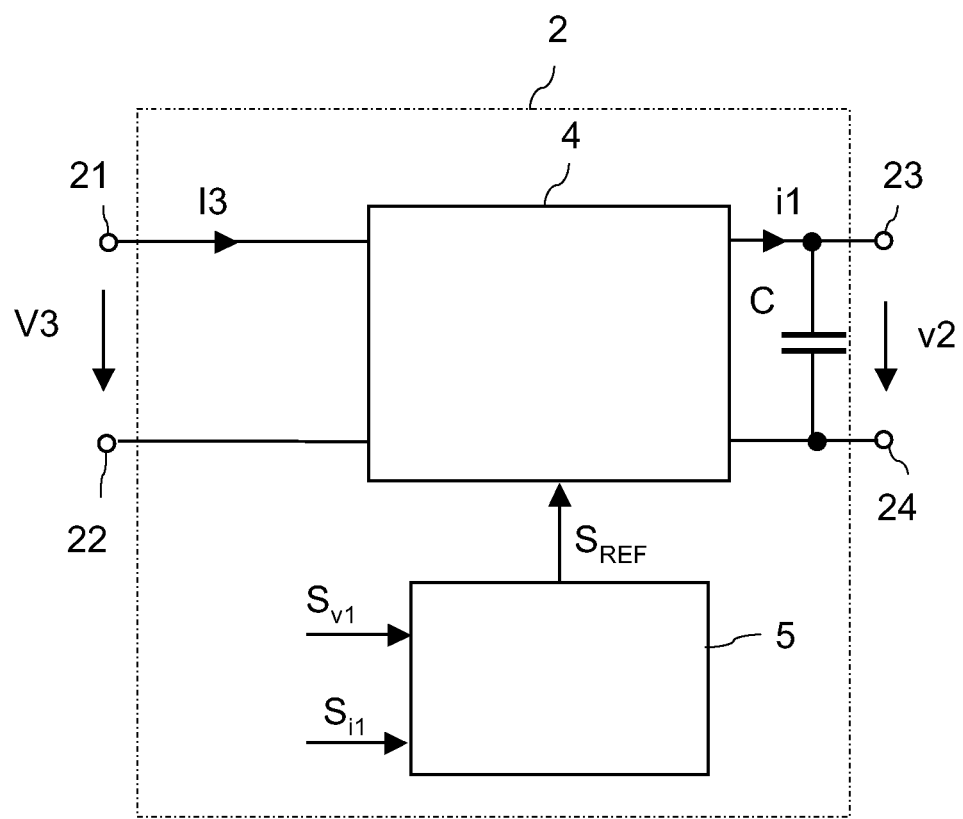
FIG. 5 shows a block diagram illustrating a first embodiment of one DC/AC converter unit, including a DC/AC converter and a control circuit.

FIG. 5 illustrates a first embodiment of a converter unit 2 for converting the DC input voltage provided by one DC source (not shown in FIG. 3) into an AC output voltage v2. The converter unit 2 includes a DC/AC converter 4 connected between the input terminals 21, 22 and the output terminals 23, 24. The DC/AC converter receives the DC voltage V3 provided by the DC power source as an input voltage and the DC supply current I3 of the DC power source as an input current. The DC/AC converter 4 further receives a reference signal $S_{REF}$, which may be an alternating signal having a frequency and a phase. The DC/AC converter 4 is configured to generate the AC output current i1 dependent on the reference signal $S_{REF}$ such that a frequency and a phase of the output current i1 correspond to a frequency and a phase, respectively, of the measurement signal $S_{V1}$. The DC/AC converter 4 can be implemented like a conventional DC/AC converter that is configured to generate an output current in phase with an alternating reference signal. Such DC/AC converters are commonly known.

It should be noted that each of the DC/AC converter units $2_1$, $2_2$, $2_n$ controls its output current i1 to have a phase and frequency that is dependent on the at least one measurement signal $S_{V1}$.

The reference signal $S_{REF}$ is generated by a control circuit 5 dependent on the measurement signal $S_{V1}$ and an output current signal $S_{i1}$. The measurement signal $S_{V1}$ is either the measurement signal $S_{V1}$ explained with reference to FIG. 1, one of the measurement voltages $v1_i$ explained with reference to FIG. 3, or a scaled version or a fraction thereof. The output current signal $S_{i1}$ represents the output current i1, i.e., the output current signal $S_{i1}$ is dependent on the output current i1. According to one embodiment, the output current signal $S_{i1}$ is a scaled version of the output current i1. The output current signal $S_{i1}$ can be generated in a conventional manner from the output current i1 using a current measurement circuit (not illustrated). The output current signal $S_{i1}$ is generated for each of the converter units ($2_1$-$2_n$) individually by detecting the respective output current of each converter unit. Referring to FIG. 5, the output current i1 of the illustrated converter unit 2 is the current received at the circuit node common to the first output terminal 23 and the output capacitance C.

The control circuit 5, which will also be referred to as controller in the following, generates the reference signal $S_{REF}$ dependent on the measurement signal $S_{V1}$ and the output current signal $S_{i1}$ such that the output current, when generated in correspondence with the reference signal $S_{REF}$, is in phase with the external AC voltage v1 or has a given phase shift relative to the external AC voltage v1. It should be noted that, since the external AC voltage v1 and the output current i1 are alternating signals, the measurement signal $S_{V1}$ and the output current signal $S_1$ are also alternating signals. In the converter unit 2, the DC/AC converter 4 and the controller 5 are part of a control loop that controls the output current i1 to be in phase with the external AC voltage v1 or to have a given phase shift relative thereto.

Although a conventional DC/AC converter may be used in the converter unit 2 as the DC/AC converter 4 connected between the input terminals 21, 22 and the output terminals 23, 24, one example of a DC/AC converter 4 will be explained in detail with reference to FIG. 6, in order to ease understanding of embodiments of the invention.

Figure 6:
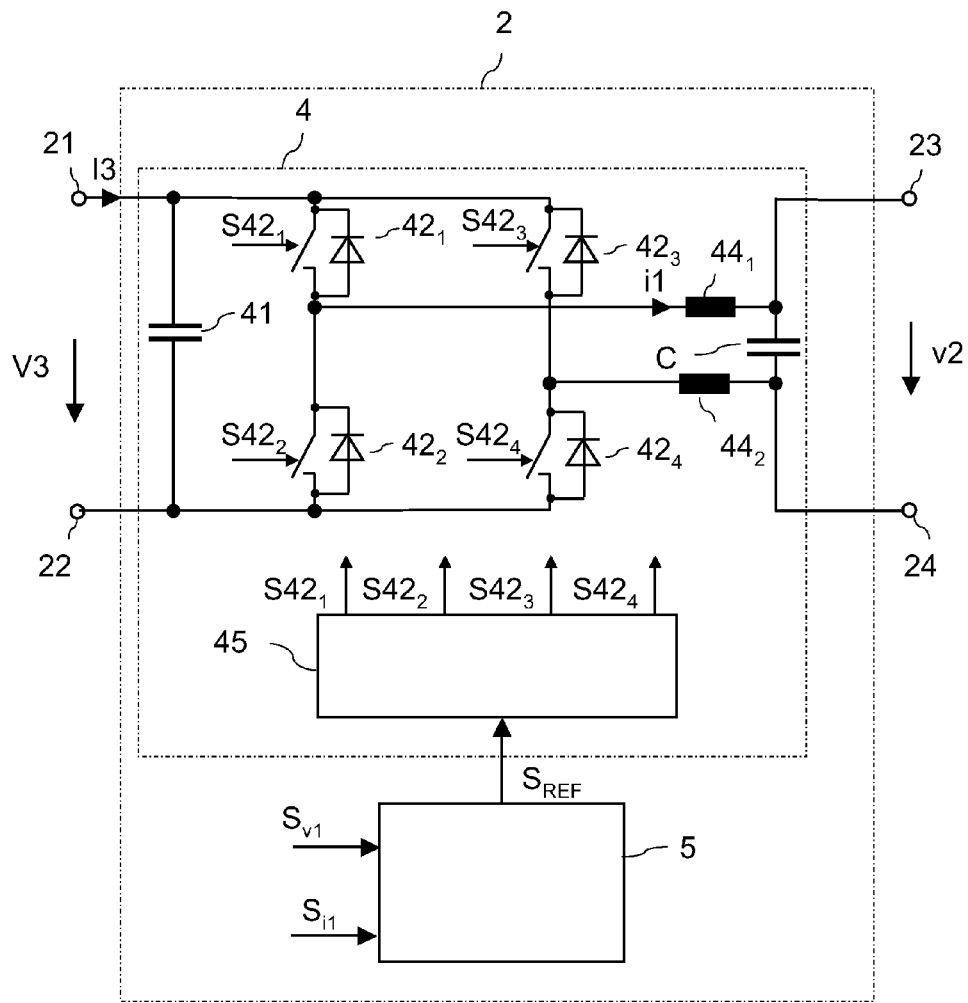
FIG. 6 illustrates an embodiment of the DC/AC converter of FIG. 5 in detail.

The DC/AC converter 4 illustrated in FIG. 6 is a full-bridge (H4) converter with two half-bridge circuits each connected between the input terminals 21, 22. Each of these half-bridge circuits includes two switches each having a load path and a control terminal. The load paths of the two switches of one half-bridge circuit are connected in series between the input terminals 21, 22, where a first switch $42_1$ and a second switch $42_2$ form the first half-bridge, and a third switch $42_3$ and a fourth switch $42_4$ form the second half-bridge. Each of the half-bridges includes an output, where an output of the first half-bridge is formed by a circuit node common to the load paths of the first and second switch $42_1$, $42_2$. An output of the second half-bridge is formed by a circuit node common to the load paths of the third and fourth switches $42_2$, $42_4$. The output of the first half-bridge is coupled to the first output terminal 23 of the converter unit 2 via a first inductive element $44_1$, such as a choke. The output terminal of the second half-bridge is coupled to the second output terminal 24 of the converter unit 2 via a second inductive element second inductive elements $44_1$, $44_2$ is employed. The converter 4 further includes an input capacitance 41, such as a capacitance, connected between the input terminals 21, 22, and the output capacitance C connected between the output terminals 23, 24.

Each of the switches $42_1$, $42_2$, $42_3$, $42_4$ receives a control signal $S42_1$, $S42_2$, $S42_3$, $S42_4$ at its control terminal. These control signals $S42_1$-$S42_4$ are provided by a drive circuit 45 dependent on the reference signals SREF received from the controller 5. The drive signal $S42_1$-$S42_4$ are pulse-width modulated (PWM) drive signals configured to switch the corresponding switch $42_1$-$42_4$ on and off. It should be noted that a switching frequency of the PWM signals $S42_1$-$S42_4$ is significantly higher than a frequency of the alternating reference signal SREF. The reference signal SREF may be a sinusoidal signal with a frequency of 50 Hz or 60 Hz, depending on the country in which the power grid is implemented, while the switching frequency of the individual switches $42_1$-$42_4$ may be in the range of several kHz up to several 10 kHz, or even up to several 100 kHz. The drive circuit 45 is configured to individually adjust the duty cycle of each of the drive signals $S42_1$-$S42_4$ between 0 and 1 in order to have the waveform of the output current i1 follow the waveform of the reference signal SREF. When the duty cycle of one drive signal is 0, the corresponding switch is permanently switched off, and when the duty cycle of one drive signal is 1, the corresponding switch is permanently switched on. The duty cycle of a drive signal is the relationship between the time period for which the drive signal switches the corresponding switch and the duration of one switching cycle. The duration of one switching cycle is the reciprocal of the switching frequency.

Referring to what has been explained before, the output current i1 is an AC current with a positive half-cycle in which the output current is positive, and with a negative half-cycle in which the output current i1 is negative. The time behavior of the output current i1 is dependent on the reference signal SREF which also has positive and negative half-cycles.

Two possible operating principles of the converter 4 will briefly be explained. First, it is assumed that a positive half-cycle of the output current i1 is to be generated. According to a first operating principle, which is known as bipolar switching or 2-level switching, the first and fourth switches $42_1$, $42_4$ are switched on and off synchronously, while the second and third switches $42_2$, $42_3$ are permanently switched off. During an on-phase of the first and fourth switches $42_1$, $42_4$ an output current i1 is forced through the choke(s) $44_1$, $44_2$ that is dependent on the voltage difference between the input voltage V3 across the input capacitance 41 and the output voltage v2, where the output voltage v2 is defined by the power grid voltage $v_N$. The switches $42_1$-$42_4$ each include a freewheeling element, such as a diode, that is also illustrated in FIG. 4. The freewheeling elements of the second and third switches $42_2$, $42_3$ take the current flowing through the choke(s) $44_1$, $44_2$ when the first and fourth switches $42_1$, $42_4$ are switched off. In this method, the amplitude of the output current i1 can be adjusted through the duty cycle of the synchronous switching operation of the first and fourth switches $42_1$, $42_4$. When the switching frequency of the switches $42_1$, $42_4$ is much higher than the desired frequency of the output current, amplitude, frequency and phase of the AC output current i1 can be adjusted dependent on the reference signal SREF through the duty cycle of the synchronous switching operation of the first and fourth switches $42_1$, $42_4$. During the negative half-cycle the second and third switches $42_2$, $42_3$ are switched on and off synchronously, while the first and fourth switches $42_1$, $42_4$ are permanently off, so that the body diodes of these first and fourth switches $42_1$, $42_4$ are conducting. Alternatively, the switches $42_1$, $42_4$ are switched (with short dead times) when their body diodes are forward biased, so as to be operated as synchronous rectifiers.

According to a second operating principle, which is known as phase chopping or 3-level switching, the first switch $42_1$ is permanently switched on during the positive half cycle of the output voltage v2, the second and third switches $42_2$, $42_3$ are permanently off, and the fourth switch $42_4$ is switched on and off in a clocked fashion. During an on-phase of the first and fourth switches $42_1$, $42_4$ an output current i1 is forced through the choke(s) $44_1$, $44_2$ that is dependent on voltage difference between the input voltage V3 across the input capacitance 41 and the output voltage v2, where the output voltage v2 is defined by the power grid voltage $v_N$. During an off-phase of the fourth switch $42_4$ a freewheeling path is offered by the freewheeling element of switch $42_3$ and the switched-on first switch $42_1$ thus enabling a zero volt state across the output chokes. In this method, the amplitude of the output current i1 can be adjusted through the duty cycle of the switching operation of the fourth switch $42_1$, $42_4$. During the negative half-cycle the first and fourth switches $42_1$, $42_4$ are permanently switched off, the second switch $42_2$ is permanently switched on, and the third switch $42_3$ is switched on and off in a clocked fashion.

In order to control an instantaneous amplitude of the output current i1 during the positive half-cycle, the drive circuit 45 varies the duty cycle of the at least one switch that is switched on and off in a clocked fashion. The duty cycle of the at least one clocked switch and the duty cycle of its drive signal, respectively, is increased in order to increase the amplitude of the output current i1 and is decreased in order to decrease the amplitude of the output current i1. This duty cycle is dependent on the instantaneous amplitude of the reference signal $S_{REF}$.

Figure 7A:
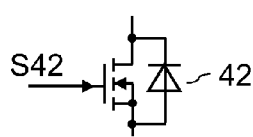
FIGS. 7A to 7C illustrates different embodiments of switches that may be used in the DC/AC converter of FIG. 6.

The switches $42_1$-$42_4$ may be implemented as conventional electronic switches. Referring to FIG. 7A, which illustrates a first embodiment for implementing the switches, the switches may be implemented as MOSFETs, specifically as n-type MOSFETs. Electronic switch 42 in FIG. 7A represents an arbitrary one of the switches $42_1$-$42_4$. A MOSFET, such as the n-type MOSFET illustrated in FIG. 7A has an integrated diode that is also illustrated in FIG. 7A. This diode is known as body diode and may act as a freewheeling element. A drain-source path, which is a path between a drain terminal and a source terminal, forms a load path of a MOSFET, and a gate terminal forms a control terminal.

Figure 7B:
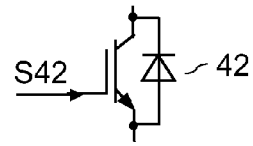

Referring to FIG. 7B, the switches $42_1$-$42_4$ could also be implemented as IGBTs, where additionally a diode may be connected between a collector and an emitter terminal of the IGBT. This diode acts as a freewheeling element. In an IGBT, the load path runs between the emitter and the collector terminal, and the gate terminal forms a control terminal.

According to a further embodiment, two of the four switches, such as the first and third transistors $42_1$, $42_3$ are implemented as SCR Thyristors, while the other two switches are implemented as MOSFET.

Figure 7C:
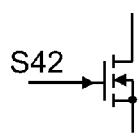

According to yet another embodiment, illustrated in FIG. 7C, the switches $42_1$-$42_4$ can be implemented as GaN-HEMTs (Gallium-Nitride High Electron Mobility Transistors). Unlike a conventional (silicon or silicon carbide) MOSFET a GaN-HEMT does not include an integrated body diode. In a GaN-HEMT, a current conduction in a reverse direction (corresponding to the forward direction of a body diode in a conventional MOSFET) can be obtained through a substrate biased turn-on. When implementing the switches in GaN technology, all switches of one converter unit can be implemented on a common semiconductor substrate.

Figure 8:
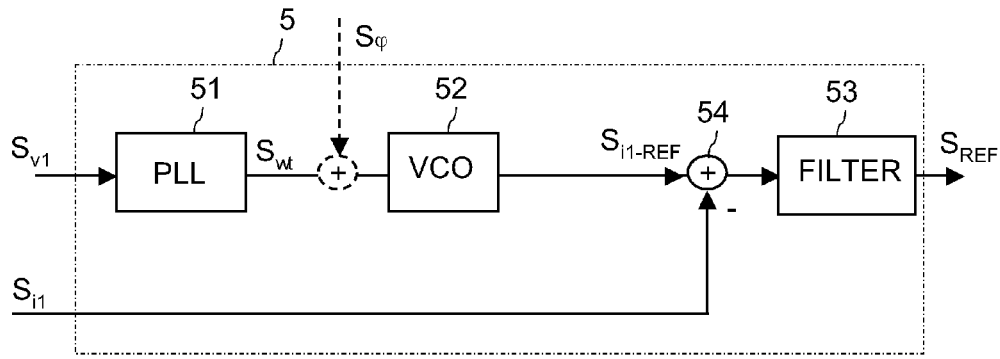
FIG. 8 illustrates a first embodiment of the control circuit of one DC/AC converter unit.

FIG. 8 schematically illustrates an embodiment of the controller 5 that generates the reference signal $S_{REF}$ dependent on the measurement signal $S_{V1}$ and the output current signal Si1. FIG. 8 shows a block diagram of the controller 5 in order to illustrate its operating principle. It should be noted that the block diagram illustrated in FIG. 8 merely serves to illustrate the functionality of the controller 5 rather than its implementation. The individual function blocks, that will be explained in further detail below, may be implemented using a conventional technology that is suitable to implement a controller. Specifically, the function blocks of the controller 5 may be implemented as analog circuits, digital circuits, or may be implemented using hardware and software, such as a microcontroller on which a specific software is running in order to implement the functionality of the controller 5.

Referring to FIG. 8, the controller 5 includes a phase locked loop (PLL) 51 that provides a frequency and phase signal $S_{\omega t}$ representing the frequency and the phase of the measurement signal $S_{V1}$. The PLL 51 receives the measurement signal $S_{V1}$. The frequency and phase signal provided by the PLL 51 is received by a signal generator, such as a VCO, that generates a sinusoidal signal $S_{i1-REF}$ being in phase with the measurement signal $S_{V1}$ and forming a reference signal for the output current i1 of the converter unit 2.

Referring to FIG. 8, the controller further receives the output current signal $S_{i1}$ and calculates an error signal by subtracting the output current signal $S_{i1}$ from the output current reference signal $S_{i1-REF}$. The subtraction operation is performed by a subtractor receiving the output current measurement signal $S_{i1-REF}$ and the output current signal $S_{i1}$ at input terminals and providing the error signal at an output terminal. The error signal, which is also a sinusoidal signal is filtered in a filter 53 connected downstream the subtractor 54. The reference signal $S_{REF}$ is a filtered version of the error signal available at the output of the filter 53. The filter is, e.g., a proportional (P) filter.

Optionally, a phase signal $S_\phi$ is added to the output signal of the PLL 51 before generating the sinusoidal reference signal $S_{i1-REF}$. In this embodiment the reference signal $S_{i1}$-REF and, therefore, the output current i1, has a phase relative to the measurement signal $S_{V1}$, with the phase shift being defined by the phase signal $S_\phi$.

Figure 9:
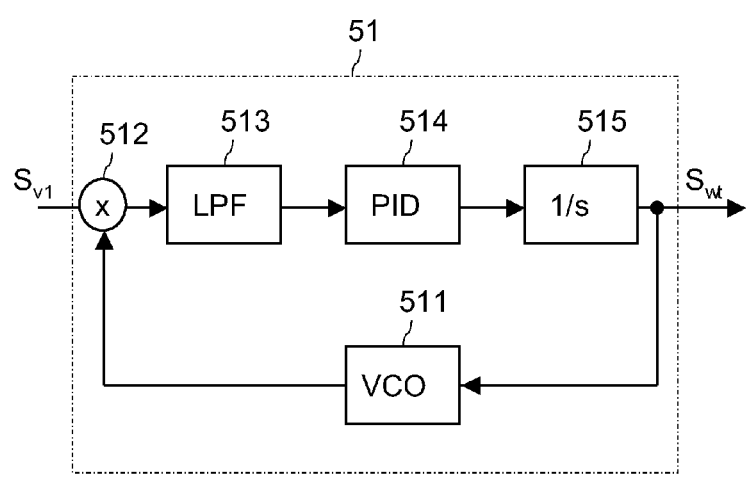
FIG. 9 illustrates a first branch of the control circuit of FIG. 8 in detail.

FIG. 9 illustrates an embodiment of the PLL 51 of FIG. 6. This PLL includes a VCO 511 that receives the frequency and phase signal $S_{\omega t}$ and generates an oscillating signal with a frequency and phase dependent on the frequency and phase signal $S_{\omega t}$. This oscillating signal is multiplied with the measurement signal $S_{V1}$ using a multiplier. An output signal of the multiplier is filtered using a low-pass filter 513 and PID filter 514 connected downstream the low-pass filter. Instead of a PID-filter a PI-filter may be used as well. The output signal of the filter 514 is multiplied with 1/s in the frequency domain, where the result of this multiplication is the frequency and phase signal $S_{\omega t}$.

Figure 10:
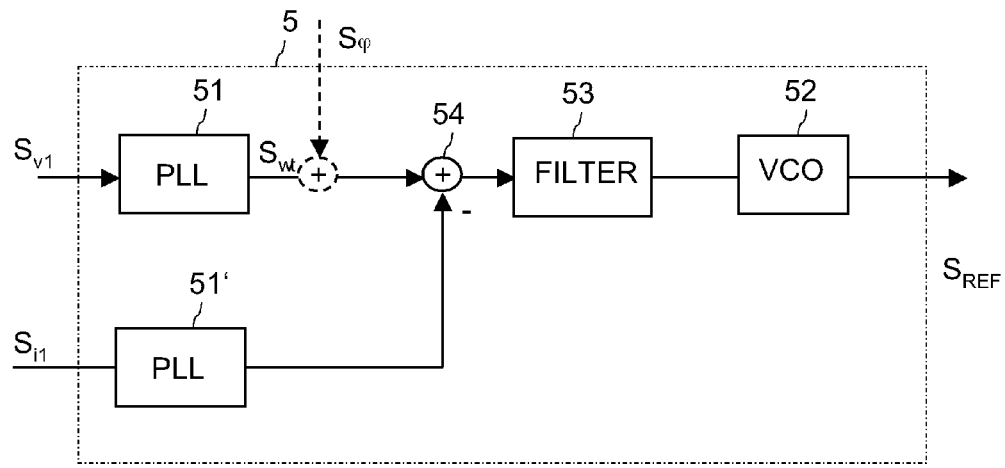
FIG. 10 illustrates a second embodiment of the control circuit of one DC/AC converter unit.

FIG. 10 illustrates a further embodiment of the controller 5. In this embodiment, a second PLL 51' receives the output current signal $S_{i1}$ and calculates a further frequency and phase signal representing frequency and phase of the output current signal $S_{i1}$. The further frequency and phase signal is subtracted from the frequency and phase signal $S_{\omega t}$ representing frequency and phase of the measurement signal $S_{V1}$ (and, optionally, the phase shift S$\phi$) using a subtractor 54, so as to provide an error signal. The error signal is filtered using a filter 53 and a signal generator 52, such as a VCO, receives the error signal and generates a sinusoidal reference signal with frequency and phase defined by the filtered error signal. In this embodiment, the filter 53 can be implemented as a P-filter or as a PI-filter.

Figure 11:
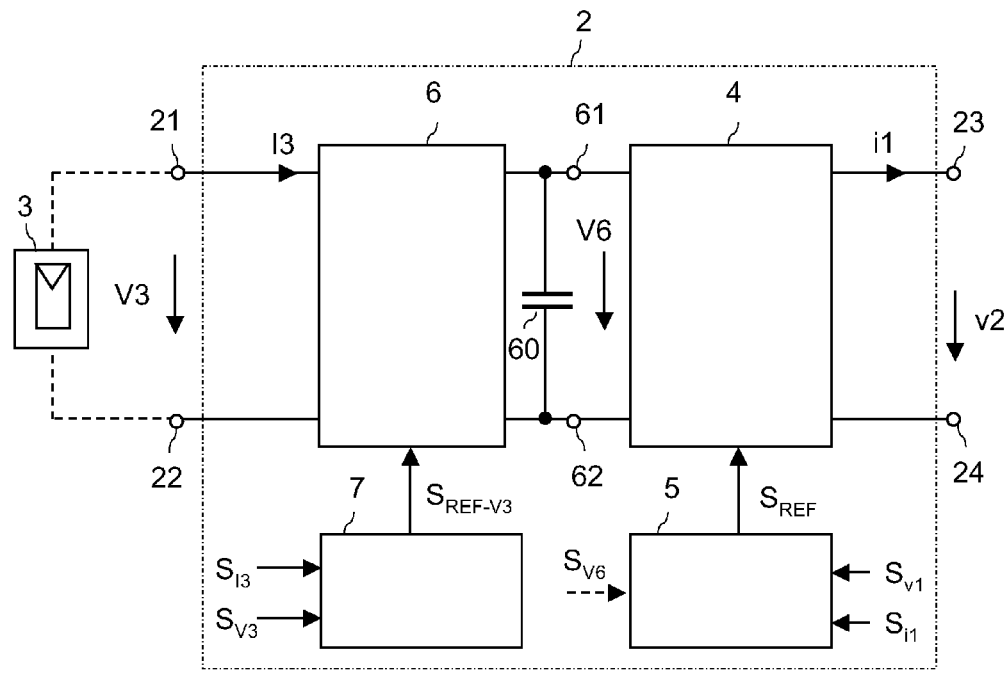
FIG. 11 shows a block diagram illustrating a second embodiment of one converter unit, including a DC/DC converter, a maximum power point tracker, a DC/AC converter, and a control circuit.

FIG. 11 illustrates a further embodiment of one converter unit 2. This converter unit besides the DC/AC converter 4 and the controller 5 includes a DC/DC converter 6 connected between the input terminals 21, 22, and the DC/AC converter 4. The DC/AC converter 4 may be implemented as explained with reference to FIGS. 6 to 10 with the difference that the DC/AC converter 4 of FIG. 11 receives a DC input voltage V6 from the DC/DC converter 6 instead of the input voltage V3 of the converter unit 2. A capacitor 60 connected between the terminals 61, 62 may represent an output capacitor of the DC/DC converter 6 or an input capacitor 4 of the DC/AC converter 4, or both. This capacitor 60 can be referred to as DC link capacitor.

The DC/DC converter 6 is configured to adjust the input voltage V3 or the input current I3 to a voltage or current value, respectively, that is dependent on a reference signal $S_{REF\text{-}v3}$ received by the DC/DC converter 6. For explanation purposes it is assumed that the DC/DC converter 6 adjusts the input voltage V3 dependent on the reference signal $S_{REF\text{-}V3}$. Adjusting the input voltage V3 of the converter unit 2 may help to operate the DC power source 3 connected to the input terminals 21, 22, in an optimum operating point. This will be explained in the following.

A solar cell and, therefore, a PV module including several solar cells, acts like a power generator providing a DC output voltage and a DC output current when it is exposed to sunlight. For a given light power received by the PV array there is a range of output currents and a range of corresponding output voltages at which the PV array can be operated. However, there is only one output current and one corresponding output voltage at which the electric power provided by the PV array has its maximum. The output current and the output voltage at which the output power assumes its maximum define the maximum power point (MPP). The MPP varies dependent on the light power received by the array and dependent on the temperature.

Referring to FIG. 11, the converter unit 2 further includes a maximum power point tracker (MPPT) 7 that is configured to provide the reference signal $S_{REF\text{-}V3}$ such that DC/DC converter 6 adjusts the input voltage such that the DC source 3 is operated in its MPP. The MPPT 7 receives an input current signal $S_{I3}$ that represents the input current I3 provided by the DC source 3 (illustrated in dashed lines in FIG. 9), and an input voltage signal $S_{V3}$ that represents the input voltage V3 provided by the DC source 3. From the input current signal $S_{I3}$ and the input voltage signal $S_{V3}$ the MPPT 7 calculates the instantaneous input power provided by the DC source 3. The input voltage signal $S_{V3}$ can be obtained from the input voltage V3 in a conventional manner by, for example, using a voltage measurement circuit. Equivalently, the input current signal $S_{I3}$ can be obtained from the input current I3 in a conventional manner using, for example, a current measurement circuit. Those voltage measurement circuits and current measurement circuits are commonly known and are not illustrated in FIG. 11.

The basic operating principle of the MPPT 7 in order to find the MPP is to vary the reference signal $S_{REF\text{-}V3}$ within a given signal range and to determine the input power provided by the DC source 3 for each of the input voltages V3 defined by the different reference signals $S_{REF\text{-}V3}$. The MPPT 7 is further configured to detect the input voltage V3 for which the maximum input power has been obtained, and to finally set the reference signal $S_{REF\text{-}V3}$ to that value for which the maximum input power has been detected.

Since the solar energy received by the PV array 3 may vary the MPPT 7 is further configured to check whether the DC source 3 is still operated in its maximum power point either regularly or when there is an indication that the maximum power point might have changed. An indication that the maximum power point might have changed is, for example, when the input current I3 represented by the input current signal $S_{I3}$ changes without the reference signal $S_{REF\text{-}V3}$ having changed. The regular check or the event-driven check of the MPPT 7 whether the DC source 3 is still operated in its maximum power point, may include the same algorithm that has been explained before for detecting the maximum power point for the first time. Conventional algorithms for detecting the maximum power point that can be implemented in the MPPT 7 include, for example, a "hill climbing algorithm" or a "perturb-and-observe algorithm."

Figure 12:
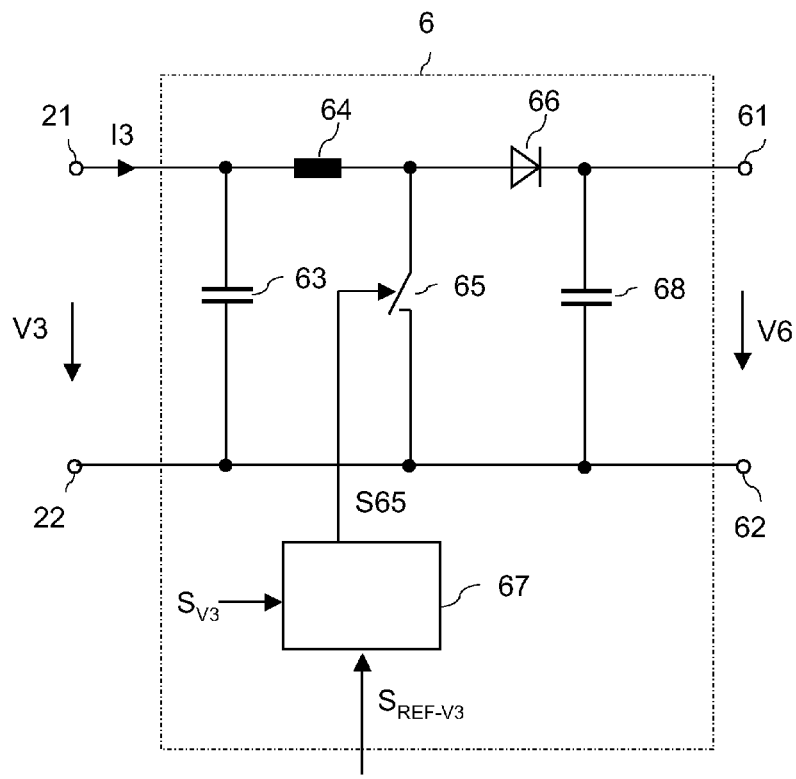
FIG. 12 illustrates an embodiment of the DC/DC converter implemented as a boost converter.

The DC/DC converter 6 can be implemented like a conventional DC/DC converter. A first embodiment of a DC/DC converter 6 that can be used in the converter unit 2 is illustrated in FIG. 12. The DC/DC converter 6 illustrated in FIG. 12 is implemented as a boost converter. This type of converter includes a series circuit with an inductive storage element 64, such as a choke, and a switch 65 between the input terminals of the DC/DC converter 6, where the input terminals of the DC/DC converter 6 correspond to the input terminals 21, 22 of the converter unit 2. Further, a rectifier element 66, such as a diode, is connected between a circuit node common to the inductive storage element 64 and the switch 65 and a first output terminal 61 of the DC/DC converter 6. A second output terminal 62 of the DC/DC converter 6 is connected to the second input terminal 22. An output voltage V6 of the DC/DC converter is available between the output terminals 61, 62. Referring to FIG. 12, the DC/DC converter 6 may further include a first capacitive storage element 63, such as a capacitor, between the input terminals 21, 22, and a second capacitive storage element 68, such as a capacitor, between the output terminals 61, 62. The second capacitive storage element 68 acts as an energy storage that is necessary when generating the AC output current i1 from the DC voltage V6 available at the output of the DC/DC converter 6.

The switch 65 can be implemented as a conventional electronic switch, such as a MOSFET or an IGBT. Further, the rectifying element 66 could be implemented as a synchronous rectifier, which is a rectifier implemented using an electronic switch, such as a MOSFET or an IGBT. According to a further embodiment, the switch 65 is implemented as GaN-HEMT.

The DC/DC converter 6 further includes a control circuit (controller) 67 for generating a drive signal S65 for the switch 65. This drive signal S65 is a pulse-width modulated (PWM) drive signal. The PWM controller 67 is configured to adjust the duty cycle of this drive signal S65 such that the input voltage V3 corresponds to the desired input voltage as represented by the reference signal $S_{REF\text{-}V3}$. For this, the control circuit 67 receives the reference signal $S_{REF\text{-}V3}$ and the input voltage signal $S_{V3}$ that represents the input voltage V3.

Figure 13:
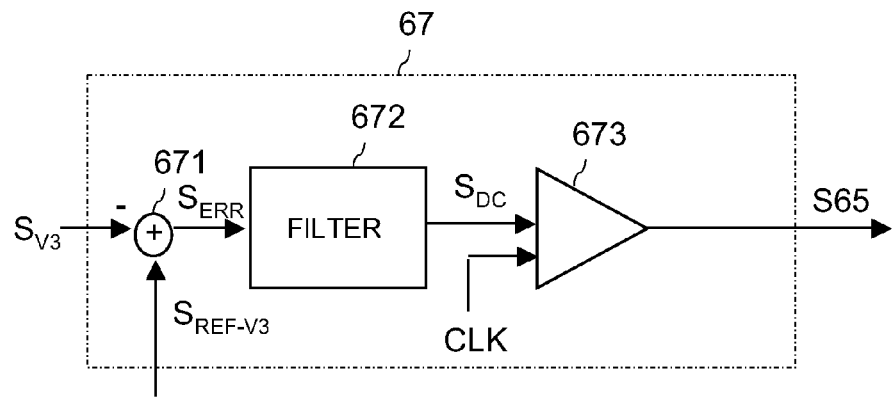
FIG. 13 schematically illustrates a control circuit of the DC/DC converter of FIG. 12.

A first embodiment of the PWM control circuit 67 is illustrated in FIG. 13. Like in FIG. 8 (which illustrates an embodiment of the controller 5) in FIG. 11 functional blocks of the controller 67 are illustrated. These functional blocks can be implemented as analog circuits, as digital circuits or can be implemented using hardware and software. Referring to FIG. 13, the control circuit 67 calculates an error signal $S_{ERR}$ from the input voltage signal $S_{V3}$ and the reference signal $S_{REF-V3}$. The error signal $S_{ERR}$ is calculated by either subtracting the input voltage signal V3 from the reference signal $S_{REF-V3}$ (as illustrated) or by subtracting the reference signal $S_{REF-V3}$ from the input voltage signal $S_{V3}$. The error signal $S_{ERR}$ is provided by a subtraction element 671 that receives the input voltage signal $S_{V3}$ and the reference signal $S_{REF-V3}$.

The error signal $S_{ERR}$ is received by a filter 672 that generates a duty cycle signal $S_{DC}$ from the error signal $S_{ERR}$. The duty cycle signal $S_{DC}$ represents the duty cycle of the drive signal S65 provided by the control circuit 67. The filter 672 can be a conventional filter for generating a duty cycle signal $S_{DC}$ from an error signal $S_{ERR}$ in a PWM controller of a DC/DC converter, such as a P-filter, a PI-filter, or a PID-filter.

A PWM driver 673 receives the duty cycle signal $S_{DC}$ and a clock signal CLK and generates the drive signal S65 as a PWM signal having a switching frequency as defined by the clock signal CLK and a duty cycle as defined by the duty cycle signal $S_{DC}$. This driver 673 can be a conventional PWM driver that is configured to generate a PWM drive signal based on a clock signal and a duty cycle information. Such drivers are commonly known, so that no further information are required in this regard.

The basic control principle of the controller 67 of FIG. 12 will briefly be explained. Assume that the input voltage V3 has been adjusted to a given value represented by the reference signal $S_{REF-V3}$ and that the reference signal $S_{REF-V3}$ changes, so that the input voltage V3 has to be re-adjusted. For explanation purposes it is assumed that the input voltage V3 is to be increased as defined by the reference signal $S_{REF-V3}$. In this case the control circuit 67 reduces the duty cycle of the drive signal S65. Reducing the duty cycle of the drive signal S65 results in a decreasing (average) input current I3, where decreasing the input current I3, at a given power provided by the DC source 3 results in an increasing input voltage V3. Equivalently, the duty cycle is increased when the input voltage V3 is to be decreased. An increase in the duty cycle results in an increase of the input current I3.

The boost converter according to FIG. 12 does not only provide a load to the DC source 3 in order to operate the DC source 3 in its maximum power point. This boost converter also generates an output voltage V6 received by the DC/AC converter 4 (see FIG. 11) that is higher than the input voltage V3. Further, the boost converter is implemented such that the output voltage V6 is higher than a peak voltage of the output voltage v2 of the DC/AC converter, but lower than a voltage blocking capability of the switches (see $42_1$-$42_4$ in FIG. 6) implemented in the DC/AC converter.

Figure 14:
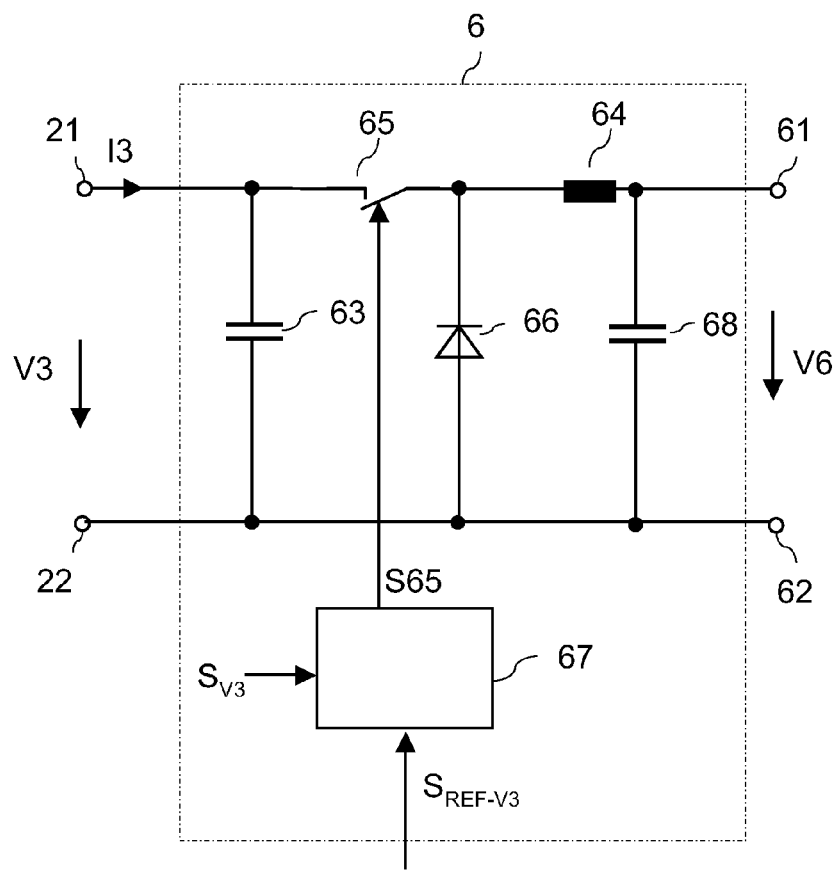
FIG. 14 illustrates an embodiment of the DC/DC converter implemented as a buck converter.

Referring to FIG. 14, the DC/DC converter 6 may also be implemented as a buck converter. This buck converter includes a series circuit with an inductive storage element 64, such as a choke, and a switch 65 between the first input terminal 21 and the first output terminal 61. A freewheeling element 66, such as a diode, is connected between the second output terminal 62 and a circuit node common to the inductive storage element 64 and the switch 65. A capacitive storage element 63, such as a capacitor, is connected between the input terminals 21, 22.

Like in the boost converter of FIG. 12, the switch 65 in the buck converter of FIG. 14 can be implemented as a conventional electronic switch, such as a MOSFET or an IGBT, or could be implemented as a GaN-HEMT. Further, the freewheeling element 66 could be implemented as a synchronous rectifier.

Like in the boost converter according to FIG. 12, the switch 65 in the buck converter according to FIG. 14 is driven by a PWM drive signal S65 provided by a control circuit 67. The control circuit 67 may be implemented as illustrated in FIG. 13. The operating principle of the control circuit 67 in the buck converter of FIG. 14 is the same as in the boost converter of FIG. 12, i.e., the duty cycle of the drive signal S65 is increased when the input voltage V3 is to be decreased, and the duty cycle is decreased, when the input voltage V3 is to be increased.

It should be noted that implementing the DC/DC converter 6 as a boost converter (see FIG. 12) or as a buck converter (see FIG. 14) is only an example. The DC/DC converter 6 could also be implemented as a buck-boost converter, a boost-buck-converter, a flyback converter, and so on. Whether a boost converter or a buck converter is used as a DC/DC converter for tracking the maximum power point of the DC source 3 and for providing the input voltage V6 to the DC/AC converter 4, influences the number of converter units 2 to be connected in series in order for the sum of the output voltages v2 of the converter units 2 to correspond to the external AC voltage v1. This will be explained by the way of an example in the following.

Assume that there is an external AC voltage v1 with $240V_{RMS}$ is desired. The peak voltage (maximum amplitude) of this voltage v1 is 338V (240V·sqrt(2), where sqrt is the square root). Further assume that the DC sources 3 are PV arrays each providing an output voltage between 24V and 28V when exposed to sunlight. The DC/AC converter 4 has a buck characteristic, which means that the peak value of the output voltage v2 (see FIG. 4) is less than the received DC input voltage V3 or V6, respectively. Thus, when buck converters are employed as DC/DC converters 6 in the converter units 2 or when no DC/DC converters are used, at least 15 converter units 2 with PV panels connected thereto need to be connected in series. This is based on the assumption that each PV array generates a minimum voltage of V3=24V and that a peak voltage of the external AC voltage v1 is 338V. The number of 15 is obtained by simply dividing 338V through 24V (338V/24V=14.08) and rounding the result to the next higher integer.

When, however, a boost converter is used as the DC/DC converter 6 that, for example, generates an output voltage V6=60V from the input voltage V3 (which is between 24V and 28V) the number of converter units 2 to be connected in series may be reduced to about 6.

In the DC/AC converter illustrated in FIG. 11, the output voltage V6 of the DC/DC converter may vary dependent on the input power received at the input terminals 21, 22 from the DC source 3 and dependent on the output current i1 or, more exactly, dependent on the average of the output current i1. According to a further embodiment illustrated in FIG. 15, the control circuit 5 is further configured to control the input voltage of the DC/AC converter 4 and the output voltage of the DC/DC converter 6, respectively. For this, the control circuit 5 receives an input voltage signal $S_{V6}$ that represents the input voltage V6. The control circuit 5 is configured to adjust the input voltage V6 by varying the duty cycle of those switches in the DC/AC converter 4 that are driven in a clocked fashion. The input voltage can be increased by generally decreasing the duty cycle and can be decreased by generally increasing the duty cycle. For this, the control circuit 5 includes a further control loop, where this control loop is slower than the control loop that causes the output current i1 to follow the reference signal $S_{REF}$. This control loop is, for example configured to cause variations of the duty cycle at a frequency of between 1 Hz and 10 Hz.

Figure 15:
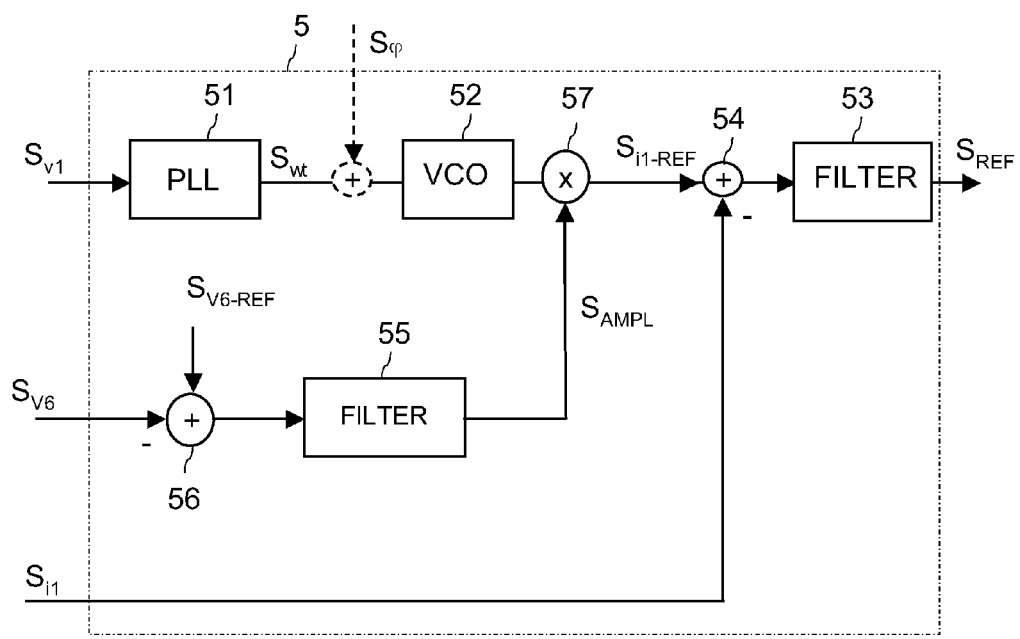
FIG. 15 illustrates a further embodiment of the control circuit of one DC/AC converter.

The control circuit 5 of FIG. 15 is based on the control circuit illustrated in FIG. 8 and additionally includes a further control loop that serves to adjust the amplitude of the output current reference signal $S_{i1\text{-}REF}$ dependent on the input voltage signal $S_{V6}$. Instead of the control loop illustrated in FIG. 8, the control circuit according to FIG. 15 could also be implemented based on the control circuit of FIG. 10. Referring to FIG. 15, the control loop includes: a further subtraction element 56, a filter 55, and a multiplier 57. The subtraction element 56 receives the input voltage signal $S_{V6}$ and a reference signal $S_{V6\text{-}REF}$ that represents a set value of the input voltage V6. The subtraction element 56 generates a further error signal based on a difference between the input voltage signal $S_{V6}$ and the reference signal $S_{V6\text{-}REF}$. The filter 55 receives the further error signal and generates an amplitude signal $S_{AMPL}$ representing an amplitude of the reference signal $S_{REF}$ from the further error signal. The filter may have a P-characteristic, an I-characteristic, a PI-characteristic, or a PID-characteristic. The amplitude signal $S_{AMPL}$ and the output signal of the VCO 52 are received by the multiplier 57 that provides the output current reference signal $S_{i1\text{-}REF}$. The output current reference signal $S_{i1\text{-}REF}$ has an amplitude that is dependent on the input voltage V6 and that serves to control the input voltage V6 of the DC/AC converter (4 in FIG. 11), and a frequency and phase of the output current i1. The frequency and the phase of the reference signal $S_{REF}$ are dependent on the at least one measurement signal $S_{V1}$ and the output current signal $S_1$ and serve to adjust frequency and phase of the output current i1 such that there is a given phase difference between the output current and the output voltage.

The input voltage reference signal $S_{V6\text{-}REF}$ may have a fixed value that is, selected such that the input voltage V6 is sufficiently below the voltage blocking capability of switches employed in the DC/AC converter. However, it is also possible to vary the input voltage reference signal $S_{V6\text{-}REF}$ dependent on the output current, specifically on the rms value of the output current i1. According to one embodiment, the input voltage reference signal $S_{V6\text{-}REF}$ decreases when the output current i1 increases, and the input voltage reference signal $S_{V6\text{-}REF}$ increases when the output current decreases. According to one embodiment, the input voltage reference signal $S_{V6\text{-}REF}$ has a first signal value when the output current i1 is below a given threshold value, and has a lower second signal value when the output current i1 is above a given threshold value.

The control circuit illustrated in FIG. 15 could also be implemented in a converter as illustrated in FIG. 6 in which the DC/DC converter is omitted. In this case, the input voltage to be controlled is the output voltage V3 of the PV module, so that the voltage signal $S_{V6}$ in FIG. 15 is replaced by the voltage signal $S_{V3}$ representing the output voltage of the DC source 3, and the input voltage reference signal $S_{V6\text{-}REF}$ is replaced by the reference signal $S_{V3\text{-}REF}$ defining a desired output voltage of the DC source 3. The input voltage reference signal $S_{V3\text{-}REF}$ may in this case be provided by an MPPT in order to operate the DC source (PV module) 3 in its MPP.

Figure 16:
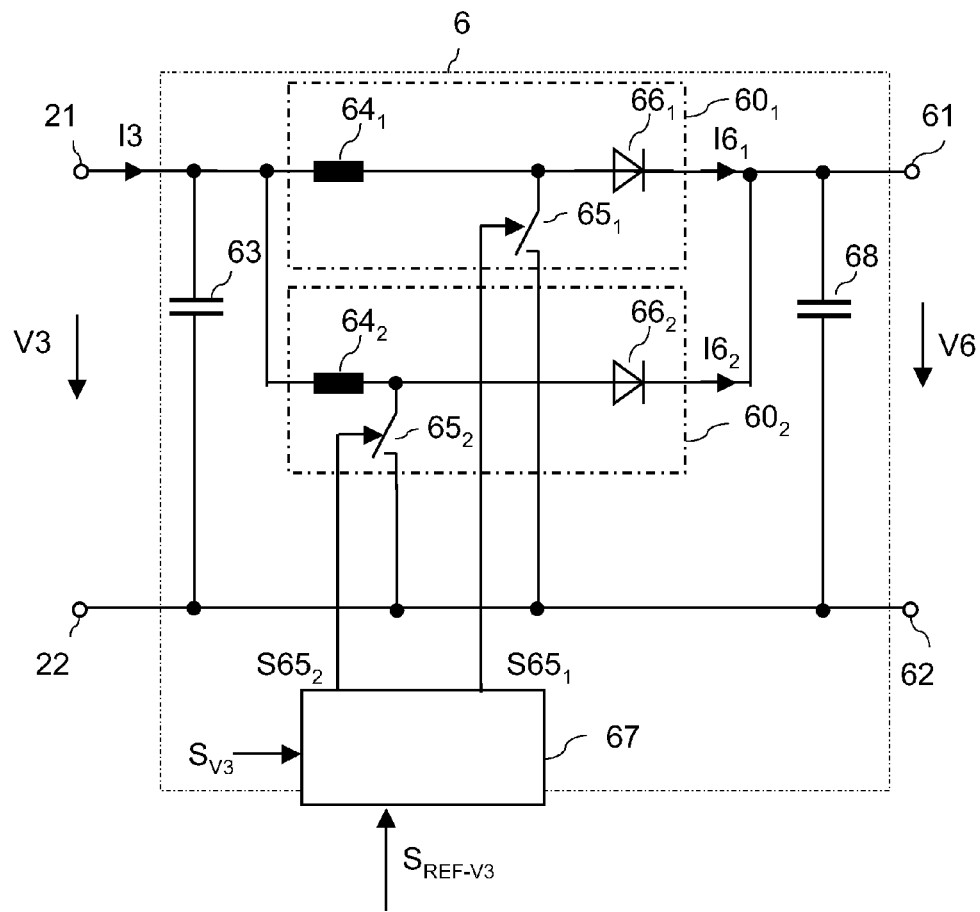
FIG. 16 illustrates an embodiment of the DC/DC converter implemented with two interleaved boost converter stages.

FIG. 16 illustrates a further embodiment of DC/DC converter 6 that can be implemented in a DC/AC converter unit 2 of FIG. 11. The DC/DC converter of FIG. 16 is implemented as a boost converter with two converter stages $60_1$, $60_2$. The two converter stages $60_1$, $60_2$ are connected in parallel between the input terminals 21, 22 and the output terminals 61, 62. Each of the converter units $60_1$, $60_2$ is implemented like the boost converter of FIG. 12 and includes a series circuit with an inductive storage element $64_1$, $64_2$, such as a choke, and a switch $65_1$, $65_2$ between the input terminals of the DC/DC converter 6, where the input terminals of the DC/DC converter 6 correspond to the input terminals 21, 22 of the converter unit 2. Further, each converter stage includes a rectifier element $66_1$, $66_2$ such as a diode, connected between a circuit node common to the corresponding inductive storage element $64_1$, $64_2$ and the corresponding switch $65_1$, $65_2$ and the first output terminal 61 of the DC/DC converter 6. The second output terminal 62 of the DC/DC converter 6 is connected to the second input terminal 22.

The two converter stages $60_1$, $60_2$ share the first capacitive storage element 63 between the input terminals 21, 22, and share the second capacitive storage element 68 between the output terminals 61, 62. The output voltage V6 of the DC/DC converter 6 is available across the second capacitive storage element 68.

Referring to FIG. 16, the control circuit (controller) 67 of the DC/DC converter 6 generates two PWM drive signals $S65_1$, $S65_2$, namely a first drive signal $S65_1$ for the switch $65_1$ of the first converter stage $60_1$, and a second drive signal $S65_2$ for the switch $65_2$ of the second converter stage $60_2$. According to one embodiment, the first and second boost converter stages $60_1$, $60_2$ are operated interleaved, which means that there is a time offset between the switching cycles of the first switch $65_1$ and the switching cycles of the second switch $65_2$. Providing two converter stages $60_1$, $60_2$ and operating these converter stages $60_1$, $60_2$ in an interleaved mode helps to reduce voltage ripples of the input voltage V3 and the output voltage V6 of the DC/DC converter 6. Of course, more than two boost converter stages $60_1$, $60_2$ can be connected in parallel.

Figure 17:
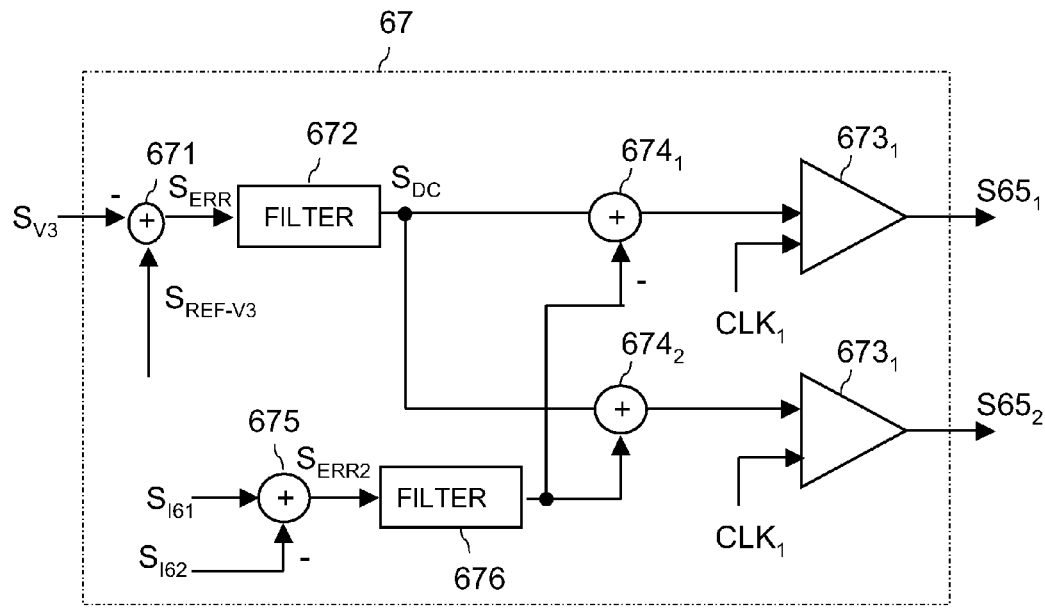
FIG. 17 illustrates a first embodiment of a control circuit for the DC/DC converter of FIG. 16.

Referring to FIG. 16, each boost converter stage $60_1$, $60_2$ provides an output current $I6_1$, $I6_2$. These output currents $I6_1$, $I6_2$ add and form the overall output current I6 of the DC/DC converter. FIG. 17 illustrates a first embodiment of the controller 67 configured to generate PWM drive signals $565_1$, $565_2$ for each converter stage $60_1$, $60_2$, and further configured to generate the PWM drive signals $565_1$, $S65_2$ such that the output currents $I6_1$, $I6_2$ of the converter stages $60_1$, $60_2$ are balanced.

Referring to FIG. 17 the control circuit 67 is based on the control circuit 67 of FIG. 13 and includes the subtraction element 671 receiving the input voltage signal $S_{V3}$ and the input voltage reference signal $S_{REF\text{-}V3}$ and the filter 672 for providing the duty cycle signal $S_{DC}$. The controller 67 of FIG. 17 further includes a first PWM driver $673_1$ receiving a first duty cycle signal $S_{DC1}$ that is dependent on the duty cycle signal $S_{DC}$ provided by the filter 672 and receiving a first clock signal $CLK_1$, and a second PWM driver $673_1$ receiving a second duty-cycle signal $S_{DC2}$ that is dependent on the duty cycle signal $S_{DC}$ provided by the filter 672 and receiving a second clock signal $CLK_2$. According to one embodiment, the first and second clock signals $CLK_1$, $CLK_2$ have the same frequency. However, there is a phase shift between the first and second clock signal $CLK_1$, $CLK_2$, so that there is a phase shift between the first PWM drive signal $565_1$ provided by the first PWM driver $673_1$ and the second PWM drive signal $S65_2$ provided by the second PWM driver $673_2$.

If the first and second converter stages $60_1$, $60_2$ would perfectly match so that there would be no risk of unbalanced output currents $I6_1$, $I6_2$, the duty cycle signal $S_{DC}$ could be used as the first duty cycle signal $S_{DC1}$ and as the second duty cycle signal $S_{DC2}$. However, due to an inevitable mismatch of the components in the converter stages $60_1$, $60_2$ the output currents $I6_1$, $I6_2$ can be unbalanced when the first and second drive signal $S65_1$, $S65_2$ would be generated with exactly the same duty cycle.

In order to compensate for such unbalances of the first and second output currents $I6_1$, $I6_2$, the controller 67 of FIG. 17 includes an additional control loop, that can be referred to as current balancing loop or power balancing loop. This control loop receives a first output current signal $S_{I61}$ representing the first output current $I6_1$ of the first converter stage $60_1$, and a second output current signal $S_{I62}$ representing the output current $I6_2$ of the second converter stage $60_2$. These output current signals $S_{I61}$, $S_{I62}$ can be generated using conventional current measurement units. The output current signals $S_{I61}$, $S_{I62}$ are received by a subtraction unit 675 that generates a further error signal $S_{ERR2}$. The further error signal $S_{ERR2}$ is representative of a difference between the first and second output currents $I6_1$, $I6_2$. Further error signal $S_{ERR2}$ is received by a filter 676 that generates a filtered error signal. The filter 676 may have a P-characteristic, a I-characteristic, or a PI-characteristic.

A further subtraction unit $674_1$ subtracts the filtered error signal from the duty cycle signal $S_{DC}$ to generate the first duty cycle signal $S_{DC1}$, and an adder $674_2$ adds the filtered error signal to the duty cycle signal DC to generate the second duty cycle signal $S_{DC2}$.

The operating principle of the controller 67 of FIG. 17 is as follows. When the first and second output currents $I6_1$, $I6_2$ are identical, the further error signal $S_{ERR2}$ is zero. In this case, the first duty cycle signal $S_{DC1}$ corresponds to the second duty cycle signal $S_{DC2}$. When, for example, the first output current $I6_1$ is larger than the second output current $I6_2$, the further error $S_{ERR2}$ and the filtered error signal have a positive value. In this case, the duty cycle signal $S_{DC1}$ (obtained by subtracting the filtered error signal from the duty cycle signal $S_{DC}$) becomes smaller than the second duty cycle signal $S_{DC2}$ (obtained by adding the filtered error signal to the duty cycle signal $S_{DC}$). Thus, the duty cycle of the first drive signal $S65_1$ becomes smaller than the duty cycle of the second drive signal $S65_2$ in order to reduce the first output current $I6_1$ and to increase the second output current $I6_2$, so as to balance these output currents $I6_1$, $I6_2$.

Figure 18:
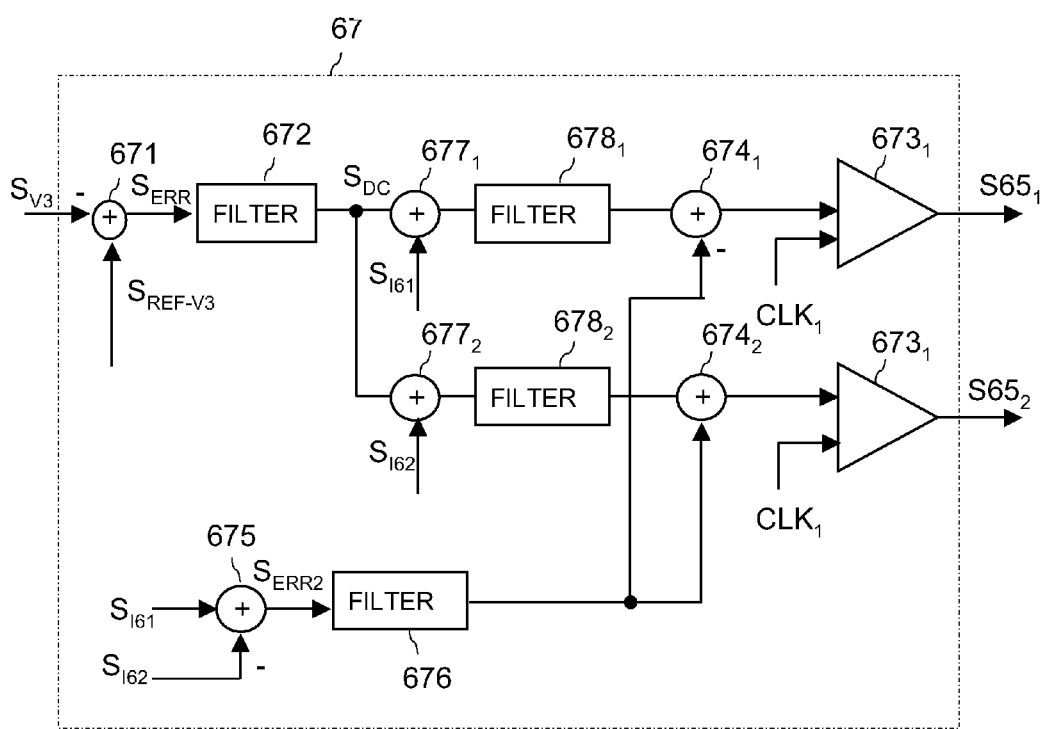
FIG. 18 illustrates a second embodiment of a control circuit for the DC/DC converter of FIG. 16.

FIG. 18 illustrates a further embodiment of the control circuit 67 that is configured to balance the output currents $I6_1$, $I6_2$. The control circuit 67 of FIG. 18 is based on the control circuit 67 of FIG. 17. In the control circuit 67 of FIG. 18, the subtraction unit $674_1$ that generates the first duty cycle signal $S_{DC1}$ does not receive the duty cycle signal $S_{DC}$ but receives a filtered version of a difference between the duty cycle signal $S_{DC}$ and the first output current signal $S_{I61}$. A subtraction unit $677_1$ calculates the difference and a filter $678_1$, filters the difference. The filter may have a P-characteristic, an I-characteristic or PI-characteristic. Equivalently, the adder $674_2$ that provides the second duty cycle signal $S_{DC2}$ does not receive the duty cycle signal $S_{DC}$ but receives a filtered difference between the duty cycle signal $S_{DC}$ and the second input current signal $S_{I62}$. A subtraction unit $677_2$ calculates the difference between the duty cycle signal $S_{DC}$ and the second output current signal $S_{I62}$, and a filter $678_2$ filters the difference. The output signals of the filter $678_1$, $678_2$ are received by the subtraction unit $674_1$ and the adder $674_2$, respectively.

While in the embodiment illustrated in FIG. 17 a single control loop is employed to regulate the input voltage V3, a dual control loop structure is employed in the embodiment according to FIG. 18.

Figure 19:
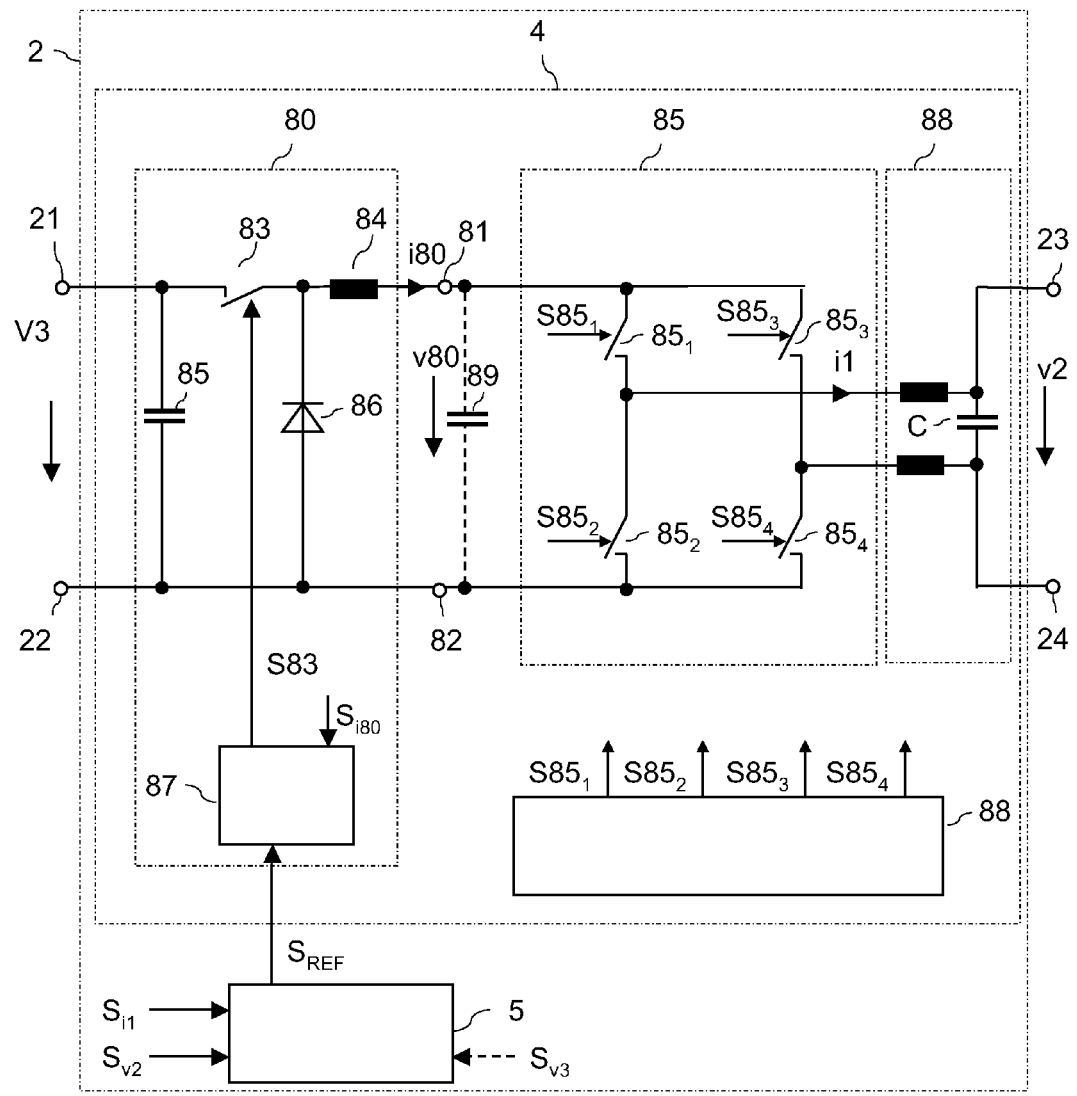
FIG. 19 shows a block diagram illustrating a further embodiment of one DC/AC converter unit including a buck converter and an unfolding bridge.

FIG. 19 illustrates a further embodiment of a converter unit 2 with a DC/AC converter 4. The converter unit 2 may further include a DC/DC converter 6 (see FIG. 9) connected between the input terminals 21, 22 and the DC/AC converter. However, such DC/DC converter is not illustrated in FIG. 13. Dependent on whether or not the converter unit 2 includes a DC/DC converter the DC/AC converter 4 receives the input voltage V3 of the converter unit 2 or the output voltage of the DC/DC converter 4 (not illustrated in FIG. 19) as an input voltage. Just for explanation purposes it is assumed that the DC/AC converter 4 receives the input voltage V3.

Figure 20:
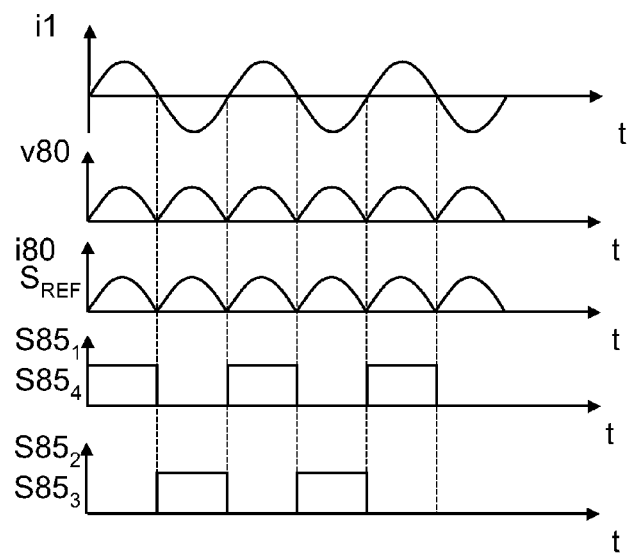
FIG. 20 shows timing diagrams illustrating the operating principle of the DC/AC converter unit of FIG. 19.

The DC/AC converter of FIG. 19 includes a buck converter 80 that receives the input voltage V3 as an input voltage. The buck converter 80 is configured to generate an output current i80 which is a rectified version of the output current i1 of the DC/AC converter 4. Assume, for example that a desired waveform of the output current i1 is a sinusoidal waveform. In this case, the output current i80 provided by the converter 80 has the waveform of a rectified sinusoidal curve or the waveform of the absolute value of a sinusoidal curve, respectively. This is schematically illustrated in FIG. 20, in which exemplary timing diagrams of a sinusoidal output current i1 and the corresponding output current i80 of the converter 80 are illustrated.

The output current i1 of the DC/AC converter 4 is produced from the output current i80 of the buck converter 80 using a bridge circuit 85 with two half-bridges, where each of these half-bridges is connected between output terminals 81, 82 of the buck converter 80. This bridge circuit 85 can be referred to as unfolding bridge. A first half-bridge includes a first and a second switch $85_1$, $85_2$ connected in series between the output terminals 81, 82, and a second half-bridge includes a third switch $85_3$ and a fourth switch $85_4$ connected in series between the output terminals 81, 82. An output terminal of the first half-bridge, which is a circuit node common to the first and second switches $85_1$, $85_2$ is coupled to the first output terminal 23. An output terminal of the second half-bridge, which is a circuit node common to the third and fourth switch $85_3$, $85_4$ is coupled to the second output terminal 24 of the converter unit 2. Optionally, an EMI filter 88 with two inductances, such as chokes, is coupled between the output terminals of the half-bridges and the output terminals 23, 24 of the converter unit 2. The output capacitance C of the converter unit 2 that is connected between the output terminals can be part of the EMI filter 88.

Referring to FIG. 19, the output current i80 of the buck converter 80 has a frequency which is twice the frequency of the output current i1. A switching frequency of the switches $85_1$-$85_4$ of the bridge circuit 85 corresponds to the frequency of the output current i1. During a positive half-cycle of the output current i1 the first and fourth switch $85_1$, $85_4$ are switched on, and during a negative half-cycle of the output voltage v2 the second and third switches $85_2$, $85_3$ are switched on. The switches of the bridge circuit 85 are driven by drive signals $S85_1$-$S85_4$ generated by a drive circuit 88. Timing diagrams of these drive signals $S85_1$-$S85_4$ are also illustrated in FIG. 20. In FIG. 20, a high signal level of these timing diagrams represents an on-level of the corresponding drive signal $S85_1$-$S85_4$. An on-level of the drive signal is a signal level at which the corresponding switch is switched on. The drive signals $S85_1$-$S85_4$ may, for example, be generated dependent on the output voltage v80 of the buck converter 80, where, according to one embodiment, drive circuit 88 changes the switching state of the switches each time the output voltage v80 has decreased to 0. "Changing the switching state" means either switching the first and the fourth switches $85_1$, $85_4$ on and the other two switches off, or means switching the second and the third switch $85_2$, $85_3$ on and the other two switches off.

The buck converter 8 may have a conventional buck converter topology and may include a switch 83 connected in series with an inductive storage element 84, where the series circuit is connected between the first input terminal 21 of the converter unit 2 or the first output terminal 61 of a DC/DC converter (not shown), and the first output terminal 81 of the buck converter 80, respectively. A rectifier element 86 is connected between the second output terminal 82 (corresponding to the second input terminal 22) of the buck converter and a circuit node common to the switch 83 and the inductive storage element 84. The switch 83 can be implemented as a conventional electronic switch, such as a MOSFET or an IGBT, or as a GaN-HEMT. The rectifier element 86 can be implemented as a diode or as a synchronous rectifier. Further, a capacitive storage element 85, such as a capacitor, is connected between the input terminals of the buck converter 80, and an optional smoothing capacitor 89 is connected between the output terminals 81, 82.

The switch 83 of the buck converter 80 is driven by a PWM drive signal S83 generated by a control circuit or controller 87. The controller 87 of the buck converter 80 receives the reference signal $S_{REF}$ from the controller 5 of the converter unit 2. The controller 87 of the buck converter 80 is configured to generate its output current i80 in correspondence with the reference signal $S_{REF}$. This reference signal $S_{REF}$ according to FIG. 19, unlike the reference signal $S_{REF}$ of FIG. 11, does not have the waveform of the output current i1, but has the waveform of the rectified output current i1. This reference signal $S_{REF}$ is also generated from the measurement signal $S_{V1}$ and the output current signal $S_{i1}$.

Figure 21:
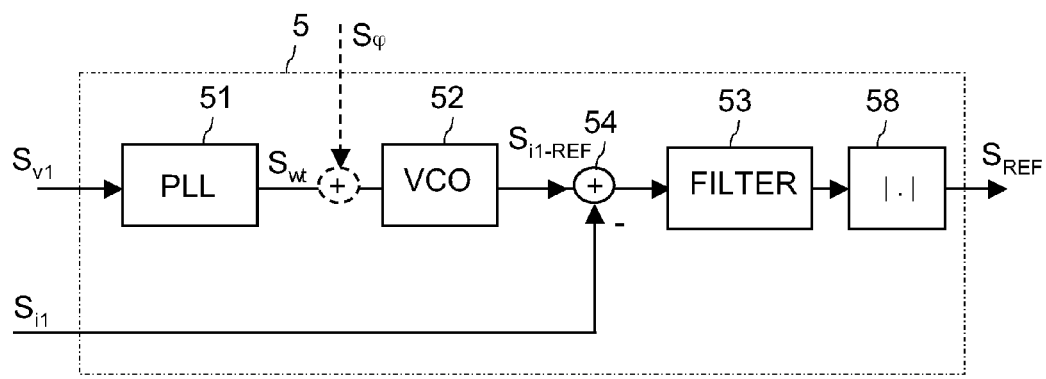
FIG. 21 illustrates a first embodiment of a controller implemented in the DC/AC converter unit of FIG. 19.

The controller 5 for generating the reference signal $S_{REF}$ according to FIG. 19 may correspond to the controllers illustrated in FIGS. 8 and 15 with the difference that the oscillating signal provided at the output of the oscillator 53 is rectified. An embodiment of the controller 5 according to FIG. 19 is illustrated in FIG. 21. This controller 5 corresponds to the controller according to FIG. 8 with the difference that the output signal of the filter 53 is received by a rectifier 58 that generates a rectified version of the oscillating output signal of the oscillator 53. Mathematically this is equivalent to forming the absolute value of the oscillating output signal of the oscillator 53. The reference signal $S_{REF}$ is available at the output of the rectifier 58.

Figure 22:
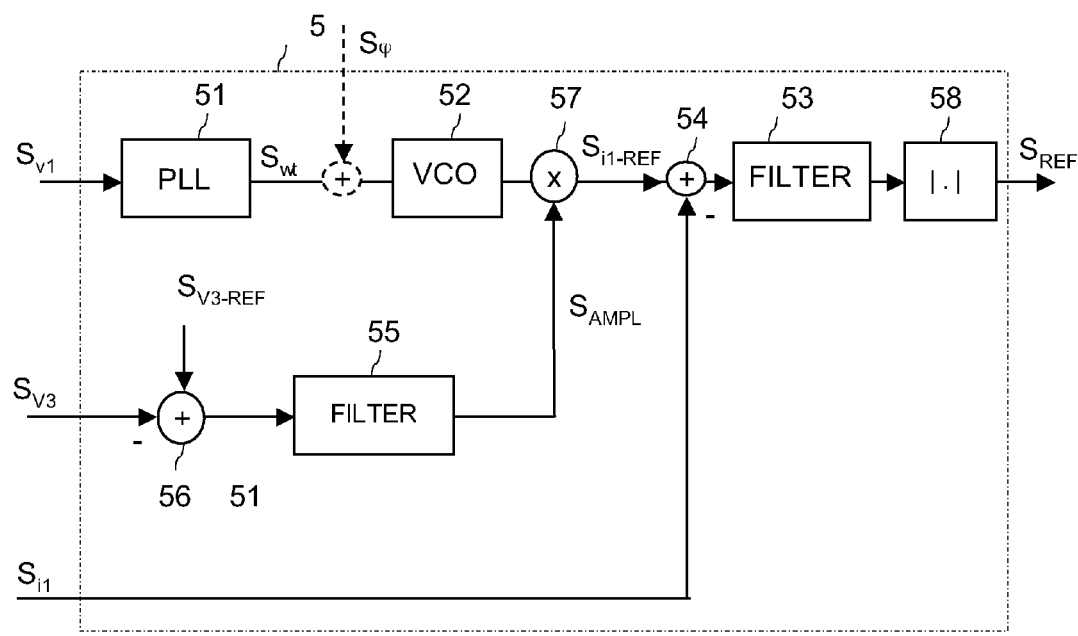
FIG. 22 illustrates a second embodiment of a controller implemented in the DC/AC converter unit of FIG. 19.

FIG. 22 illustrates a further embodiment of a controller 5 that can be implemented in the DC/AC converter 4 of FIG. 19. The controller 5 of FIG. 22 is based on the controller 5 of FIG. 15 with the difference that the amplitude signal $S_{AMPL}$ is generated from the input voltage signal $S_{V3}$ voltage signal $S_{V3}$ that represents the input voltage V3 provided by the DC source 3, and from the input voltage reference signal $S_{REF-V3}$. The input voltage reference signal $S_{REF-V3}$ can be generated by an MPPT, such as an MPPT 7 explained with reference to FIG. 11.

The control loops illustrated in FIGS. 15, 21 and 22 could, of course, be amended to be based on the control loop structure of FIG. 10 instead of FIG. 8.

Referring to FIG. 19, the controller 87 of the buck converters 80 can be implemented like a conventional controller for providing a PWM drive signal in a buck converter. The controller 86 receives the reference signal $S_{REF}$ and an output current signal $S_{i80}$, where the output current signal $S_{i80}$ represents the output current vi80 of the buck converter 80. The controller 86 is configured to vary the duty cycle of the drive signal S83 such that the output current i80 of the buck converter 80 is in correspondence with the reference signal $S_{REF}$. The functionality of this controller 86 corresponds to the functionality of the controller 67 illustrated in FIG. 13. In the embodiment illustrated in FIG. 19 the controller receives the output current signal $S_{i1}$ representing the output current i1 and the measurement signal $S_{V1}$ for generating the reference signal $S_{REF}$. However, this is only an example. It would also be possible to generate the reference signal $S_{REF}$ based on signals representing the output voltage v80 and the output current i80 of the buck converter 80. In this case, the reference signal is generated such that output current i80 and the output voltage v80 of the buck converter 80 have a given phase difference.

The operating principle of a power converter circuit 1 including DC/AC converters as illustrated in FIG. 19 will now be explained with reference to FIGS. 1 and 19. The explanation will be based on the assumption that the voltage of the power grid 100 is a sinusoidal voltage so that an output current i1 with a sinusoidal waveform is desired. Further, it is assumed that the input powers of the individual DC/AC converters is zero, while the power grid voltage $v_N$ is applied to the input terminals 11, 12 and the bridge circuits 85 in the individual converter units are in operation. In this case, the smoothing capacitors 89 of the buck converters are connected in series between the output terminals 11, 12. When the individual capacitors 89 have the same size, the voltage across each of these capacitors 89 is 1/n times the power grid voltage $v_N$.

Assume now that the DC/AC converters receive an input power from the PV modules 3 connected thereto. The DC/AC converters then adjust their common output current i1 to be in phase with the external voltage v1 (the power grid voltage). The amplitude of the output current i1 is, in particular, controlled through the input voltage V3, where the current is increased when the voltage V3 increases, and the current is decreased when the voltage V3 decreases.

When the output current i1 provided by one DC/AC converter decreases, a current that corresponds to a difference between the output current i1 and the common current $i1_{OUT}$ is provided by the output capacitor C which causes the voltage v2 across the output capacitor C to decrease until the input power provided to the DC/AC converter corresponds to its output power. A decrease of the voltage v2 across the output capacitor 89 of one DC/AC converter 4 or one converter unit 2 causes an increase of the voltages across the output capacitors of the other converter units. This process proceeds until the converter unit 2 has settled in stable operation point at a lower output current i1. If the other converter units 2 at first continue to run at the same duty cycle, the increase of the voltages across their output capacitors leads to a reduction of their output currents i1 (and hence to a reduction of the common output current) in order to keep their output powers equal their input powers. When the output current i1 provided by one DC/AC converter increases so as to be higher than the common current $i1_{out}$, the corresponding output capacitor C is charged which results in an increase of the voltage across the output capacitor C of the one converter and a decrease of the voltage across the output capacitors of the other converters.

It became obvious from the explanation provided before that besides the control loops in the individual converter units 2 no additional control loop is required in order to control the output voltages of the individual converter units 2. The power converter circuit 1 with the converter units 2 is "self-organizing." Referring to FIG. 1, assume that, for example, in the steady state the input power provided by the first DC source $3_1$ to the first converter unit $2_1$ would drop, for example because the corresponding PV array is shaded. The output voltage $v2_1$ of the corresponding converter unit 2 would then drop, while the output voltages of the other converter units $2_2$, $2_n$ would increase in order to meet the condition defined by equation (1). Further, the common output current $i1_{OUT}$ would decrease. The transient process is as follows. When the input power received by the first converter unit $2_1$ decreases, the common output current $i1_{OUT}$ at first remains unchanged, while the output current $i1_1$ of the first converter unit $2_1$ decreases. The decrease of the output current $i1_1$ and the unchanged common output current $i_{OUT}$ causes a discharging of the output capacitor $C_1$ of the first converter unit $2_1$ so that the output voltage $v2_1$ decreases. A decrease of the output voltage of the first converter unit, however, causes an increase of the output voltages of the other converters, which now decrease their output currents in order to keep their output powers equal their input powers. The transition processes finishes when a "new" common output current $i_{OUT}$ has settled in to which the individual output currents i1 correspond. This is a self-organizing and self-stabilizing process that does not require and additional control loop besides the control loops in the individual converter units 2 disclosed before.

Figure 23:
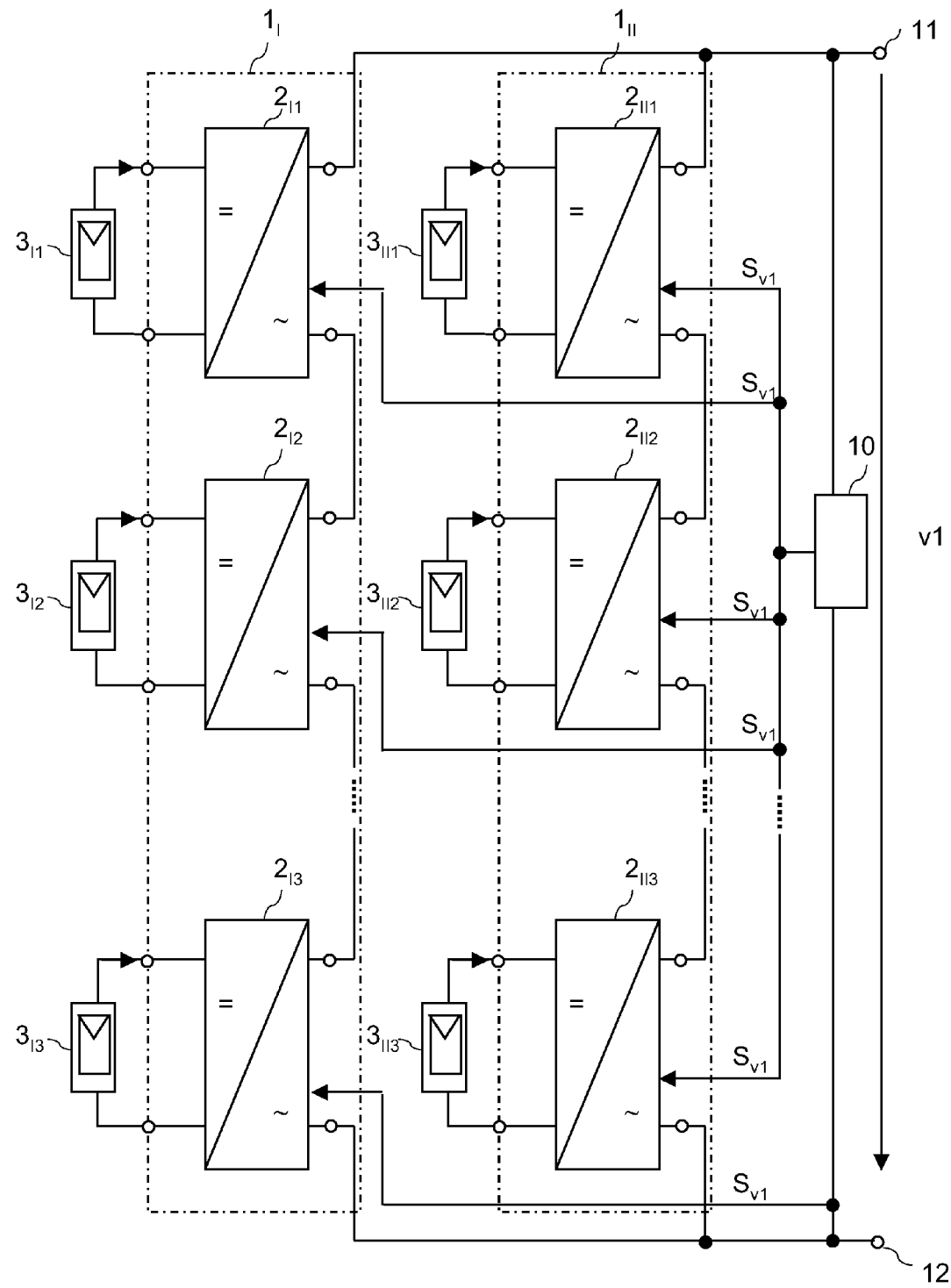
FIG. 23 illustrates an embodiment of a power converter circuit having a plurality of converter units organized in two series circuits being connected in parallel.

FIG. 23 illustrates a further embodiment of a power converter circuit. In this power converter circuit two series circuits $1_I$, $1_{II}$ each including one group with a plurality of converter units $2_{I1}$'-$2_{In}$, and $2_{II1}$-$2_{IIn}$ connected in series are connected in parallel between the output terminals 11, 12. Each of the series circuits $1_I$, $1_{II}$ can be implemented in accordance with the series circuit 1 of converter units $2_1$-$2_n$ explained before. The converter units of the two groups (the two series circuits) are coupled to the same measurement circuit 10 that can be implemented in accordance with one of the embodiments explained before. Of course, more than two series circuits each with a plurality of converter units can be connected in parallel.

The basic concepts of having n converter units 2 connected in series is not restricted to the application explained herein before in which an AC output current to be supplied to a power grid is generated from a plurality of DC input voltages. In this concept, frequency and phase of the AC output current are adjusted to be dependent on frequency and phase of the grid voltage. For example, this concept can also be applied to applications in which an AC output current with a frequency and a phase other than the frequency and phase of a grid voltage is required. Further, the concept is not restricted to be used in connection with DC power sources 3 implemented as PV modules.

Figure 24:
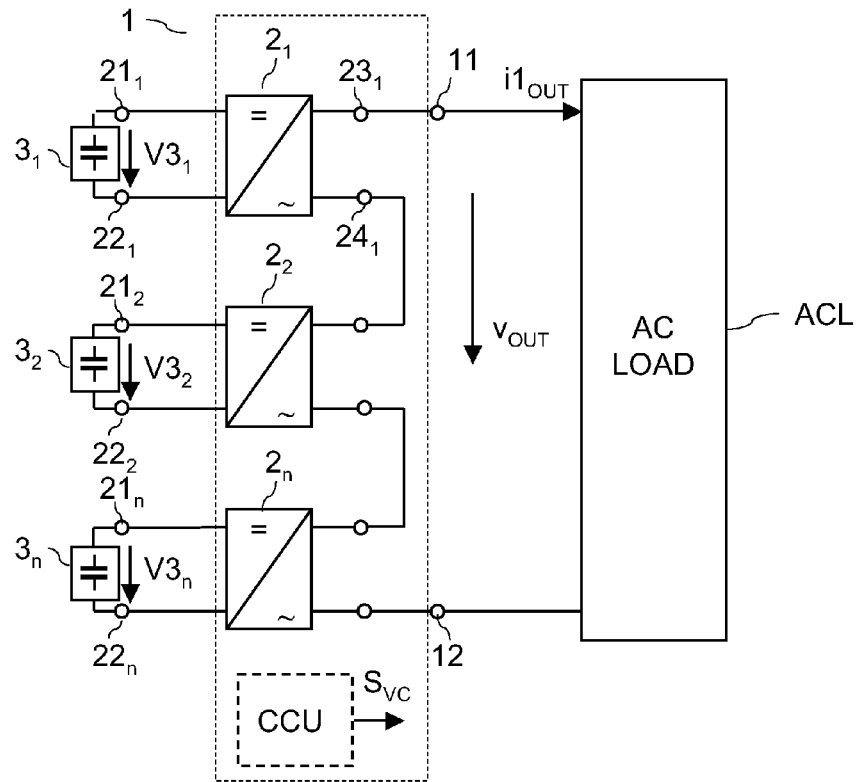
FIG. 24 illustrates an embodiment of a power converter circuit operable to provide a supply current to an AC load.

FIG. 24 illustrates an embodiment of a power converter circuit that is configured to provide an AC output current $i1_{OUT}$ and an AC output voltage $v_{OUT}$ from DC voltages provided by a plurality of n, with n≥2, DC power sources 3. In the embodiment of FIG. 24, n=3 converter units are connected in series. However, this is only an example. The number of converter units 2 connected in series can be chosen arbitrarily, e.g., dependent on the desired amplitude of the output voltage $v_{OUT}$ and the output voltages V3 of the DC power sources 3. The DC power sources 3 are, e.g., rechargeable batteries. In this case, the output voltages V3 of the individual DC power sources 3 are dependent on their charging states. Unlike a DC power source 3 implemented as a PV module, the output voltage V3 of a DC power source 3 implemented as a rechargeable battery cannot significantly be varied by the converter unit 2 connected to the DC power source 3.

Referring to FIG. 24, the output current $i1_{OUT}$ and the output voltage $v_{OUT}$ are supplied to an AC load ACL. Depending on the type of load, there are three different operation scenarios, (a) a first operation scenario in which the AC load ACL defines the frequency, phase and amplitude of the output voltage $v_{OUT}$, (b) an operation scenario in which frequency, phase and amplitude of the output voltage Vout are defined by the power converter circuit with the series connection of inverters $2_1$ to $2_n$, and (c) an operation scenario in which frequency, phase and amplitude of the output voltage $v_{OUT}$ are defined by the power converter circuit, but are variable dependent on load requirements. In the first case (a), the load ACL is, e.g., an AC power grid, in the second case (b), the load is, e.g., an island grid, whereas in the third case (c) the load is, e.g., a single phase motor, an island grid, or the like. While topology of the power converter circuit may basically be the same for all three operation scenarios, the regulation concept is different. In the first case (a) the power converter circuit forces an AC output current into the load (e.g., the AC power grid). In the second case (b) and the third case (c) and the power converter circuit provides a regulated AC output voltage to the load, with the current drawn from the power converter circuit being defined by the AC load. In the second case (b) the frequency and phase is fixed, e.g., 50 Hz or 60 Hz, whereas in the third case (c) the frequency may vary according to the needs of the load, e.g., the rotation speed of the motor. The second case (b) can be considered as a special case of the third case (c).

Figure 25:
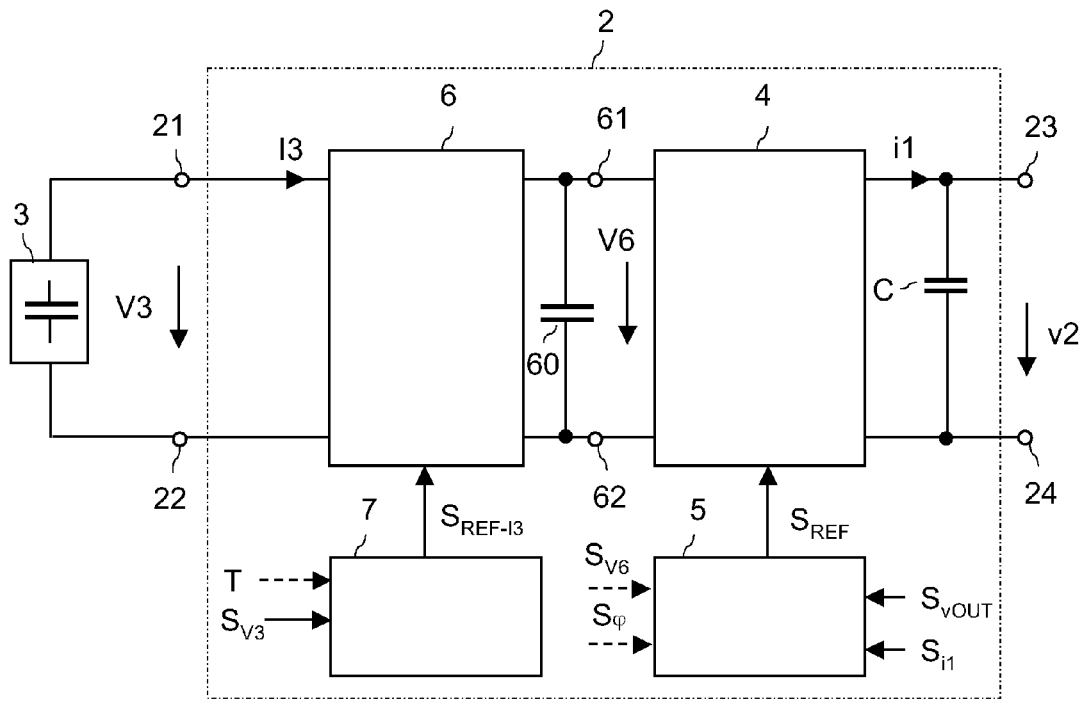
FIG. 25 illustrates one embodiment of a converter unit of FIG. 24.

FIG. 25 illustrates an embodiment of a converter unit 2 that may be used in a power converter circuit operated in the first operation scenario (a) (e.g., when the power converter circuit is connected to an AC power grid). The converter unit 2 of FIG. 25 includes a DC/DC converter 6 connected to the input terminals 21, 22 and, therefore, connected to the DC voltage source 3. A DC/AC converter 4 is connected between output terminals 61, 62 of the DC/DC converter 6 and the output terminals 23, 24 of the converter unit 2. An output capacitor C is connected between the output terminals 23, 24. An output current i1 of the converter unit 2 is a current received at a circuit node common to one 23 of the output terminals and a terminal of the output capacitor C. The topology of the converter unit 2 according to FIG. 25 corresponds to the topology of the converter unit 2 illustrated in FIG. 11, so that explanations concerning the topology of the converter unit 2 of FIG. 11 apply to the converter unit of FIG. 25 accordingly. Like in the converter unit 2 of FIG. 11, the DC/DC converter 6 of the converter unit 2 of FIG. 25 can be implemented as a boost converter or as a buck converter. The DC/AC converter 4 can be implemented with a topology as illustrated in FIG. 6, so that the explanation provided in connection with the DC/AC converter 4 of FIG. 6 applies to the DC/AC converter 4 of FIG. 25 accordingly.

The control circuit 5 of the DC/AC converter 4 may correspond to one of the control circuits 5 explained before. The control circuit 5 receives the output current signal $S_{i1}$ and a voltage reference signal $S_{vOUT}$ and generates the reference signal $S_{REF}$ received by the DC/AC converter. The voltage reference signal $S_{vOUT}$ corresponds to the measurement signal $S_{v1}$ explained before and includes information on the frequency and phase of the AC voltage $v_{OUT}$ defined by the load. The control circuit 5 generates the reference signal $S_{REF}$ such that there is a predefined phase difference between the output current i1 provided by the converter unit 2 and the output voltage $v_{OUT}$. The phase difference may be zero or different from zero. According to one embodiment, the phase difference is adjusted through a phase signal $S_\varphi$ received by the control circuit 5, as explained herein before. According to a further embodiment, the voltage reference signal $S_{vOUT}$ reflects a desired phase difference between the output current i1 and the output voltage $v_{OUT}$. In this case, the reference voltage signal $S_{vOUT}$ is generated such that phase information included in the reference voltage signal $S_{vOUT}$ includes a phase difference relative to the phase of the output voltage $v_{OUT}$, while the reference signal $S_{REF}$ is generated such that the DC/AC converter 4 generates the output current i1 to be in phase with the phase information included in the reference voltage signal $S_{vOUT}$. In this embodiment, the voltage reference signal $S_{vOUT}$ may be generated by providing a voltage measurement signal that is proportional to the output voltage, by providing a phase-shifted version of the voltage measurement signal and by generating the voltage reference signal based on the phase-shifted version of the voltage measurement signal.

Optionally, the control circuit 5 further generates the reference signal $S_{REF}$ dependent on the DC link voltage V6 in order to control the DC link voltage V6, as explained before.

The DC/DC converter 6 of FIG. 25 controls the input current I3 received from the DC power source 3. For this, the control circuit 7 of the DC/DC converter 6 receives an input current signal $S_{I3}$ representing the input current I3 and generates an input current reference signal $S_{REF-I3}$. The DC/DC converter 6 controls the input current I3 dependent on the input current reference signal $S_{REF-I3}$ such that the input current I3 corresponds to a current defined by the input current reference signal $S_{REF-I3}$. According to one embodiment, the DC/DC converter 6 is implemented as one of a boost converter and a buck converter explained with reference to FIGS. 12 and 14 herein below. In the DC/DC converter 6 of FIG. 25, however, a PWM drive signal (corresponding to signal S65 in FIGS. 12 and 14) for a switch (corresponding to switch 65 in FIGS. 12 and 14) is generated based on the input current signal $S_{I3}$ and the input current reference signal $S_{REF-I3}$ (instead of the input voltage signal $S_{V3}$ and the input voltage reference signal $S_{REF-I3}$). A PWM generator (control circuit) of the DC/DC generator 6 may correspond to the PWM generator of FIG. 13 with the difference that the input voltage signal $S_{V3}$ of FIG. 13 is replaced by the input current signal $S_{I3}$ and the input voltage reference signal $S_{V3}$ of FIG. 13 is replaced by the input current reference signal $S_{REF-I3}$.

Referring to FIG. 25, the input current reference signal $S_{REF-I3}$ may be generated dependent on at least one of several different parameters. According to one embodiment, the input current reference signal $S_{REF-I3}$ is generated dependent on a charging state of the DC power source 3. The charging state is, e.g., represented by the voltage V3 provided by the DC power source 3. In this embodiment, the control circuit 7 receives the input voltage signal $S_{V3}$ representing the voltage V3 provided by the DC power source 3 (and the charging state) and generates the input current reference signal $S_{REF-I3}$ dependent on the input voltage signal $S_{V3}$. According to one embodiment, the control circuit 7 generates the input current reference signal $S_{REF-I3}$ dependent on the charging state such that input current I3 is in accordance with a predefined discharge characteristic that defines the input current I3 (the discharging current of the DC power source 3) dependent on the charging state.

In scenario (a), in which the output voltage $V_{OUT}$ is defined by the load, the power provided to the load, that is the amplitude of the AC output current, is defined by the power converter circuit, in particular by the individual DC/DC converters 6. Each DC/DC converter 6 defines the input current I3 drawn from of the DC power source 3 connected thereto and, therefore, defines the power provided by the DC power source 3 to the grid. The power provided by the individual DC power sources 3 may vary. Referring to the explanation above, the power provided by one DC power source 3 may be dependent on its charging state and a desired discharging characteristic. The discharging characteristic may be fixed, e.g., only dependent on technical requirements of the DC power source, or may vary dependent on further parameters, such as the weather forecast. Assume, e.g., the system of FIG. 24 is used to buffer solar energy. In this case, the DC power sources 3 may be charged through PV modules (not illustrated in FIG. 24) during the day, while the DC power sources provide at least a part of the stored energy to the AC grid at night. When, according to the weather forecast, it is supposed to be sunny the next day (so that it is likely for the DC power sources to be recharged) the DC power sources 3 may be discharged more than in those cases in which it is supposed to be cloudy.

Figure 26:
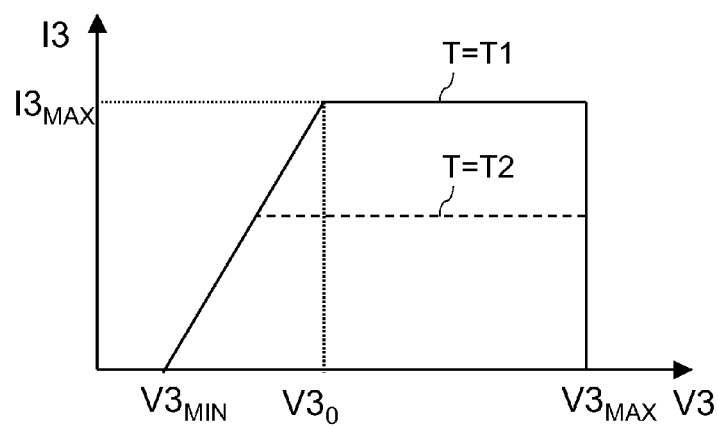
FIG. 26 illustrates one embodiment of a discharging curve of a DC power source.

An embodiment of a discharge characteristic (discharge curve) is schematically illustrated in FIG. 26. This discharge curve shows the discharging current I3 dependent on the voltage V3 provided by the DC power source, that is, dependent on the charging state. In FIG. 26, $V3_{MAX}$ denotes a maximum supply voltage, and $V3_{MIN}$ denotes a minimum supply voltage, where the DC power source should not be discharged to below this minimum supply voltage. In the embodiment of FIG. 26, the DC power source 3 is discharged with a constant current $I_{MAX}$ when the supply voltage V3 is between the maximum voltage $V3_{MAX}$ and a threshold $V3_0$. As the supply voltage V3 falls below the threshold $V3_0$ the discharging current decreases. The discharging current may decrease linearly (as illustrated). According to a further embodiment, the discharging current decreases such that output power of the DC power source (which is the product of the discharging current I3 and the supply voltage V3) is proportional to the supply voltage. The discharging current I3 becomes zero when the supply voltage V3 decreases to the minimum voltage $V3_{MIN}$. The control circuit 7 (see FIG. 25) may generate the input current reference signal $S_{REF-I3}$ such that the input current (discharging current) I3 is in accordance with the discharging curve of FIG. 26.

According to one embodiment, the discharging current I3 is not only dependent on the charging state, but is also dependent on the temperature of the DC power source 3, where the maximum discharging current $I3_{MAX}$ decreases as the temperature increases. In FIG. 26, the discharging curve drawn in solid line represents the discharging curve at a first temperature T1, while a discharging curve drawn in dashed line represents the discharging curve at a second temperature T2 higher than the first temperature. Thus, the control circuit 7 may additionally receive a temperature information representing the temperature of the DC power source 3 in order to adjust the discharging current I3 dependent on the temperature.

In the power converter circuit of FIG. 24 each of the DC power sources 3 can be discharged with an individual discharging current I3 that may be dependent on a desired discharging characteristic. Thus, each DC voltage source 3 can be operated in an individual operation state in which the DC voltage source 3 supplies power to the DC/DC converter 6 in an efficient way. This is different from conventional power converter circuits that include a plurality of DC power sources connected in series, and one inverter connected to the series circuit with the DC power sources.

Since the control circuit 7 in each converter unit 2 ensures that the DC power source 3 of the converter unit 2 is discharged in an optimum manner, it is even possible to use different types of DC power sources 3 in one series circuit. It is even possible to stop one or more of the DC power sources 3 from being discharged, while other DC power sources may still be discharged until they reach their lower charging limit.

In the embodiments of the power converter circuit explained herein before, the individual converter units 2 receive an information on frequency and phase of the AC voltage v1 provided by the load (e.g., the AC grid) and each converter unit 2 autonomously controls its output current i1 in accordance with the received frequency and phase information. The power provided by each converter unit 2 to the load, is only defined by the DC power source 3 connected thereto, such as a PV module, or a rechargeable battery.

The control scheme is different in scenario (b) in which the power converter circuit 1 is to provide the AC output voltage $v_{OUT}$ with a predefined frequency and amplitude to an AC load. The AC load is, e.g., an island grid to which a plurality of power consuming devices, such as home appliances (white goods), are connected to. This control scheme will be explained with reference to FIG. 27 in which one embodiment of a converter unit 2 that may be used in a power converter circuit of FIG. 24 in scenario (b) is illustrated.

Figure 27:
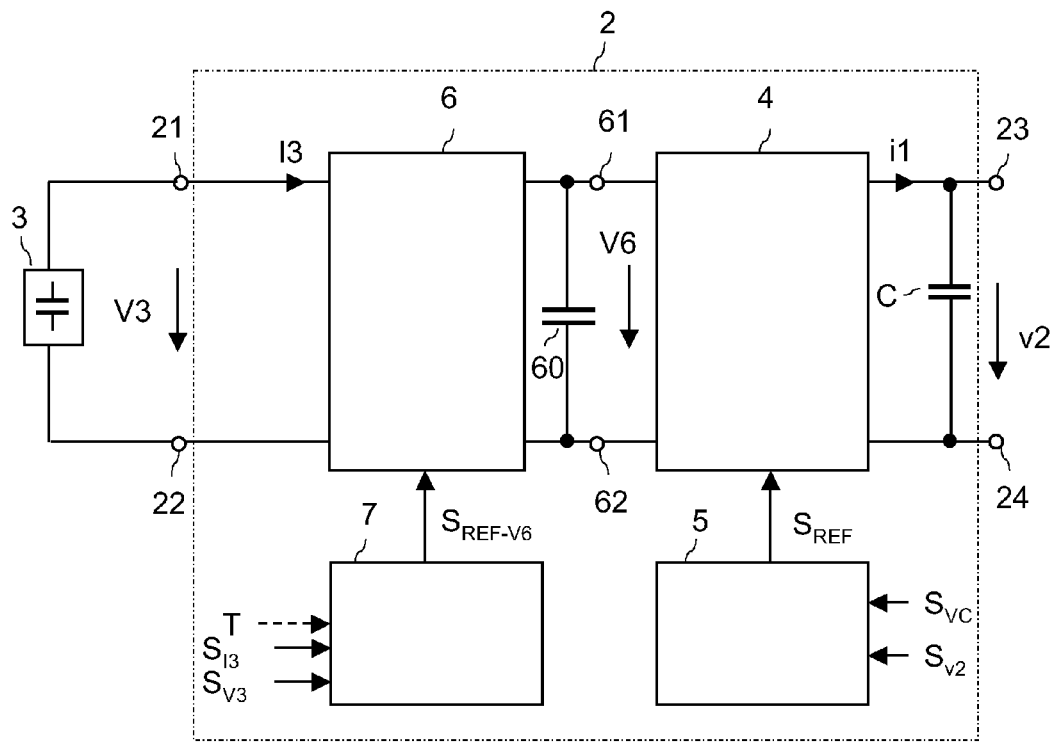
FIG. 27 illustrates a further embodiment of a converter unit of FIG. 24, the converter unit including a DC/DC converter and a DC/AC converter.

Referring to FIG. 27, the converter unit 2 a DC/DC converter 6 connected to the input terminals 21, 22 and, therefore, connected to the DC power source 3. A DC/AC converter 4 is connected between output terminals 61, 62 of the DC/DC converter 6 and the output terminals 23, 24 of the converter unit 2. An output capacitor C is connected between the output terminals 23, 24. An output current i1 of the converter unit 2 is a current received at a circuit node common to one 23 of the output terminals and a terminal of the output capacitor C, and an output voltage v2 is a voltage across the output capacitor C. The topology of the converter unit 2 according to FIG. 27 corresponds to the topology of the converter unit 2 illustrated in FIG. 25, so that explanations concerning the topology of the converter unit 2 of FIG. 25 apply to the converter unit of FIG. 27 accordingly.

However, since the control scheme of the converter unit 2 of FIG. 27 is different from the control schemes explained herein before, the controller 5 of the DC/AC converter 4 of FIG. 27 is different from the controllers of the DC/AC converters 4 explained herein before. Referring to FIG. 27, the control circuit 5 receives a voltage control signal $S_{VC}$. The voltage control signal $S_{VC}$ defines frequency, phase and amplitude of the output voltage v2 of the converter unit 2. The control circuit 5 further receives an output voltage signal $S_{V2}$ representing the output voltage v2 of the converter unit and is configured to generate the reference signal $S_{REF}$ received by the DC/AC converter 4 such that the DC/AC converter 4 generates the output voltage v2 in accordance with the voltage control signal $S_{V2}$.

Figure 28:
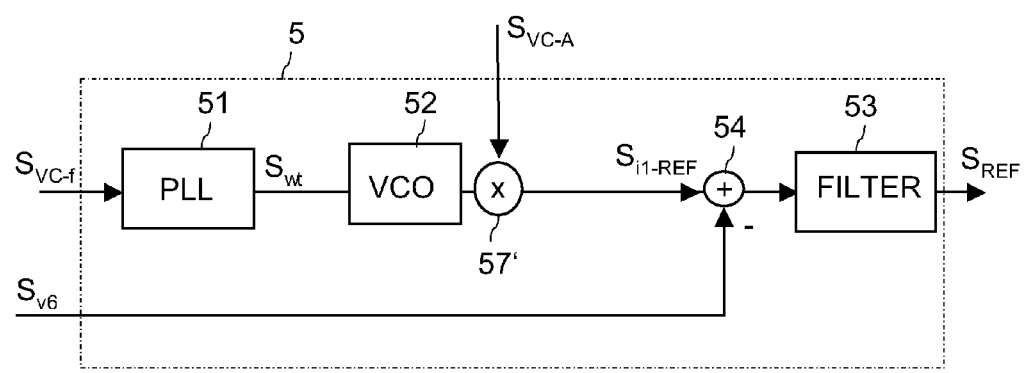
FIG. 28 illustrates an embodiment of the control circuit of the DC/AC converter of FIG. 27.

An embodiment of a control circuit 5 configured to generate the reference signal $S_{REF}$ dependent on the voltage control signal $S_{MC}$, and the output voltage signal $S_{V6}$ is illustrated in FIG. 28.

The control circuit 5 of FIG. 28 is based on the control circuit of FIG. 15, to which reference is made. In the control circuit of FIG. 28, the control loop (with the adder 56, the filter 55, and the multiplier 57) for controlling the DC link voltage V6 is omitted. Further, referring to FIG. 28, the voltage control signal $S_{VC}$ may include two sub-signals, namely a first sub-signal $S_{VC-f}$ defining frequency and phase of the output voltage v2, and an amplitude signal $S_{VC-A}$ defining the amplitude of the output current voltage v2. The PLL 51 receives the first sub-signal $S_{VC-f}$ and the output signal of the VCO 52 is scaled (multiplied) with the second sub-signal $S_{VC-A}$ using a multiplier 57'. The output signal of the multiplier 57' is processed in the same way as the output signal of the VCO 52 of FIG. 15.

In the converter unit 2 of FIG. 27, the DC/DC converter 6 controls its output voltage (the DC link voltage V6) and receives an output voltage reference signal $S_{REF-V6}$ from the control circuit 7. In general, it may be desirable to control the DC link voltage V6 to be constant, which could be obtained by providing a constant reference signal $S_{REF-V6}$. However, there may be scenarios, such as a low charging state, in which the DC power source 3 is not capable of providing sufficient power to keep the DC link voltage V6 at a desired voltage level. Thus, according to one embodiment, the control circuit 7 further receives the input current signal $S_{I3I}$ representing the input current I3 of the DC/DC converter 6 and the input voltage signal $S_{V3}$ representing the supply voltage and the charging state of the DC power source 3. In this embodiment, the control circuit 7 is configured to generate the DC link voltage reference signal $S_{REF-V6}$ to correspond to a set value (a predefined value) when the input current is below a current threshold as defined by a discharging characteristics such as a discharging characteristic of FIG. 26. When, however, the input current I3 reaches the current threshold as defined by the discharging characteristics, such as current $I3_{MAX}$ when the voltage V3 is between $V3_0$ and $V_{3MAX}$, the control circuit reduces the DC link voltage reference signal $S_{REF-V6}$ in order to prevent the DC power source from being overloaded.

The voltage control signal $S_{VC}$ may be provided by a central control unit CCU (illustrated in dashed lines in FIG. 24) that measures the AC output voltage $v_{OUT}$, compares the AC output voltage with an AC reference voltage and provides the voltage control signals $S_{VC}$ to the individual converter units 3. According to one embodiment, the central control unit CCU may provide the same voltage control unit to the individual converter units 3. There may be a scenario in which the one or more of the converter units 3 are not capable of providing the amplitude of their output voltage v2 in accordance with the voltage control signal $S_{VC}$ because the corresponding DC link voltage V6 is below the desired set value, so that the amplitude of the output voltage $v_{OUT}$ decreases. In this case, the central control unit CCU increases the voltage control signal $S_{VC}$ so that those converter units 2 that are capable to do so increase the amplitude of their output voltages v2 until the overall output voltage $v_{OUT}$ again reaches the desired voltage, such as $240V_{RMS}$. The desired voltage and the desired frequency of the output voltage $v_{OUT}$ may be stored in the central control unit CCU.

According the a further embodiment, one of the converter unit operates as a master converter unit that includes the central control unit and provides the voltage control signal to the other converter units acting as slave units.

The control scheme in scenario (c) is similar to the control scheme in scenario (b) with the difference that in scenario (c), frequency and amplitude of the output voltage $v_{OUT}$ may vary dependent on load requirements. The AC load is, e.g., a single phase motor. Through the frequency of the AC output voltage $v_{OUT}$ the rotation frequency of the motor M can be adjusted, and through the amplitude the torque provided on the motor M can be adjusted. In this embodiment, the central control unit CCU may receive a motor control signal defining frequency and amplitude of the output voltage $v_{OUT}$ from a motor controller, where the central control unit generates the voltage control signals $S_{VC}$ provided to the individual converter units 3 based on the motor control signal.

Figure 29:
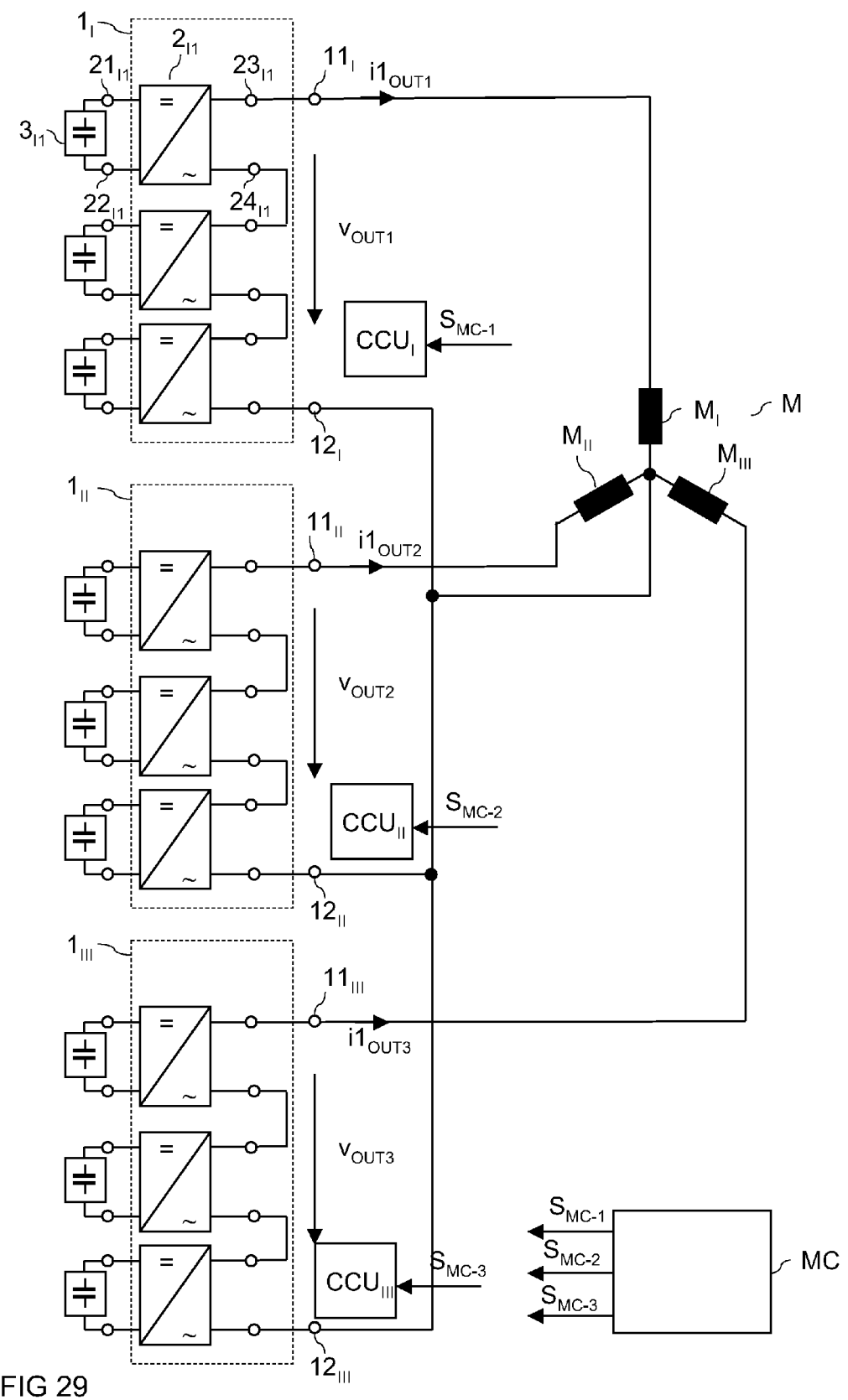
FIG. 29 illustrates an embodiment of a power converter circuit having three pluralities of converter units each organized in series and each configured to drive one phase of a 3-phase AC motor.

FIG. 29 illustrates an embodiment of a power converter circuit that is configured to provide three AC output voltages $v_{OUT1}$, $v_{OUT2}$, $v_{OUT3}$ from DC voltages provided by a plurality of DC power sources and for driving an AC load, such as a three-phase AC motor M. The power converter circuit includes three series circuits $1_I$, $1_{II}$, $1_{III}$, with each of these series circuits $1_I$, $1_{II}$, $1_{III}$ providing one of the AC output voltages $v_{OUT1}$, $v_{OUT2}$, $v_{OUT3}$. Each of these three series circuits $1_I$, $1_{II}$, $1_{III}$ may be implemented like the power converter circuit 1 of FIG. 24. The motor M includes three windings or phases $M_I$, $M_{II}$, $M_{III}$, with each of these winding $M_I$, $M_{II}$, $M_{III}$ receiving one of the output voltages $v_{OUT1}$, $v_{OUT2}$, $v_{OUT3}$. Each of the windings $M_I$, $M_{II}$, $M_{III}$ is connected to a center tap of the motor M with a first terminal. The second output terminals $12_I$, $12_{II}$, $12_{III}$ of the individual series circuits is connected to the center tap, each of the first output terminals $11_I$, $11_{II}$, $11_{III}$ is connected to a second terminal of one winding $M_I$, $M_{II}$, $M_{III}$.

Each of the series circuits $1_I$, $1_{II}$, $1_{III}$ includes one group with a plurality of DC/AC converter units 2 connected in series. The individual converter units 2 can be implemented in identical fashion. For the ease of illustration reference characters of only one converter unit $2_{II}$ of a first series circuit $1_I$ are indicated in FIG. 29. This converter unit $2_{II}$ includes input terminals $21_{II}$, $22_{II}$ having a DC voltage source $3_{II}$ connected thereto, and having output terminals $23_{II}$, $24_{II}$. Like the converter units explained before, the converter unit $2_{II}$ and the other converter units include an output capacitor connected between the output terminals $23_{II}$, $24_{II}$. However, this output capacitor is not illustrated in FIG. 29.

In the embodiment illustrated in FIG. 29, the individual series circuits $1_I$, $1_{II}$, $1_{III}$ each include three converter units connected in series. However, this is only an embodiment. The number of converter units to be connected in series may vary dependent on a specific type of motor M and dependent on a type of DC voltage sources 3 connected to the input terminals 21, 22 of the individual converter units 2. It is even possible to implement the different series circuits $1_I$, $1_{II}$, $1_{III}$ with different numbers of converter units connected in series.

Referring to FIG. 29, the circuit arrangement with the power converter circuit and the motor M further includes a motor controller MC that defines frequency, phase and amplitude of the individual AC output voltages $v_{OUT1}$, $v_{OUT2}$, $v_{OUT3}$ of the individual series circuits. The motor controller MC provides at least one control signal for each of the series circuits, namely a first control signal $S_{MC-I}$ received by the central control unit $CCU_I$ of the first series circuit $1_I$ and defining frequency, phase and amplitude of the first output voltage $v_{OUT1}$, a second control signal $S_{MC-II}$ received by the central control unit $CCU_{II}$ of the second series circuit $1_{II}$ and defining frequency, phase and amplitude of the second output voltage $v_{OUT2}$, and a third control signal $S_{MC-III}$ received by the central control unit $CCU_{III}$ of the third series circuit $1_{III}$ and defining frequency, phase and amplitude of the third output voltage $v_{OUT3}$. Like in the embodiment explained with reference to FIG. 28, the central control unit $CCU_I$, $CCU_{II}$, $CCU_{III}$ of each series circuit may be implemented in the control circuit 5 of one converter unit 3 of the series circuit, with this one converter unit 3 acting as master converter unit that provides voltage control signals $S_{VC}$ to the other converter units of the series circuit based on the control signal. The individual control signals $S_{MC-I}$, $S_{MC-II}$, $S_{MC-III}$ may represent different phase information so that there is a phase shift between the output voltages $v_{OUT1}$, $v_{OUT2}$, $v_{OUT3}$ of the individual series circuits. The motor M and the motor controller MC can be implemented like a conventional motor and a conventional motor controller, respectively.

In the embodiment explained with reference to FIGS. 25 and 27, the individual converter units 3 include DC/DC converter 6 generating a DC link voltage V6, and a DC/AC converter 6 providing an AC voltage from the DC link voltage V6. Referring to FIG. 19, instead of a DC/DC converter and a DC/AC converter, a DC/AC converter with a buck converter 80 and an unfolding bridge 85 may be used to generate an AC output current i1 from a DC voltage. A similar topology may be used when it is desired to generate an AC output voltage $v_{OUT}$, as it is desired in operation scenarios (b) and (c). The converter unit of FIG. 19 can be modified to be used in the power converter circuit of FIG. 24 in operation scenarios (b) and (c). In this case, the buck converter 80 of FIG. 19 is to be replaced by a buck-boost converter that generates a rectified sinusoidal voltage (corresponding to voltage v80 in FIG. 19) with an amplitude and frequency defined by the voltage control signal $S_{VC}$ explained before. The unfolding bridge simply provides the AC output voltage from this rectified sinusoidal voltage. The buck-boost converter is in the buck mode when the input voltage V3 is higher than the instantaneous value of the rectified sinusoidal voltage, and is in the boost mode when the input voltage V3 is lower than the instantaneous value of the rectified sinusoidal voltage.

Figure 39:
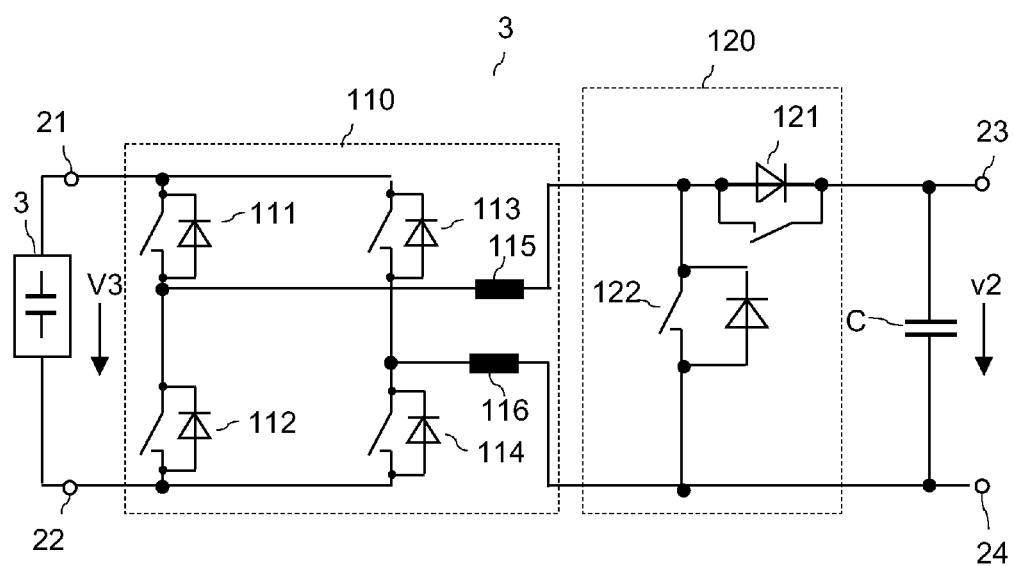
FIG. 39 illustrates a further embodiment of a converter unit topology.

FIG. 39 illustrates a further embodiment of a topology of converter unit 3 for generating an AC output voltage from a DC input voltage. FIG. 39 only illustrates the converter topology, control circuits are not illustrated. Referring to FIG. 39, the converter unit 3 includes a first stage 110 that combines an unfolding bridge and a buck converter and includes two half-bridges, each including a first switch 111, 113 and a second switch 112, 114, and two inductive storage elements 115, 116, with each inductive storage element connected to the output of one half bridge. The first stage is connected to the input terminals 21, 22 and receives the supply voltage V3 from the DC power source. The converter unit further includes a second stage 120 implemented as boost stage and coupled between the outputs with the inductive storage elements 115, 116 of the first stage and the output terminals 23, 24 of the converter unit 3.

The converter unit 3 can be implemented to generate an AC output voltage v2 between the output terminals with a frequency, phase and amplitude as defined by a voltage control signal. The operating principle of the converter unit 3 for generating a sinusoidal output voltage v2 from the DC supply voltage V3 is explained in the following. For explanation purposes it is assumed that the amplitude of the output voltage v2 is higher than the supply voltage V3. For generating one period of the sinusoidal output voltage, there are six phases: (A) a first phase in which the instantaneous value of the output voltage v2 is positive and smaller than the input voltage V3; (B) a second phase in which the instantaneous value of the output voltage v2 is positive and higher than the input voltage V3; (C) a third phase in which the instantaneous value of the output voltage v2 is positive and again smaller than the input voltage V3; (D) a fourth phase in which the instantaneous value of the output voltage v2 is negative and has a magnitude that is smaller than the input voltage V3; a fifth phase (E) in which the instantaneous value of the output voltage v2 is negative and has a magnitude that is higher than the input voltage V3; and a sixth phase (F) in which in which the instantaneous value of the output voltage v2 is negative and has again a magnitude that is smaller than the input voltage V3.

In the first phase (A), the output voltage is controlled through the first switch 111 of the first half-bridge that is driven in a PWM fashion. A first switch 122 of the second stage that is coupled between the output of the first half-bridge and the first output 23 of the converter unit 3 is on, while a second switch 122 of the boost stage connected between the inductive storage elements is off. The first switch 113 of the second half-bridge is off, the second switch 114 of the second half-bridge is on, and the second switch 112 of the first half-bridge acts as a freewheeling element in those time periods when the first switch 111 is off. In the first phase (A), the converter unit 3 acts as a buck converter. The amplitude of the output voltage v2 is controlled through the duty cycle of the first switch 111.

In the second phase (B), the first switch 111 of the first half-bridge and the second switch 114 of the second half-bridge are on, while the second switch 112 of the first half-bridge and the first switch 113 of the second half-bridge are off. The second switch 122 of the boost stage 120 is driven in a PWM fashion, and the first switch 121 acts as a freewheeling element in those time periods when the second switch 122 is off. The amplitude of the output voltage is controlled through the duty cycle of the second switch 122. In the second phase (B), the converter unit 3 acts as a boost converter.

The operating principle in the third phase (C), corresponds to the operating principle in the first phase.

In the fourth phase (D), the output voltage is controlled through the first switch 113 of the second half-bridge that is driven in a PWM fashion. The first switch 122 of the second stage is on, while the second switch 122 is off. The first switch 111 of the first half-bridge is off, the second switch 112 of the first half-bridge is on, and the second switch 114 of the second half-bridge acts as a freewheeling element in those time periods when the first switch 113 is off. In the fourth phase (D), the converter unit 3 acts as a buck converter providing a negative output voltage. The amplitude of the output voltage v2 is controlled through the duty cycle of the first switch 113.

In the fifth phase (E), the first switch 113 of the second half-bridge and the second switch 113 of the first half-bridge are on, while the second switch 114 of the second half-bridge and the first switch 111 of the first half-bridge are off. The second switch 122 of the boost stage 120 is driven in a PWM fashion, and the first switch 121 acts as a freewheeling element in those time periods when the second switch 122 is off. The amplitude of the output voltage is controlled through the duty cycle of the second switch 122. In the fifth phase (E), the converter unit 3 acts as a boost converter.

The operating principle in the sixth phase (F), corresponds to the operating principle in the fourth phase.

Figure 30:
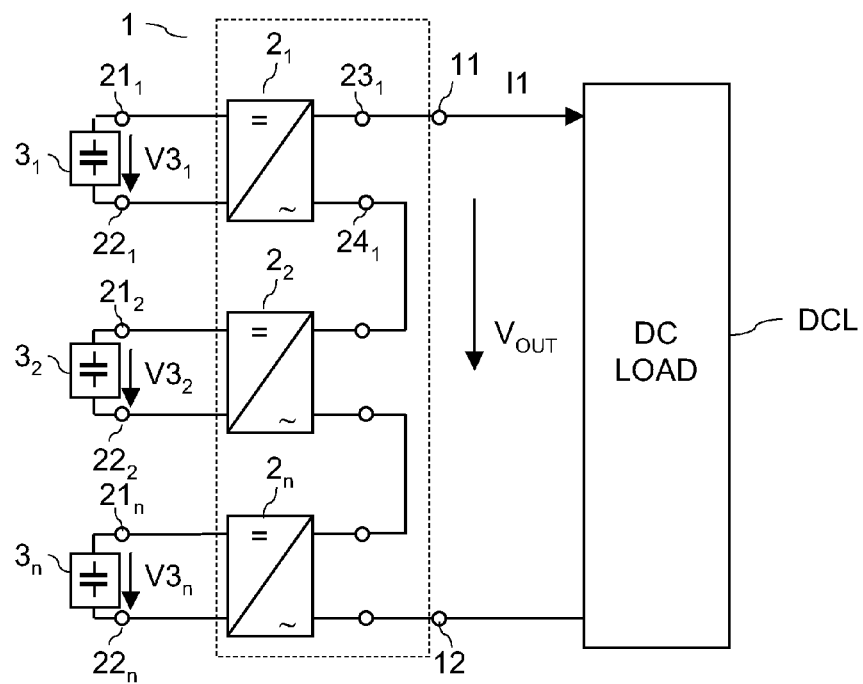
FIG. 30 illustrates an embodiment of a power converter circuit operable to provide a supply current to a DC load.

A power converter circuit including a plurality of converter units 2 connected in series is not restricted to supply an AC current to an AC load, but may also be used to supply a DC current to a DC load. FIG. 30 illustrates an embodiment of a power converter circuit supplying a DC current I1 to a DC load DCL. The topology of the power converter circuit 1 corresponds to the topology explained before. That is, the power converter circuit includes n, with n≥2, converter units 2 connected in series, with each converter unit 2 receiving a supply voltage V3 from a DC power source 3. The DC power sources are, e.g., rechargeable batteries, fuel cells, PV modules, or the like. For explanation purposes it is assumed that the DC power sources 3 are rechargeable batteries.

Like in the embodiment of FIG. 24 there are three operation scenarios, namely (c) a first operation scenario in which the output voltage $V_{OUT}$ is defined by the load (e.g., when the load DCL is a DC grid), (d) a second operation scenario in which the output voltage $V_{OUT}$ is defined by the power converter circuit with the series connection of inverters $2_1$ to $2_n$, and (e) a third operation scenario in which the amplitude of the output voltage $V_{OUT}$ is defined by the power converter circuit, but is variable dependent on load requirements.

In the first case (c), the power converter units 2 may be implemented as explained with reference to FIG. 25. Each power converter unit 2 operates like the power converter unit of FIG. 25 with the difference that the frequency information represented by the voltage reference signal $S_{vOUT}$ represents a frequency of zero. In case the DC/AC converter 4 is implemented with an H4-bridge as illustrated in FIG. 6, the DC/AC converter 4 may be simplified by leaving away the third switch $42_3$ and the inductive storage element $44_2$, and by replacing the fourth switch $42_4$ by a short-circuit. The topology of the DC/AC converter then corresponds to the topology of a buck converter. When the power converter circuit supplies a DC load, the DC/AC converters 4 explained before do not operate as DC/AC converters but as further DC/DC converters. However, these converters will nevertheless be referred to as DC/AC converters to be consistent with the description above.

In the second and third case (d) and (e), the power converter unit 2 may be implemented as explained with reference to FIGS. 27 and 28 before. Each power converter unit 2 operates like the power converter unit of FIG. 27 with the difference that the frequency information represented by the voltage control signal $S_{VC}$ represents a frequency of zero, so that the voltage control signal $S_{VC}$ only defines the amplitude of the voltage each converter unit 3 is to provide.

Figure 31:
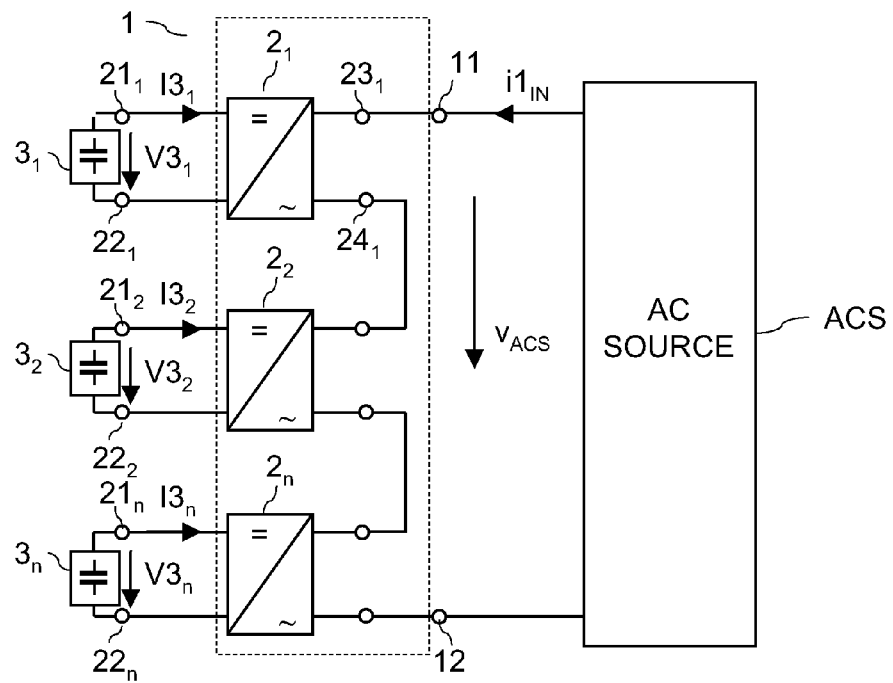
FIG. 31 illustrates an embodiment of a power converter circuit having a plurality of converter units organized in series and connected to an AC source for charging DC sources coupled to the individual converter units.

Besides supplying an AC load or a DC load from the DC power sources 3, a power converter circuit 1 with a plurality of converter units 2 connected in series may also be used to charge DC power sources 3 implemented as rechargeable batteries. FIG. 31 illustrates an embodiment of a power converter circuit 1 for charging DC power sources 3. The topology of the power converter circuit 1 corresponds to the topology explained before. That is, the power converter circuit includes n, with n≥2, converter units 2 connected in series, with each converter unit 2 having a DC power source 3 connected thereto. The power converter circuit 1 receives an AC supply voltage $v_{ACS}$ and an AC supply current $i1_{IN}$ from an AC supply voltage source ACS such as an AC grid, and provides a charging current I3 (flowing in a direction opposite to the direction illustrated in FIG. 30) to each of the DC power sources 3.

Figure 32:
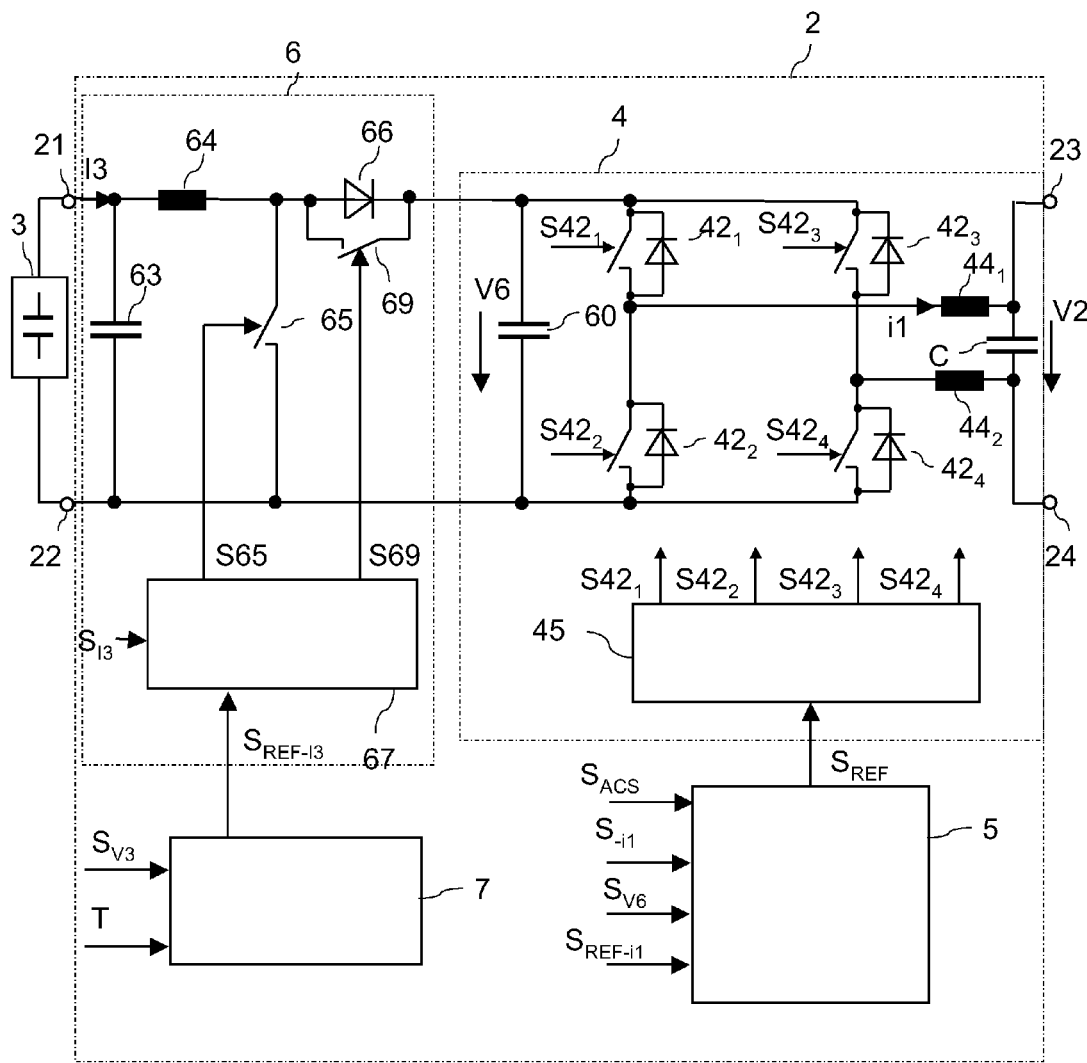
FIG. 32 illustrates an embodiment of one converter unit of the power converter circuit of FIG. 31.

FIG. 32 illustrates an embodiment of one converter unit 2 of the power converter circuit of FIG. 30. In this embodiment, the converter unit 2 includes a DC/DC converter 6 implemented as a boost converter connected between the input terminals 21, 22 of the converter unit 2, and a DC/AC converter 4 implemented as an H4-bridge, connected between the boost converter 6 and the output terminals 23, 24. The topology of the converter unit 2 of FIG. 31 corresponds to the topology of the converter unit 2 of FIGS. 11 and 27 when implementing the DC/DC converter 6 as a boost converter and when implementing the DC/AC converter as an H4-bridge. When an AC supply voltage $v_{ACS}$ is applied between the output terminals 11, 12 of the power converter circuit 1 (see FIG. 31), an AC voltage v2 is applied between the output terminals 23, 24 of the individual converter units 2, wherein each of the voltages v2 is a share of the supply voltage $v_{ACS}$.

When the converter unit 2 is used to charge the DC voltage source 3 connected to the input terminals 21, 22 electrical power is transferred from the output terminals 23, 24 to the input terminals 21, 22. Thus, the output terminals 23, 24 act as input terminals receiving an input current $i1_{IN}$ flowing in the opposite direction of an output current it (that is, when supplying a current to a power grid or when driving an AC motor) and the input terminals 21, 22 act as output terminals providing a supply current or charging current flowing in the opposite direction of an input current I3 (that is, when supplying a current to a power grid or when driving an AC motor). Nevertheless, in the following description the terminals 23, 24 and 21, 22 will be referred to as output terminals and the input terminals of the converter unit 2, which is in accordance with the description herein before.

In the DC/AC converter, the two half bridges $42_1$, $42_2$ and $42_3$, $42_4$ and two conductive storage elements $44_1$, $44_2$, such as chokes, form two boost converter topologies that can be used to charge the DC link capacitor 60 through the AC voltage v2 applied at the output terminals 23, 24. Each of the inductive storage elements $44_1$, $44_2$ is connected between one of the output terminals 23, 24 and the tap of one of the half bridges.

In the converter unit 2 of FIG. 31, the control circuit 5 is implemented as a power factor controller (PFC) configured to operate the two boost converter topologies such that the input current −i1 (−i1 denotes a current flowing in the opposite direction of the output current) is in phase with the AC supply voltage $v_{ACS}$, or has a predefined phase difference. In the DC/AC converter 4 of FIG. 28, the boost converter topology with the first choke $44_1$ and the first half bridge $42_1$, $42_2$ controlled by the control circuit 5 becomes active during positive half cycles of the input voltage v2, and the boost converter topology with the second choke $44_2$ and the second half bridge $42_3$, $42_4$ controlled by the control circuit 5 becomes active during negative half cycles of the input voltage v2. The control circuit 5 receives a DC link voltage signal $S_{V6}$ representing the DC link voltage V6, an input current signal $S_{i1}$ representing the input current −i1 flowing at the output terminals 23, 24, and a supply voltage signal $S_{ACS}$. The input voltage signal $S_{ACS}$ represents the supply voltage $V_{ACS}$ provided by the AC voltage source ACS. The control circuit 5 is configured to control the individual boost converters such that the input current i1 of the DC/AC converter 4 is in phase with the supply voltage $v_{ACS}$, or has a predefined phase difference, and is further configured to control the boost converter such that the DC link voltage V6 is constant.

Additionally, the control circuit controls the amplitude of the input current −i1. For this, the control circuit 5 receives an input current reference signal $S_{REF-I1}$. In the converter circuit with a plurality of converter units connected in series, the input current reference signal may be generated by one converter unit acting as a master unit and provided to the other converter units acting as slave units. The control circuit may include three control loops, namely a first control loop controlling the input current i1 to be in phase with the supply voltage, a second control loop control controlling the DC link voltage, and a third control loop controlling the amplitude of the input current −i1.

In the converter unit 2, the boost converter 6 acts as a buck converter when supplied with the DC link voltage V6 and when providing a charging current −I3 to the DC voltage source connected to the input terminals 21, 22. This buck converter is controlled by the control circuit 67 such that a defined charging current −I3 (−I3 denotes a current flowing in the opposite direction of the input current I3) is provided at the input terminals 21, 22. The charging current −I3 is in correspondence with a desired charging characteristic of the DC voltage source connected to the input terminals 21, 22. Different from the boost converter illustrated in FIG. 12, the boost converter of FIG. 31 includes a further switching element 69 connected in parallel with the rectifier element 66. The further switching element 69 is controlled by the control circuit 67 in order to control the output current −I3 in accordance with the output current reference signal $S_{REF-I3}$. For this, the control circuit 67 adjusts the duty cycle of a drive signal of the switching element 69. Through the duty cycle of the switching element 65 the output current −I3 is controlled when the boost converter 6 is operated in the buck mode (is operated as a buck converter), while the switching element 65 (which in the boost mode of the boost converter controls the input current) only acts as a freewheeling element that is switched on when the further switching element 69 is off and that is switched off when the further switching element 69 is on.

The output current reference signal $S_{REF-I3}$ is, e.g., provided by the control circuit 7, in accordance with a desired charging characteristic of the DC power source. The control circuit 7 receives an information on the charging state of the DC power source 3, such as the supply voltage signal $S_{V3}$, and generates the output voltage reference signal $S_{REF-I3}$ accordingly.

Figure 33:
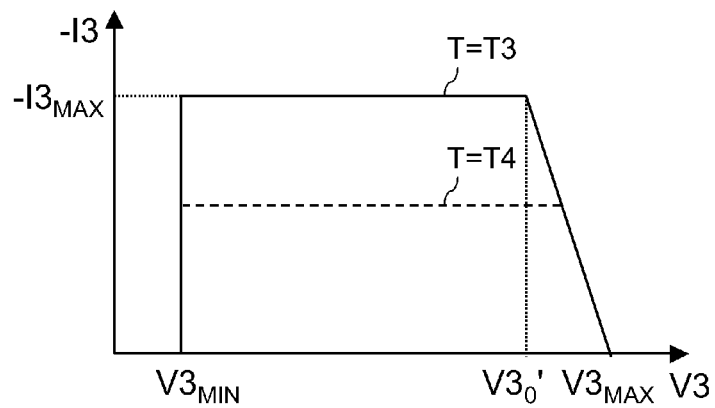
FIG. 33 illustrates one embodiment of a charging curve of one DC power source.

An embodiment of a charge characteristic (charge curve) is schematically illustrated in FIG. 33. This charge curve shows the charging current −I3 dependent on the voltage V3 provided by the DC power source, that is, dependent on the charging state. In FIG. 26, $V3_{MAX}$ denotes a maximum supply voltage, and $V3_{MIN}$ denotes a minimum supply voltage, where the DC power source should not be discharged to below this minimum supply voltage and should not be charged to above the maximum supply voltage. In the embodiment of FIG. 33, the DC power source 3 is charged with a constant current $I_{MAX}$ when the supply voltage V3 is between the minimum voltage $V3_{MIN}$ and a threshold $V3_0'$. As the supply voltage V3 increases above the threshold $V3_0$ the charging current decreases. The charging current may decrease linearly (as illustrated) as the supply voltage V3 increases. According to a further embodiment, the discharging current decreases such that output power of the DC power source (which is the product of the discharging current I3 and the supply voltage V3) is inversely proportional to the supply voltage. The discharging current I3 becomes zero when the supply voltage V3 increases to the maximum voltage $V3_{MAX}$. The control circuit 7 (see FIG. 32) may generate the input current reference signal $S_{REF-I3}$ such that the input current (discharging current) 13 is in accordance with the charging curve of FIG. 33.

According to one embodiment, the charging current I3 is not only dependent on the charging state, but is also dependent on the temperature of the DC power source 3, where the maximum charging current $I3_{MAX}$ decreases as the temperature increases. In FIG. 33, the charging curve drawn in solid line represents the discharging curve at a first temperature T3, while a charging curve drawn in dashed line represents the discharging curve at a second temperature T4 higher than the first temperature. Thus, the control circuit 7 may additionally receive a temperature information representing the temperature of the DC power source 3 in order to adjust the discharging current I3 dependent on the temperature.

In the power converter circuit of FIG. 31 each of the DC power sources 3 can be charged with an individual discharging current I3 that may be dependent on a desired charging characteristic. Thus, each DC voltage source 3 may be supplied with power in an efficient way. This is different from conventional charging circuits that charge a plurality of DC power sources connected in series.

Figure 34:
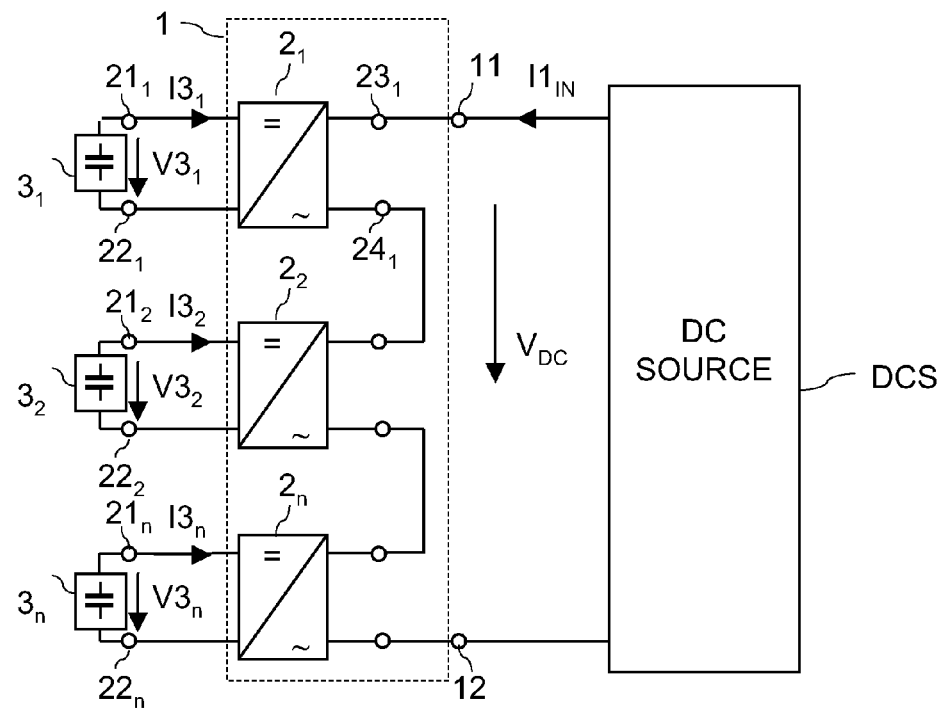
FIG. 34 illustrates an embodiment of a power converter circuit operable to receive a DC voltage from a DC voltage source and to charge DC power sources coupled to converter units of the power converter circuit.

Referring to FIG. 34, instead of an AC voltage source, such as AC voltage source ACS of FIG. 31, a DC voltage source DCS may be used to charge the individual DC power sources 3. In FIG. 1, reference character DCS denotes a DC voltage source providing a fixed DC voltage $V_{DC}$ and a DC current $I1_{IN}$ to the power converter circuit 1. The DC voltage source is, e.g., a DC power grid.

The individual converter units 2 may be implemented as explained with reference to FIG. 32, and the operating principle of the power converter circuit 1 of FIG. 34 may correspond to the power converter circuit of FIG. 31 with the difference that the DC/AC converter (4 in FIG. 32) only controls the DC link voltage V6. The DC/AC converter 4 may be simplified by omitting the third switch $42_3$ and the inductive storage element $44_2$, and by replacing the fourth switch $42_4$ by a short-circuit. The DC/AC converter 4 modified in this way then has the topology of a buck converter. The operating principle of the DC/DC converter 6 may correspond to the operating principle of the DC/DC converter 6 of FIG. 32. That is, the DC/DC converter 6 may control the charging current −I3 of the DC power source 3 in accordance with a charging curve, e.g., a charging curve as illustrated in FIG. 33.

Figure 35:
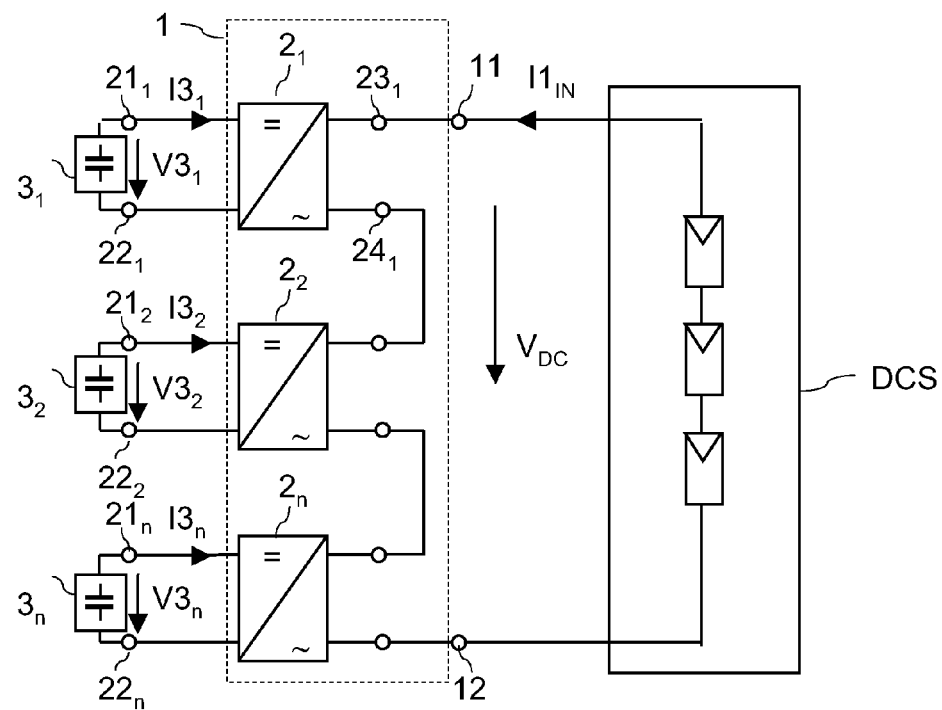
FIG. 35 illustrates a power converter circuit coupled to a DC voltage source including PV modules.

According to a further embodiment, illustrated in FIG. 35, the DC voltage source DCS includes string with at least one PV module. In the embodiment of FIG. 35, the string includes three PV modules. However, this is only an example. The individual converter units 2 may be implemented as explained with reference to FIG. 34. Additionally, the control circuit 5 (see FIG. 32) that controls the DC/AC converter 4 (that operates as a boost converter when the DC power sources 3 are charged) may have an MPP tracking functionality that additionally controls the input voltage V2 of the converter unit 2 such that the string with PV modules is operated in the MPP. When, however, the power the string provides when operated in the MPP is higher than the power that can be provided to the DC power sources, the control circuit 5 leaves the MPP tracking mode and only controls the DC link voltage V6. If the control circuit 5 can be operated in the MPP tracking mode may be detected by evaluating the DC link voltage V6. When, the control circuit 5 is operated in the MPP tracking mode and the DC link voltage increases, the control circuit may leave the MPP tracking mode. The DC link voltage may increase when the DC/AC converter 4 provides more power to the DC link capacitor 60 than the DC/DC converter feeds into the DC power source.

Referring to the explanation provided before, the same power converter circuit topology can be applied for different purposes, such as generating an AC output current to be fed to a power grid, providing an AC output current to an AC load, providing a DC output current to a DC load, for charging a plurality of distributed DC power sources from an AC power source (AC power grid), or for charging a plurality of DC power sources from a DC power source (a DC power grid). While the circuit topology of the individual converter units 2, e.g., with a DC/DC converter 4 and a DC/AC converter 4, may be the same in each of the different operation modes, the control circuits such as the control circuits 5 and 7 of the DC/DC converter 6 and the DC/AC converter 4 can be different in different operation modes.

According to one embodiment, control circuits 5, 7 for at least two different operation modes are implemented in one system, and in each of the different operation modes only the control circuits 5, 7 corresponding to the individual operation mode are operated to control the DC/DC converter 6 and the DC/AC converter, respectively. "To implement control circuits 5, 7 for at least two different operation modes" does not necessarily mean that a specific circuit (hardware) is provided for each of the different operation modes. Referring to the explanation above, the function blocks of the control circuits (controllers) 5, 7 may be implemented as analog circuits, digital circuits, or may be implemented using hardware and software, such as a microcontroller on which a specific software is running. Dependent on the specific implementation of the control circuits it may be sufficient to provide only one hardware, such as a microcontroller, to provide a program (software, firmware) for each of the different operation modes, and to select the program running on the hardware dependent on the operation mode.

Figure 36:
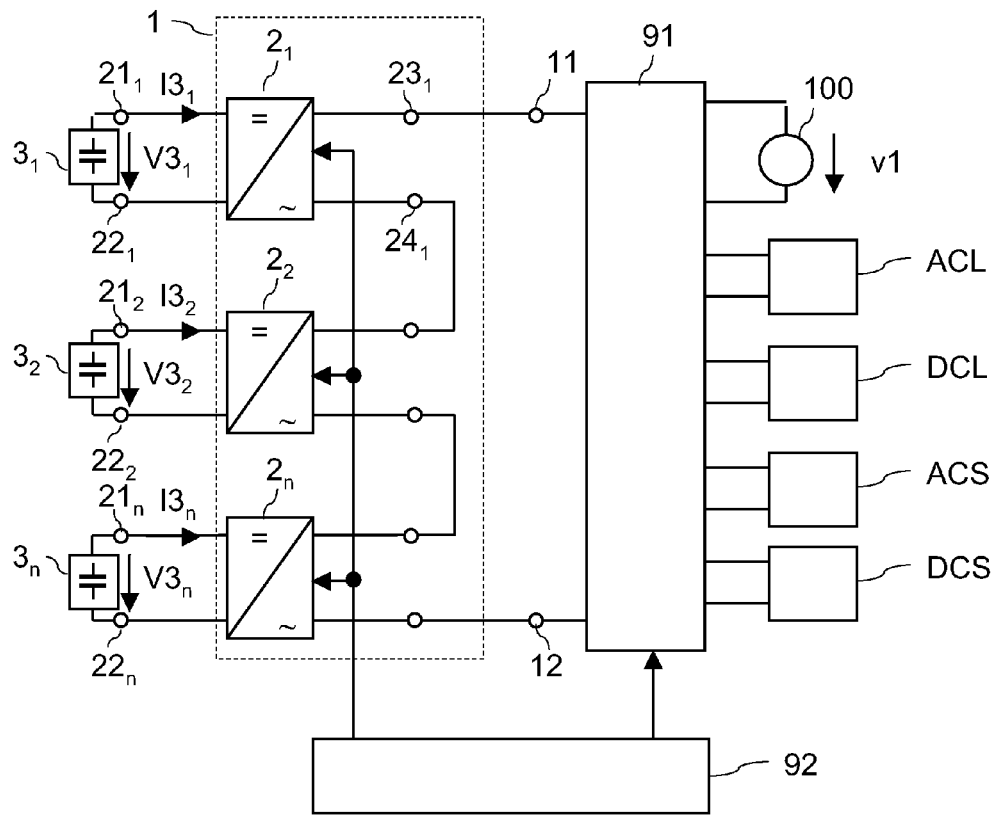
FIG. 36 *illustrates* a system with a power converter circuit and with a plurality of loads/supply circuits.

FIG. 36 schematically illustrates a system with a power converter circuit 1 having n, with n≥2, converter units 2 connected in series, and with DC power sources 3 connected to the individual converter units 1. The output terminals 11, 12 are connected to a switch circuit 91 that is operable to connected the output terminals 11, 12 to one of at least two loads or supply sources. These at least two loads or supply sources may include, but are not to limited to, an AC power grid 100, an AC load ACL, a DC load DCL, an AC source ACS, and a DC source DCS. The switch circuit 91 may include conventional switches such as relays or semiconductor switches that are suitable to connect the output terminals to one of the loads/supply sources. An operation mode controller 92 defines the operation mode of the system and controls the switch circuit 91 to connect the output terminals 11, 12 to one of the load/supply sources dependent on the operation mode. The operation mode controller 92 further controls the individual converter units 2 to operate in one of the operation modes explained before in order to either supply power to a load such as the power grid 100, the AC load ACL, or the DC load, or to receive power from a source such as an AC source ACS, or DC source DCS.

Figure 37:
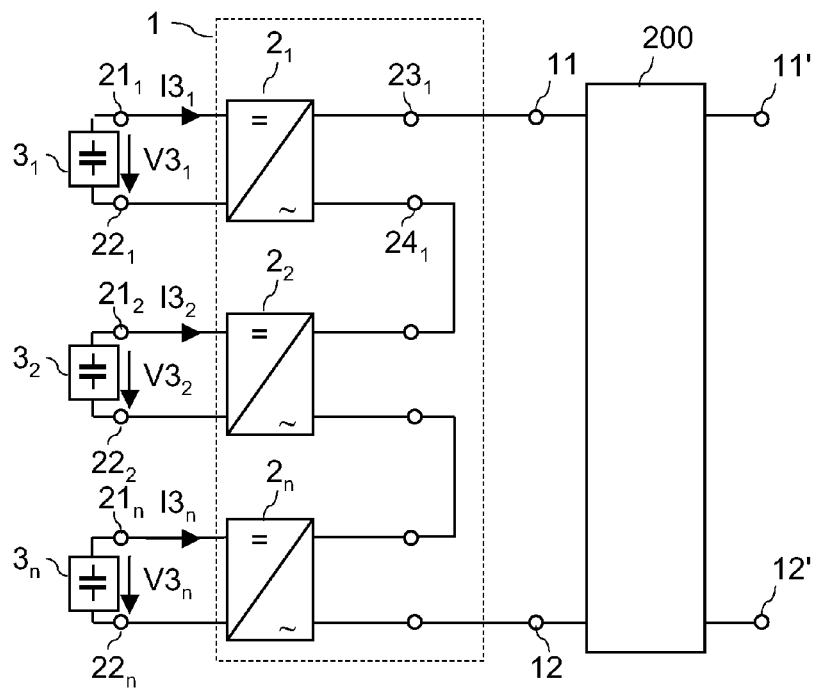
FIG. 37 illustrates an embodiment of a system with a power converter circuit and an unfolding bridge.

In each of the embodiments explained before in which the power converter circuit 1 provides an AC output current to a load or receives an AC input current from a power source, each converter unit 2 provides or receives an AC current. For this, each converter unit 2 includes an H4 bridge with two half-bridges. According to one embodiment, the H4 bridge in the DC/AC converter 4 of each converter unit 2 is replaced by a buck converter or a boost converter and each of the converter unit generates or receives a rectified AC current. In this case, the power converter circuit additionally includes an unfolding bridge that generates an AC current from a rectified AC current or a rectified AC current from an AC current. FIG. 37 illustrates an embodiment of such a power converter circuit 1.

The power converter circuit of FIG. 37 includes a plurality of converter units 2 connected in series and an unfolding bridge 200 connected to the output terminals 11, 12 of the series circuit. The unfolding bridge 200 has output terminals 11', 12' for providing or receiving an AC voltage and an AC current. These terminals 11', 12' may be connected to a load/supply source in the same way as the output terminals 11, 12 in the embodiments explained herein before.

Figure 38:
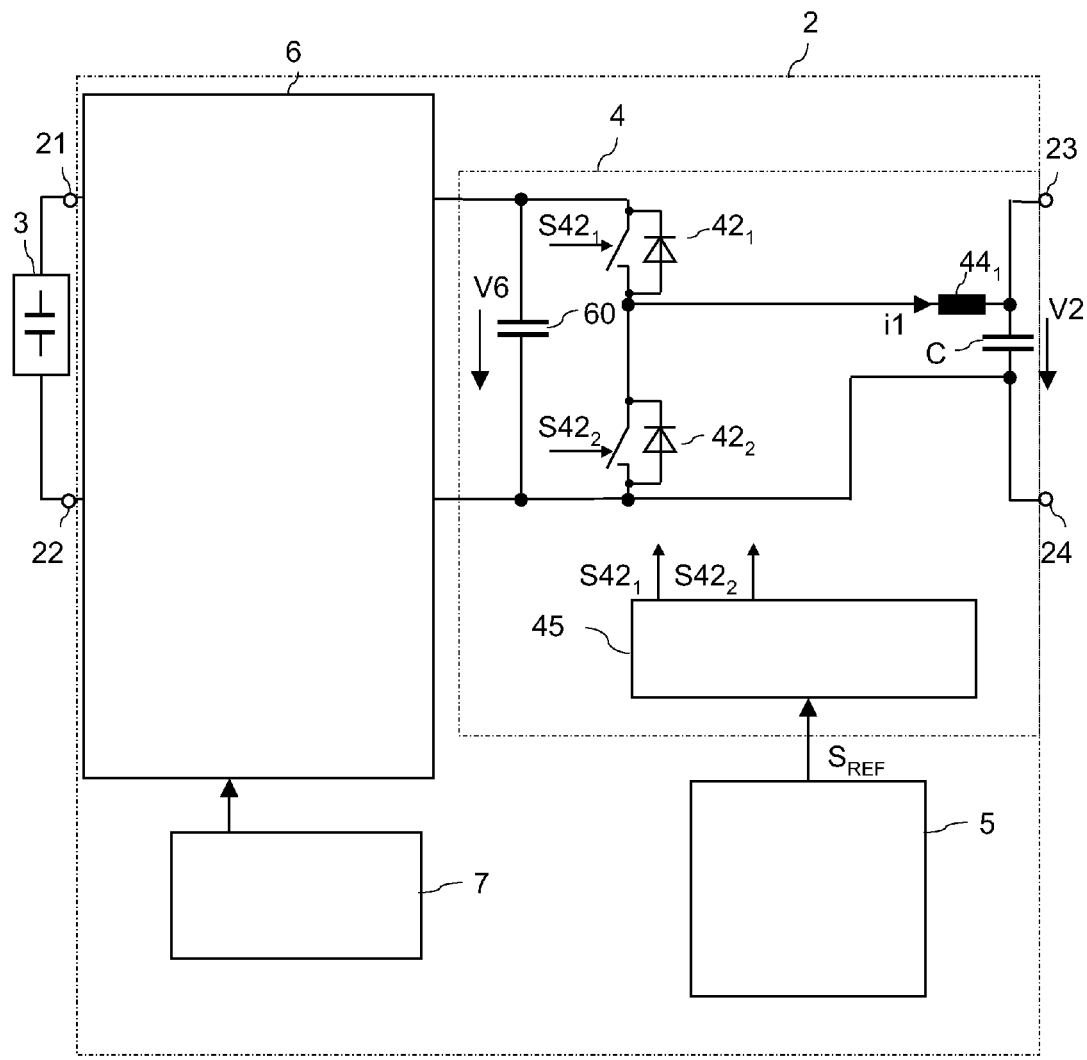
FIG. 38 illustrates one embodiment of a converter unit of FIG. 37.

FIG. 38 illustrates an embodiment of one of the converter units 2 of the power converter circuit of FIG. 37. The converter unit 38 includes a DC/DC converter 6 that corresponds to one of the DC/DC converters explained before and a DC/AC converter 4. The DC/AC converter 4 is implemented as buck converter that may be obtained from one of the DC/AC converters with an H4-bridge explained before by omitting the third switch 42₃ and the inductive storage element 44₂ and by replacing the fourth switch 42₄ by a short circuit. The buck converter operates as a buck converter when the power converter circuit provides power to a load, and operates as a boost converter when the power converter circuit charges the DC power sources.

The operating principle of the buck converter 4 and the control circuit 5 of FIG. 38 corresponds to the operating principle of the DC/AC converters 4 and the corresponding control circuits 5 explained herein before, with the difference that instead of signals representing the frequency and phase of an AC signal, such as the measurement signal $S_{V1}$ or the load control signal $S_{MC}$ explained before, the control circuit receives a signal representing the frequency and phase of a rectified AC signal. Thus, the current i1 provided by the buck converter 4 or received by the buck converter 4 is a rectified AC signal.

The unfolding bridge 200 may be a conventional unfolding bridge operable to generate a rectified AC voltage at the output terminals 11, 12 from an AC voltage received at the terminals 11', 12', or to provide an AC voltage at the terminals 11', 12' from a rectified AC voltage at the terminals 11, 12.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the invention may be achieved in either all software implementations, using the appropriate processor instructions, or in hybrid implementations that utilize a combination of hardware logic and software logic to achieve the same results. Such modifications to the inventive concept are intended to be covered by the appended claims.

Spatially relative terms such as "under," "below," "lower," "over," "upper" and the like, are used for ease of description to explain the positioning of one element relative to a second element. These terms are intended to encompass different orientations of the device in addition to different orientations than those depicted in the figures. Further, terms such as "first," "second" and the like, are also used to describe various elements, regions, sections, etc. and are also not intended to be limiting Like terms refer to like elements throughout the description.

As used herein, the terms "having," "containing," "including," "comprising" and the like are open ended terms that indicate the presence of stated elements or features, but do not preclude additional elements or features. The articles "a," "an" and "the" are intended to include the plural as well as the singular, unless the context clearly indicates otherwise.

With the above range of variations and applications in mind, it should be understood that the present invention is not limited by the foregoing description, nor is it limited by the accompanying drawings. Instead, the present invention is limited only by the following claims and their legal equivalents.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A circuit arrangement, comprising:
a plurality of n DC power sources, each DC power source including a rechargeable battery, wherein n≥2; and
a plurality of n converter units, each converter unit having input terminals and output terminals, wherein the input terminals of each of the plurality of n converter units are coupled to a respective one of the plurality of DC power sources, the converter units forming a series circuit between load terminals of the circuit arrangement, wherein the circuit arrangement is configured to receive a supply voltage and a supply current from a power source coupled to the load terminals and to output a current to at least one of the plurality of DC power sources, wherein the circuit arrangement is configured to receive an AC supply voltage and an AC supply current.

2. The circuit arrangement of claim 1, wherein at least one of the converter units is configured to receive a voltage reference signal and to generate an output current dependent on the voltage reference signal.

3. The circuit arrangement of claim 2, wherein the at least one of the converter units is configured to generate the output current dependent on the voltage reference signal such that there is a predefined phase difference between the output current and the voltage reference signal.

4. The circuit arrangement of claim 3, wherein the phase difference is substantially zero.

5. The circuit arrangement of claim 3, wherein the voltage reference signal is a rectified AC signal.

6. The circuit arrangement of claim 2, wherein the voltage reference signal represents a frequency that is substantially zero.

7. The circuit arrangement of claim 2, wherein each of the plurality of converter units is configured to receive a voltage reference signal and to generate an output current such that there is a predefined phase difference between the output current and the voltage reference signal.

8. The circuit arrangement of claim 2, wherein the at least one of the plurality of converter units comprises:
a first converter coupled to the output terminals of the at least one of the plurality of converter units, wherein the first converter is configured to output the output current.

9. The circuit arrangement of claim 8, wherein the at least one converter unit further comprises:
a second converter coupled between the input terminals of the at least one of the plurality of converter units and the first converter; and
wherein the second converter is configured to control an input current drawn from a DC power source of the plurality of DC power sources that is coupled to the at least one of the plurality of converter units.

10. The circuit arrangement of claim 9, wherein the second converter is configured to control the input current dependent on a charging state of the DC power source of the plurality of DC power sources.

11. The circuit arrangement of claim 10, wherein the second converter is further configured to control the input current dependent on a temperature of the DC power source of the plurality of DC power sources.

12. The circuit arrangement of claim 9, wherein the first converter is configured to control the output current of the at least one converter unit of the plurality of converter units and to control an input voltage of the first converter.

13. The circuit arrangement of claim 1, wherein at least one converter unit of the plurality of converter units is configured to receive a voltage control signal and to output an output voltage such that a frequency, phase and amplitude of the output voltage is dependent on the voltage control signal.

14. The circuit arrangement of claim 13, further comprising:
   a load coupled to the load terminals of the circuit arrangement;
   a load controller configured to output a load control signal; and
   a control unit, wherein the control unit is configured to generate the voltage control signal dependent on the load control signal.

15. The circuit arrangement of claim 14, wherein the load is a motor and the load controller is a motor controller.

16. The circuit arrangement of claim 14, wherein the voltage control signal represents a frequency that is substantially zero.

17. The circuit arrangement of claim 13, wherein the voltage control signal is a rectified AC signal.

18. The circuit arrangement of claim 1, wherein at least one converter unit comprises a first converter and a second converter coupled between the first converter and the DC power source.

19. The circuit arrangement of claim 18, wherein the first converter is configured to receive an input current and to control the input current such that there is predefined phase difference between the input current and the supply voltage.

20. The circuit arrangement of claim 19, wherein the phase difference is zero.

21. The circuit arrangement of claim 19, wherein the first converter is further configured to control an amplitude of the input current.

22. The circuit arrangement of claim 19, wherein the first converter is further configured to control a voltage output by the first converter and received by the second converter.

23. The circuit arrangement of claim 18, wherein the second converter is configured to control the current to the DC power source.

24. The circuit arrangement of claim 23, wherein the second converter is configured to control the current to the DC power source in accordance with a charging curve.

25. The circuit arrangement of claim 1, wherein the circuit arrangement is configured to receive a DC supply voltage and a DC supply current.

26. The circuit arrangement of claim 1, wherein the circuit arrangement further comprises an unfolding bridge coupled between the series circuit with the plurality of converter units and the load terminal.

27. A circuit arrangement, comprising:
   a plurality of n DC power sources, each DC power source including a rechargeable battery, wherein n≥2;
   a plurality of n converter units, each converter unit having input terminals and output terminals, wherein the input terminals of each of the plurality of n converter units are coupled to a respective one of the plurality of DC power sources, the converter units forming a series circuit between load terminals of the circuit arrangement, wherein the circuit arrangement is configured to receive a supply voltage and a supply current from a power source coupled to the load terminals and to output a current to at least one of the plurality of DC power sources; and
   an unfolding bridge coupled between the series circuit with the plurality of converter units and the load terminal.

* * * * *